United States Patent
Lee et al.

(10) Patent No.: US 11,816,872 B2
(45) Date of Patent: Nov. 14, 2023

(54) METHOD AND APPARATUS FOR PERFORMING ARTIFICIAL INTELLIGENCE ENCODING AND ARTIFICIAL INTELLIGENCE DECODING

(71) Applicant: SAMSUNG ELECTRONICS CO., LTD., Suwon-si (KR)

(72) Inventors: Chaeeun Lee, Suwon-si (KR); Jaehwan Kim, Suwon-si (KR); Youngo Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 204 days.

(21) Appl. No.: 17/503,420

(22) Filed: Oct. 18, 2021

(65) Prior Publication Data

US 2022/0036596 A1 Feb. 3, 2022

Related U.S. Application Data

(63) Continuation of application No. 17/333,845, filed on May 28, 2021, now Pat. No. 11,270,469.

(30) Foreign Application Priority Data

Jun. 11, 2020 (KR) .......... 10-2020-0070969
Oct. 6, 2020 (KR) .......... 10-2020-0128877

(51) Int. Cl.
*G06T 9/00* (2006.01)
*G06N 3/08* (2023.01)
(Continued)

(52) U.S. Cl.
CPC .......... *G06T 9/002* (2013.01); *G06N 3/08* (2013.01); *G06T 3/4046* (2013.01); *G06V 10/454* (2022.01); *G06V 10/82* (2022.01)

(58) Field of Classification Search
CPC ..... G06T 3/4046; G06T 9/002; G06N 3/0454; G06N 3/08
(Continued)

(56) References Cited

U.S. PATENT DOCUMENTS

| 10,860,919 B2 | 12/2020 | Kanazawa et al. |
| 2020/0145692 A1 | 5/2020 | Xu et al. |
| 2020/0221094 A1 | 7/2020 | Seregin et al. |

FOREIGN PATENT DOCUMENTS

| KR | 10-1821285 B1 | 1/2018 |
| KR | 10-1995551 B | 7/2019 |

(Continued)

OTHER PUBLICATIONS

International Search Report and Written Opinion dated Sep. 16, 2021, in International Patent Application No. PCT/KR2021/006594 (PCT/ISA/220; PCT/ISA/210; PCT/ISA/237), 10 pages.
(Continued)

*Primary Examiner* — Mark Roz
(74) *Attorney, Agent, or Firm* — Sughrue Mion, PLLC

(57) ABSTRACT

An apparatus for performing artificial intelligence (AI) encoding on an image includes: a memory storing one or more instructions; and a processor configured to execute the one or more instructions stored in the memory to: determine a resolution of an original image; when the resolution of the original image is higher than a predetermined value, obtain a first image by performing AI downscaling on the original image via a downscaling deep neural network (DNN); when the resolution of the original image is lower than or equal to the predetermined value, obtain a first image by performing AI one-to-one preprocessing on the original image via a one-to-one preprocessing DNN for upscaling; generate image data by performing first encoding on the first image; and transmit the image data and AI data including informa-
(Continued)

tion related to the AI downscaling or information related to the AI one-to-one preprocessing.

5 Claims, 21 Drawing Sheets

(51) Int. Cl.
*G06T 3/40* (2006.01)
*G06V 10/44* (2022.01)
*G06V 10/82* (2022.01)

(58) Field of Classification Search
USPC .......................................................... 382/232
See application file for complete search history.

(56) References Cited

FOREIGN PATENT DOCUMENTS

| KR | 10-2020-0004427 A | 1/2020 |
| KR | 10-2020-0044666 A | 4/2020 |
| WO | 2020/080873 A1 | 4/2020 |

OTHER PUBLICATIONS

Kwanyoung Kim et al., 'SREdgeNet: Edge Enhanced Single Image Super Resolution using Dense Edge Detection Network and Feature Merge Network', Computer Vision and Pattern Recognition, Dec. 2018.
Communication dated Oct. 25, 2021, issued by the Korean Intellectual Property Office in Korean Application No. 10-2020-0128877.

FIG. 5

| IMAGE-RELATED INFORMATION | DNN SETTING INFORMATION |
|---|---|
| SD, 10Mbps, AV1 | DNN SETTING INFORMATION A |
| HD, 15Mbps, H.264 | DNN SETTING INFORMATION B |
| Full HD, 20Mbps, HEVC | DNN SETTING INFORMATION C |
| Full HD, 15Mbps, HEVC | DNN SETTING INFORMATION D |

METHOD AND APPARATUS FOR PERFORMING ARTIFICIAL INTELLIGENCE ENCODING AND ARTIFICIAL INTELLIGENCE DECODING

CROSS-REFERENCE TO RELATED APPLICATIONS

This application is a continuation application of U.S. patent application Ser. No. 17/333,845, filed on May 28, 2021, which is based on and claims priority under 35 U.S.C. § 119 to Korean Patent Application Nos. 10-2020-0070969, filed on Jun. 11, 2020, and 10-2020-0128877, filed on Oct. 6, 2020, in the Korean Intellectual Property Office, the disclosures of which are incorporated by reference herein in their entireties.

BACKGROUND

1. Field

The disclosure relates to methods and apparatuses for processing images, and more particularly, to methods and apparatuses for performing artificial intelligence (AI) encoding and AI decoding.

2. Description of the Related Art

An image is encoded using a codec conforming to a predefined data compression standard such as a Moving Picture Experts Group (MPEG) standard, and then is stored in a recording medium or transmitted through a communication channel in the form of a bitstream.

With the development and dissemination of hardware capable of reproducing and storing high-resolution/high-quality images, there is an increasing need for a codec capable of effectively encoding and decoding such high-resolution/high-quality images.

In addition, there is an increasing need for a codec capable of encoding a low-resolution image and decoding a transmitted low-resolution image into a high-resolution/high-quality image.

SUMMARY

Provided are methods and apparatuses for performing artificial intelligence (AI) encoding and AI decoding on an image, whereby a low bitrate may be achieved by encoding and decoding the image based on AI.

Additional aspects will be set forth in part in the description which follows and, in part, will be apparent from the description, or may be learned by practice of the presented embodiments.

In accordance with an aspect of the disclosure, an apparatus for performing artificial intelligence (AI) encoding on an image, includes: a memory storing one or more instructions; and at least one processor configured to execute the one or more instructions stored in the memory to: determine a resolution of an original image; based on the resolution of the original image being greater than a predetermined value, obtain a first image by performing AI downscaling on the original image via a downscaling deep neural network (DNN); based on the resolution of the original image being less than or being equal to the predetermined value, obtain the first image by performing AI one-to-one preprocessing on the original image via a one-to-one preprocessing DNN for upscaling; generate image data by performing first encoding on the first image; and transmit the image data and AI data including information related to the AI downscaling or information related to the AI one-to-one preprocessing, wherein the AI data includes information for selecting DNN setting information of an upscaling DNN for AI upscaling of a second image that is generated by performing first decoding on the image data, wherein DNN setting information of the downscaling DNN is obtained via first joint training of the downscaling DNN and the upscaling DNN, and wherein DNN setting information of the one-to-one preprocessing DNN is obtained via second joint training of the one-to-one preprocessing DNN and the upscaling DNN by using the DNN setting information of the upscaling DNN obtained via the first joint training.

In accordance with another aspect of the disclosure, an apparatus for performing artificial intelligence (AI) decoding on an image, includes: a memory storing one or more instructions; and at least one processor configured to execute the one or more instructions stored in the memory to: obtain AI data and image data, the image data generated as a result of first encoding of a first image, and the AI data related to AI downscaling of an original image to the first image or AI one-to-one preprocessing of the original image to the first image; obtain a second image corresponding to the first image by performing first decoding on the image data; obtain, based on the AI data, deep neural network (DNN) setting information for AI upscaling of the second image, from among a plurality of pieces of DNN setting information; and generate a third image by performing the AI upscaling on the second image via an upscaling DNN operating based on the obtained DNN setting information, wherein the plurality of pieces of DNN setting information are obtained via: first joint training of the upscaling DNN and a downscaling DNN used for the AI downscaling of the original image, and second joint training of a one-to-one preprocessing DNN used for the AI one-to-one preprocessing of the original image and the upscaling DNN, the second joint training being performed using DNN setting information for the AI upscaling obtained as a result of the first joint training.

In accordance with another aspect of the disclosure, a method of performing artificial intelligence (AI) encoding on an image, includes: determining a resolution of an original image; determining, based on the resolution of the original image, whether to obtain a first image by performing AI one-to-one processing on the original image via a one-to-one preprocessing deep neural network (DNN) for upscaling, or by performing AI downscaling on the original image via a downscaling DNN; based on the resolution of the original image being less than or being equal to a predetermined value, obtaining the first image by performing the AI one-to-one preprocessing on the original image via the one-to-one preprocessing DNN for upscaling; based on the resolution of the original image being greater than the predetermined value, obtaining the first image by performing the AI downscaling on the original image via the downscaling DNN; generating image data by performing first encoding on the first image; and transmitting the image data and AI data including information related to the AI one-to-one preprocessing or information related to the AI downscaling, wherein the AI data includes information for selecting DNN setting information of an upscaling DNN for AI upscaling of a second image that is generated by performing first decoding on the image data, wherein DNN setting information of the downscaling DNN is obtained via first joint training of the downscaling DNN and the upscaling DNN, and wherein DNN setting information of the one-to-one preprocessing DNN is obtained via second joint training of the one-to-one preprocessing DNN and the upscaling DNN by using the DNN setting information of the upscaling DNN obtained via the first joint training.

In accordance with another aspect of the disclosure, a method for performing artificial intelligence (AI) decoding on an image, includes: obtaining AI data and image data, the image data generated as a result of first encoding of a first image, and the AI data related to AI downscaling of an original image to the first image or AI one-to-one preprocessing of the original image to the first image; obtaining a second image corresponding to the first image by performing first decoding on the image data; obtaining, based on the AI data, deep neural network (DNN) setting information for AI upscaling of the second image, from among a plurality of pieces of DNN setting information; and generating a third image by performing the AI upscaling on the second image via an upscaling DNN operating based on the obtained DNN setting information, wherein the plurality of pieces of DNN setting information are obtained via: first joint training of the upscaling DNN and a downscaling DNN used for the AI downscaling of the original image, and second joint training of a one-to-one preprocessing DNN used for the AI one-to-one preprocessing of the original image and the upscaling DNN, the second joint training being performed using DNN setting information for the AI upscaling obtained as a result of the first joint training.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 is a table illustrating a mapping relationship between several pieces of image-related information and several pieces of DNN setting information according to an embodiment;

DETAILED DESCRIPTION

Figure 1:
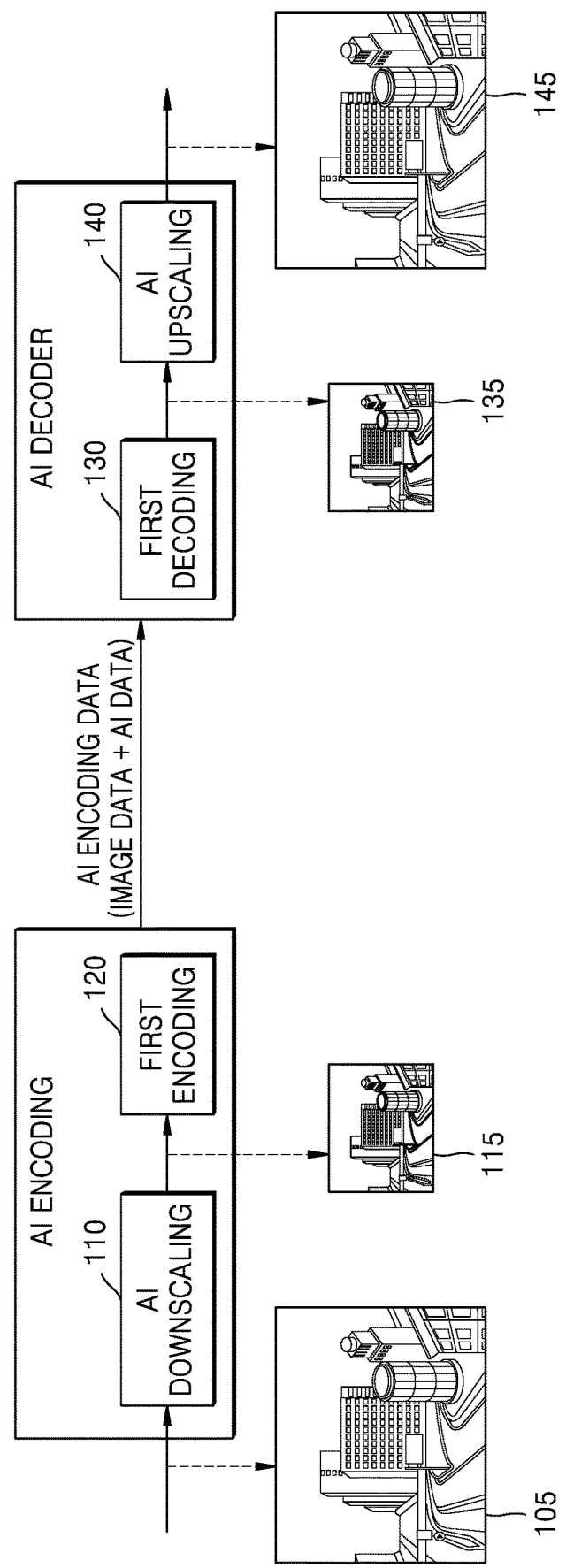
FIG. 1 is a diagram for describing an artificial intelligence (AI) encoding process and an AI decoding process, according to an embodiment.

Throughout the disclosure, expressions such as "at least one of a, b or c" indicates only a, only b, only c, both a and b, both a and c, both b and c, all of a, b, and c, or variations thereof.

In the disclosure, various changes may be made, and numerous embodiments may be provided. Particular embodiments are illustrated in the drawings and will be described in detail in the detailed description. However, embodiments of the disclosure are not intended to be limited to the particular embodiments thereof, and it will be understood that all changes, equivalents, and substitutes that do not depart from the spirit and technical scope of numerous embodiments of the disclosure are encompassed in the disclosure.

In describing embodiments of the disclosure, when it is determined that detailed descriptions of related known technologies may unnecessarily obscure the essence of the disclosure, the descriptions thereof may be omitted. Furthermore, numbers (e.g., a first, a second, etc.) used in the description of the specification are merely identifying symbols for distinguishing one element from another.

Furthermore, throughout the specification, it will be understood that when an element is referred to as being "connected" or "coupled" to another element, it may be directly connected or coupled to the other element, but may be connected or coupled to the other element with an intervening element interposed therebetween unless specified otherwise.

Furthermore, in the present specification, for an element expressed as a "unit," a "module," or the like, two or more elements may be combined into a single element, or a single element may be divided into two or more elements according to subdivided functions. Furthermore, each element to be described below may further perform, in addition to its main functions, some or all of functions performed by another element, and some of the main functions of each element may also be performed entirely by another component.

Furthermore, in the present specification, an "image" or a "picture" may refer to a still image, a moving image composed of a plurality of consecutive still images (or frames), or a video.

In addition, as used herein, a deep neural network (DNN) is a representative example of an artificial neural network model simulating brain nerves, and is not limited to an artificial neural network model using a particular algorithm.

Also, as used herein, a "parameter" is a value used in a computation process for each layer constituting a neural network, and for example, may include a weight used when an input value is applied to a certain operation equation. Furthermore, parameters may be represented in a matrix form. A parameter is a value set as a result of training, and may be updated via separate training data when necessary.

Furthermore, as used herein, a "first DNN" refers to a DNN used for artificial intelligence (AI) downscaling of an image, and a "second DNN" refers to a DNN used for AI upscaling of an image.

Also, as used herein, "DNN setting information" includes the parameter as information related to an element constituting a DNN. The first or second DNN may be set by using the DNN setting information.

Furthermore, as used herein, an "original image" refers to an image on which AI encoding is to be performed, and a "first image" refers to an image obtained as a result of performing AI downscaling on the original image during an AI encoding process. Furthermore, a "second image" refers to an image obtained via first decoding during an AI decoding process, and a "third image" refers to an image obtained by performing AI upscaling on the second image during the AI decoding process.

Also, as used herein, "AI downscaling" refers to a process of decreasing a resolution of an image based on AI, and "first encoding" refers to an encoding process using an image compression method based on frequency transformation. In addition, "first decoding" refers to a decoding process using an image reconstruction method based on frequency transformation, and "AI upscaling" refers to a process of increasing a resolution of an image based on AI.

FIG. 1 is a diagram for describing an AI encoding process and an AI decoding process, according to an embodiment.

As described above, as a resolution of an image increases rapidly, the amount of information to be processed for encoding/decoding increases, and accordingly, there is a need for a method of improving the efficiency of image encoding and decoding.

As shown in FIG. 1, according to an embodiment, a first image 115 is obtained by performing AI downscaling 110 on an original image 105 having an original resolution (e.g., high resolution, 1920×1080 resolution or higher, 3840×2160 resolution or higher, 7680×4320 resolution, etc.). Then, first encoding 120 and first decoding 130 are performed on the first image 115 having a relatively low resolution (i.e., lower than the original resolution), which may significantly reduce a bitrate as compared to when the first encoding 120 and the first decoding 130 are performed on the original image 105.

In detail, referring to FIG. 1, in an embodiment, during the AI encoding process, the first image 115 is obtained by performing the AI downscaling 110 on the original image 105, and then the first encoding 120 is performed on the first image 115. During the AI decoding process, AI encoding data including AI data and image data obtained as a result of AI encoding is received, a second image 135 is obtained via the first decoding 130, and a third image 145 is obtained by performing AI upscaling 140 on the second image 135.

Referring to the AI encoding process in detail, when the original image 105 is received, the AI downscaling 110 is performed on the original image 105 to obtain the first image 115 having a certain resolution and/or a certain quality. In this case, the AI downscaling 110 is performed based on AI, and AI for the AI downscaling 110 is jointly trained with AI for the AI upscaling 140 of the second image 135. This is because, when the AI for the AI downscaling 110 and the AI for the AI upscaling 140 are separately trained, a difference between the original image 105 on which AI encoding is to be performed and the third image 145 reconstructed by performing AI decoding increases.

In an embodiment, AI data may be used to maintain such a joint relationship during the AI encoding process and the AI decoding process. Thus, AI data obtained through the AI encoding process includes information indicating an upscaling target, and during the AI decoding process, the AI upscaling 140 is performed on the second image 135 according to the upscaling target identified based on the AI data.

The AI for the AI downscaling 110 and the AI for the AI upscaling 140 may be each implemented as a DNN. As described below with reference to FIG. 11, because a first DNN is jointly trained with a second DNN by sharing loss information under a certain target, an AI encoding apparatus may provide target information used during joint training of the first and second DNNs to an AI decoding apparatus, and the AI decoding apparatus may perform the AI upscaling 140 of the second image 135 to a target quality and/or resolution based on the received target information.

Referring to the first encoding 120 and the first decoding 130 in detail, with reference to FIG. 1, the amount of information contained in the first image 115 obtained by performing the AI downscaling 110 on the original image 105 may be reduced through the first encoding 120. The first encoding 120 may include a process of generating prediction data by predicting the first image 115, a process of generating residual data corresponding to a difference between the first image 115 and the prediction data, a process of transforming the residual data from a spatial domain into a frequency domain component, a process of quantizing the residual data that has undergone the transformation into the frequency domain component, a process of entropy-encoding the quantized residual data, etc. The first encoding 120 may be performed using one of image compression methods based on frequency transformation, such as MPEG-2, H.264 Advanced Video Coding (AVC), MPEG-4, High Efficiency Video Coding (HEVC), VC-1, Video Processor 8 (VP8), VP9, AOMedia Video 1 (AV1), etc.

The second image 135 corresponding to the first image 115 may be reconstructed by performing the first decoding 130 on the image data. The first decoding 130 may include a process of generating quantized residual data by entropy-decoding the image data, a process of inverse-quantizing the quantized residual data, a process of transforming the residual data from the frequency domain into a spatial domain component, a process of generating prediction data, a process of reconstructing the second image 135 by using the prediction data and the residual data, etc. Various modifications may be incorporated to the reconstructing process. For example, according to another embodiment, prediction (e.g., intra frame prediction) may be performed in the frequency domain rather than the spatial domain. The first decoding 130 may be performed using an image reconstruction method corresponding to one of the image compression methods based on frequency transformation, such as MPEG-2, H.264, MPEG-4, HEVC, VC-1, VP8, VP9, AV1, etc., which is used in the first encoding 120.

The AI encoding data obtained via the AI encoding process may include the image data obtained as a result of performing the first encoding 120 on the first image 115, and the AI data related to the AI downscaling 110 of the original image 105. The image data may be used during the first decoding 130, and the AI data may be used during the AI upscaling 140.

The image data may be transmitted in a form of a bitstream. The image data may include data obtained based on pixel values in the first image 115, e.g., residual data corresponding to a difference between the first image 115 and prediction data with respect to the first image 115. Furthermore, the image data includes pieces of information used during the first encoding 120 of the first image 115. For example, the image data may include prediction mode information, motion information, quantization parameter (QP) related information, etc., which are used to perform the first encoding 120 on the first image 115. The image data may be generated according to rules of an image compression method, e.g., a syntax thereof, which is used during the first encoding 120 from among the image compression methods based on frequency transformation, such as MPEG-2, H.264 AVC, MPEG-4, HEVC, VC-1, VP8, VP9, AV1, etc.

The AI data is used in the AI upscaling 140 based on the second DNN. As described above, because the first DNN is jointly trained with the second DNN, the AI data includes information that enables the AI upscaling 140 to be accurately performed on the second image 135 via the second DNN. During the AI decoding process, the second image 135 may undergo the AI upscaling 140 to a target resolution and/or a target quality based on the AI data.

The AI data may be transmitted in a form of a bitstream, together with the image data, According to another embodiment, the AI data may also be transmitted in a form of a frame or packet, separately from the image data.

Alternatively, according to another embodiment, the AI data may be included in the image data when it is transmitted.

The AI data and the image data may be transmitted over the same network or different networks.

Figure 2:
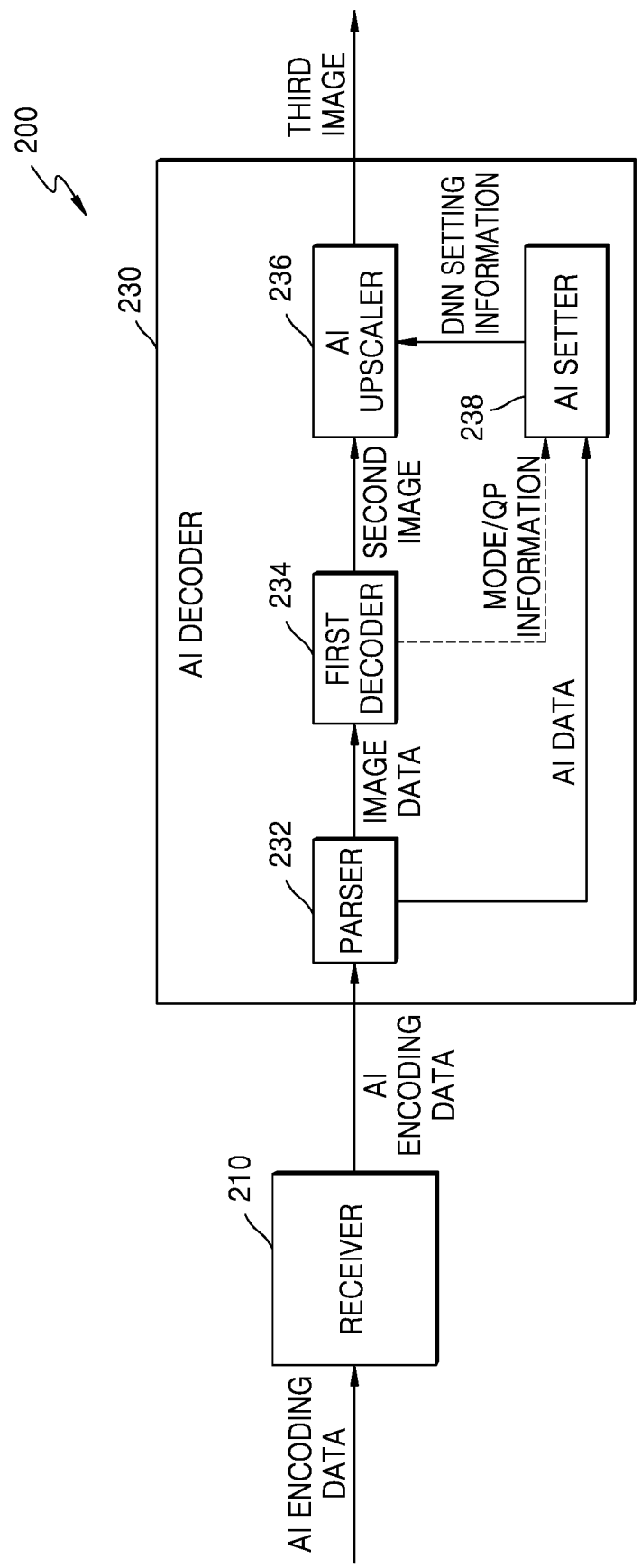
FIG. 2 is a block diagram of a configuration of an AI decoding apparatus according to an embodiment.

FIG. 2 is a block diagram of a configuration of an AI decoding apparatus 200 according to an embodiment.

Referring to FIG. 2, according to an embodiment, the AI decoding apparatus 200 may include a receiver 210 and an AI decoder 230. The AI decoder 230 may include a parser 232, a first decoder 234, an AI upscaler 236, and an AI setter 238.

Although FIG. 2 shows that the receiver 210 and the AI decoder 230 are separate devices, they may be implemented as a single processor. In this case, the receiver 210 and the AI decoder 230 may be implemented as a dedicated processor or through a combination of software and a general-purpose processor such as an application processor (AP), a central processor (CPU), or a graphics processing unit (GPU). Furthermore, when the receiver 210 and the AI decoder 230 are implemented as the dedicated processor, the dedicated processor may include a memory for implementing an embodiment (e.g., for storing instructions executable by the processor to perform a method according to an embodiment) or a memory processor for using an external memory.

The receiver 210 and the AI decoder 230 may also be configured as a plurality of processors. In this case, the receiver 210 and the AI decoder 230 may be implemented via a combination of dedicated processors or a combination of software and multiple general-purpose processors such as an AP, a CPU and a GPU. In an embodiment, the receiver 210 may be implemented as a first processor, the first decoder 234 may be implemented as a second processor different from the first processor, and the parser 232, the AI upscaler 236, and the AI setter 238 may be implemented was a third processor different from the first and second processors. It is understood that this is just an example, and one or more other embodiments may implement the various components via any combination of one or more processors.

The receiver 210 receives AI encoding data obtained as a result of AI encoding. For example, the AI encoding data may be a video file having a file format such as mp4 or mov.

The receiver 210 may receive the AI encoding data transmitted through a network. The receiver 210 outputs the AI encoding data to the AI decoder 230.

In an embodiment, the AI encoding data may be obtained from data storage media including a magnetic medium such as a hard disk, a floppy disk, or a magnetic tape, an optical recording medium such as compact disc read-only memory (CD-ROM) or digital versatile disk (DVD), a magneto-optical medium such as a floptical disk, etc.

The parser 232 parses the AI encoding data and respectively transmits image data and AI data generated as a result of first encoding of the first image 115 to the first decoder 234 and the AI setter 238.

In an embodiment, the parser 232 may parse the image data and the AI data that are separately included in the AI encoding data. The parser 232 may distinguish the image data from the AI data by reading a header in the AI encoding data. For example, the AI data may be included in a Vendor Specific InfoFrame (VSIF) within a High-Definition Multimedia Interface (HDMI) stream.

A structure of AI encoding data including AI data and image data separated from each other will be described below with reference to FIG. 9.

In another embodiment, the parser 232 may parse the image data from the AI encoding data, extract the AI data from the image data, and transmit the AI data to the AI setter 238 and the rest of the image data to the first decoder 234. In other words, the AI data may be included in the image data, and for example, the AI data may be included in Supplemental Enhancement Information (SEI) which is an additional information area of a bitstream corresponding to the image data. A structure of AI encoding data consisting of image data including AI data will be described below with reference to FIG. 10.

In another embodiment, the parser 232 may split a bitstream corresponding to the image data into a bitstream to be processed by the first decoder 234 and a bitstream corresponding to AI data and respectively output the two bitstreams to the first decoder 234 and the AI setter 238.

The parser 232 may identify that the image data included in the AI encoding data is image data obtained via a certain coder/decoder (codec) (e.g., MPEG-2, H.264, MPEG-4, HEVC, VC-1, VP8, VP9, AV1, etc.). In this case, corresponding information may be transmitted to the first decoder 234 so that the image data may be processed via the identified codec.

The first decoder 234 reconstructs the second image 135 corresponding to the first image 115 based on the image data received from the parser 232. The second image 135 obtained by the first decoder 234 is provided to the AI upscaler 236.

According to an embodiment, information related to first decoding, such as prediction mode information, motion information, QP information, etc., may be provided from the first decoder 234 to the AI setter 238. The information related to the first decoding may be used to obtain DNN setting information.

The AI data provided to the AI setter 238 includes pieces of information that enable AI upscaling to be performed on the second image 135. In this case, an upscaling target for the second image 135 corresponds to a downscaling target for a first DNN. Accordingly, the AI data includes information for identifying the downscaling target for the first DNN.

Detailed examples of pieces of information included in the AI data include differential information indicating a difference between a resolution of the original image 105 and a resolution of the first image 115 and information related to the first image 115.

The differential information may be represented as information about a degree of resolution conversion of the first image 115 compared to the resolution of the original image 105 (e.g., information about a resolution conversion ratio). Furthermore, because the resolution of the first image 115 may be determined from a resolution of the reconstructed second image 135 and the degree of resolution conversion may be determined through the resolution of the first image 115, the differential information may be represented only as resolution information of the original image 105. In this case, the resolution information may be expressed as a screen size (in terms of width/height) or as a ratio (16:9, 4:3, etc.) and a size of one axis. Furthermore, when there is preset resolution information, the resolution information may be expressed in a form of an index or flag.

The information related to the first image 115 may include information about at least one of the resolution of the first image 115, a bitrate of image data obtained as a result of performing first encoding on the first image 115, or a type of a codec used during the first encoding of the first image 115.

The AI setter 238 may determine an upscaling target for the second image 135, based on at least one of the differential information or the information related to the first image 115, which is included in the AI data. For example, the upscaling target may indicate to which resolution the second image 135 is to be upscaled. When the upscaling target is determined, the AI upscaler 236 performs AI upscaling on the second image 135 via a second DNN to obtain the third image 145 corresponding to the upscaling target.

Before describing a method, performed by the AI setter 238, of determining an upscaling target based on AI data, an AI upscaling process performed via a second DNN will now be described with reference to FIGS. 3 and 4.

Figure 3:
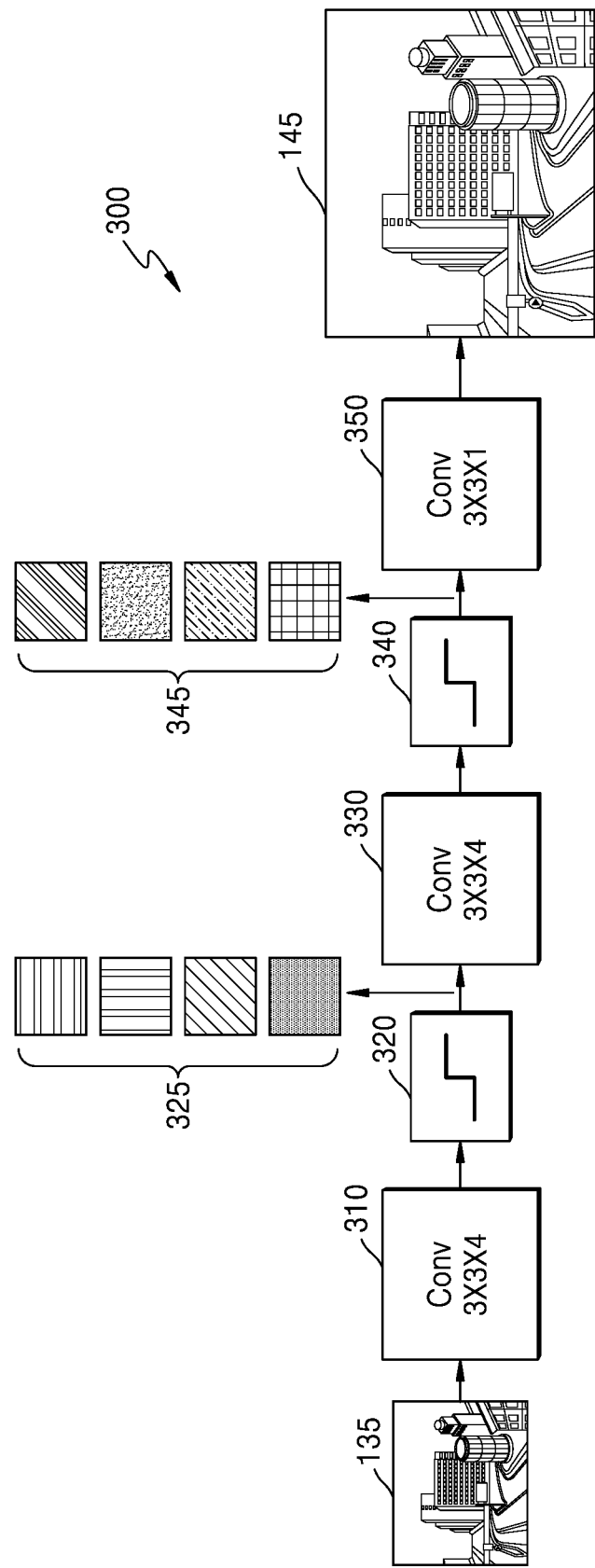
FIG. 3 is diagram illustrating a second deep neural network (DNN) for performing AI upscaling on a second image according to an embodiment.
Figure 4:
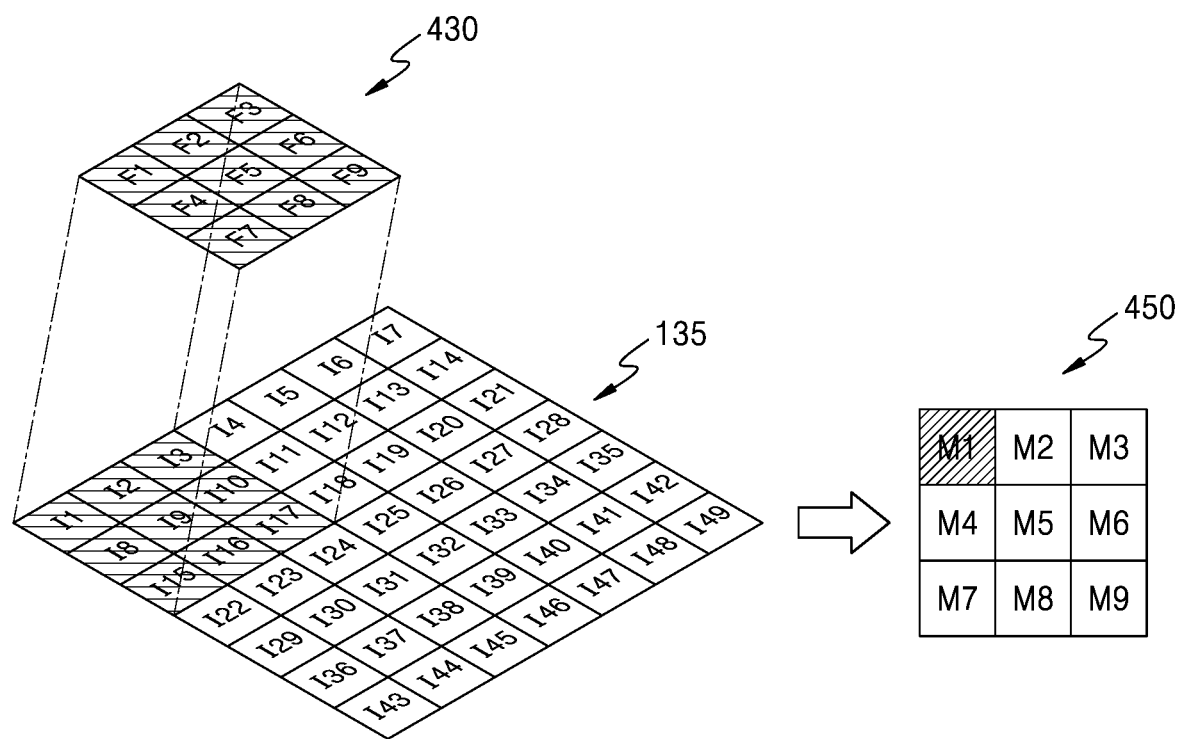
FIG. 4 is a diagram for describing a convolution operation by a convolution layer according to an embodiment.

FIG. 3 is diagram illustrating a second DNN 300 for performing AI upscaling on a second image 135, and FIG. 4 is a diagram for describing a convolution operation at a first convolution layer 310 shown in FIG. 3.

As shown in FIG. 3, the second image 135 is input to the first convolution layer 310. 3×3×4 indicated on the first convolution layer 310 shown in FIG. 3 indicates that a convolution process is performed on one input image by using four filter kernels having a size of 3×3. Four feature maps are generated by the four filter kernels as a result of the convolution process. Each feature map represents inherent features of the second image 135. For example, each feature map may represent features in a vertical direction, features in a horizontal direction, or edge features of the second image 135.

A convolution operation at the first convolution layer 310 is described in detail with reference to FIG. 4.

One feature map 450 may be generated by performing multiplication and addition between parameters of a filter kernel 430 having a size of 3×3 used in the first convolution layer 310 and their corresponding pixel values in the second image 135. Because four filter kernels are used in the first convolution layer 310, four feature maps may be generated via convolution operations using the four filter kernels.

I1 through I49 indicated on the second image 135 in FIG. 4 represent pixels in the second image 135, and F1 through F9 indicated on the filter kernel 430 represent parameters of the filter kernel 430. Furthermore, M1 through M9 indicated on the feature map 450 represent samples of the feature map 450.

Although FIG. 4 shows that the second image 135 includes 49 pixels, this is merely an example, and when the second image 135 has a resolution of 4K, the second image 135 may include, for example, 3840×2160 pixels.

During a convolution operation, an element-wise multiplication is performed between values of pixels I1, I2, I3, I8, I9, I10, I15, I16, and I17 in the second image 135 and corresponding parameters F1 through F9 of the filter kernel 430, and a value obtained by combining (for example, adding) results of the multiplication may be assigned as a value of M1 in the feature map 450. When a stride for the convolution operation is 2, an element-wise multiplication may be performed between values of pixels I3, I4, I5, I10, I11, I12, I17, I18, and I19 in the second image 135 and their corresponding parameters F1 through F9 of the filter kernel 430, and a value of combining results of the multiplication may be assigned as a value of M2 in the feature map 450.

While the filter kernel 430 moves by a stride to a last pixel in the second image 135, the convolution operation may be performed between pixel values in the second image 135 and parameters of the filter kernel 430 to obtain the feature map 450 having a certain size.

According to the disclosure, values of parameters of a second DNN, i.e., values of parameters of a filter kernel used in convolution layers of the second DNN (e.g., parameters F1 through F9 of the filter kernel 430), may be optimized via joint training of a first DNN and the second DNN. The AI setter 238 may determine an upscaling target corresponding to a downscaling target for the first DNN based on AI data, and determine parameters corresponding to the determined upscaling target as parameters of a filter kernel used in convolution layers of the second DNN.

Although convolution layers included in the first and second DNNs may perform operations according to the convolution operation process described with reference to FIG. 4, it is understood that the convolution operation process described with reference to FIG. 4 is merely an example, and embodiments of the disclosure are not limited thereto.

Referring back to FIG. 3, feature maps output from the first convolution layer 310 may be input to a first activation layer 320.

The first activation layer 320 may apply non-linear features to each feature map. The first activation layer 320 may include a sigmoid function, a Tan h function, a rectified linear unit (ReLU) function, or the like, but is not limited thereto.

The first activation layer 320 assigning the nonlinear feature indicates changing and outputting some sample values in the corresponding feature map which is an output of the first convolution layer 310. In this case, the change is performed by applying the non-linear features.

The first activation layer 320 determines whether to transmit, to a second convolution layer 330, sample values in the feature maps output from the first convolution layer 310. For example, some of the sample values in the feature maps are activated by the first activation layer 320 and transmitted to the second convolution layer 330, while other sample values therein are deactivated by the first activation layer 320 and not transmitted to the second convolution layer 330. The inherent features of the second image 135 represented by feature maps are emphasized by the first activation layer 320.

Feature maps 325 output from the first activation layer 320 are input to the second convolution layer 330. One of the feature maps 325 shown in FIG. 3 is a result of processing the feature map 450 described with reference to FIG. 4 at the first activation layer 320.

3×3×4 indicated on the second convolution layer 330 indicates that a convolution process is performed on the feature maps 325 by using four filter kernels having a size of 3×3. An output of the second convolution layer 330 is input to a second activation layer 340. The second activation layer 340 may apply non-linear features to input data.

Feature maps 345 output from the second activation layer 340 are input to a third convolution layer 350. 3×3×1 indicated on the third convolution layer 350 shown in FIG. 3 indicates that a convolution process is performed to generate one output image by using one filter kernel having a size of 3×3. The third convolution layer 350 is a layer for outputting a final image and generates one output by using one filter kernel. According to an embodiment, the third convolution layer 350 may output a third image 145 via a convolution operation.

As described below, there may be a plurality of pieces of DNN setting information, each piece of DNN setting information indicating the numbers of filter kernels in each of the first through third convolution layers 310, 330, and 350 of the second DNN 300, parameters of each filter kernel, etc., and are jointly trained with a plurality of pieces of DNN setting information of a first DNN. A joint relationship between the plurality of pieces of DNN setting information of the second DNN 300 and the plurality of pieces of DNN setting information of the first DNN may be implemented via joint training of the first DNN and the second DNN 300.

Although FIG. 3 shows that the second DNN 300 includes the three convolution layers (the first through third convolution layers 310, 330, and 350) and two activation layers (the first and second activation layers 320 and 340), this is merely an example, and the number of convolution layers and the number of activation layers may vary according to an embodiment. Furthermore, according to an embodiment, the second DNN 300 may be implemented as a recurrent neural network (RNN). In this case, a convolutional neural network (CNN) structure of the second DNN 300 according to an embodiment is changed to an RNN structure.

In an embodiment, the AI upscaler 236 may include at least one arithmetic logic unit (ALU) for performing the convolution operation and the arithmetic operation at each activation layer. The ALU may be implemented as a processor. For the convolution operation, the ALU may include a multiplier that performs multiplication between sample values of the second image 135 or a feature map output from a previous layer and sample values of a filter kernel, and an adder that adds together results of the multiplication. Furthermore, for the arithmetic operation of the activation layer, the ALU may include a multiplier that multiplies an input sample value by a weight used in a predetermined sigmoid, Tan h, or ReLU function, and a comparator that compares a result of the multiplication with a preset value to determine whether to transmit the input sample value to a next layer.

Hereinafter, a method by which the AI setter 238 determines an upscaling target and the AI upscaler 236 performs AI upscaling on the second image 135 according to the upscaling target will be described.

In an embodiment, the AI setter 238 may store a plurality of pieces of DNN setting information settable in the second DNN.

In this case, DNN setting information may include information about at least one of the number of convolution layers included in the second DNN, the number of filter kernels for each convolution layer, or parameters of each filter kernel. The plurality of pieces of DNN setting information may respectively correspond to various upscaling targets, and the second DNN may operate based on DNN setting information corresponding to a certain upscaling target. The second DNN may have different structures depending on DNN setting information. For example, the second DNN may include three convolution layers according to one piece of DNN setting information or four convolution layers according to another piece of DNN setting information.

In an embodiment, DNN setting information may include only parameters of each filter kernel used in the second DNN. In this case, the structure of the second DNN may remain unchanged, while only parameters of each filter kernel in the second DNN may change based on the DNN setting information.

The AI setter 238 may obtain DNN setting information for performing AI upscaling on the second image 135 from among the plurality of pieces of DNN setting information. Each of the plurality of pieces of DNN setting information used in the second DNN is information for obtaining the third image 145 having a predetermined resolution and/or predetermined quality and is obtained via joint training with the first DNN.

For example, one of the plurality of pieces of DNN setting information may include pieces of information for obtaining the third image 145 having a resolution twice as high as a resolution of the second image 135, e.g., the third image 145 with a 4K (4096×2160) resolution that is twice as high as a 2K (2048×1080) resolution of the second image 135, and another piece of DNN setting information may include pieces of information for obtaining the third image 145 having a resolution four times higher than the resolution of the second image 135, e.g., the third image 145 with a 8K (8192×4320) resolution that is four times higher than the 2K (2048×1080) resolution of the second image 135.

Figure 7:
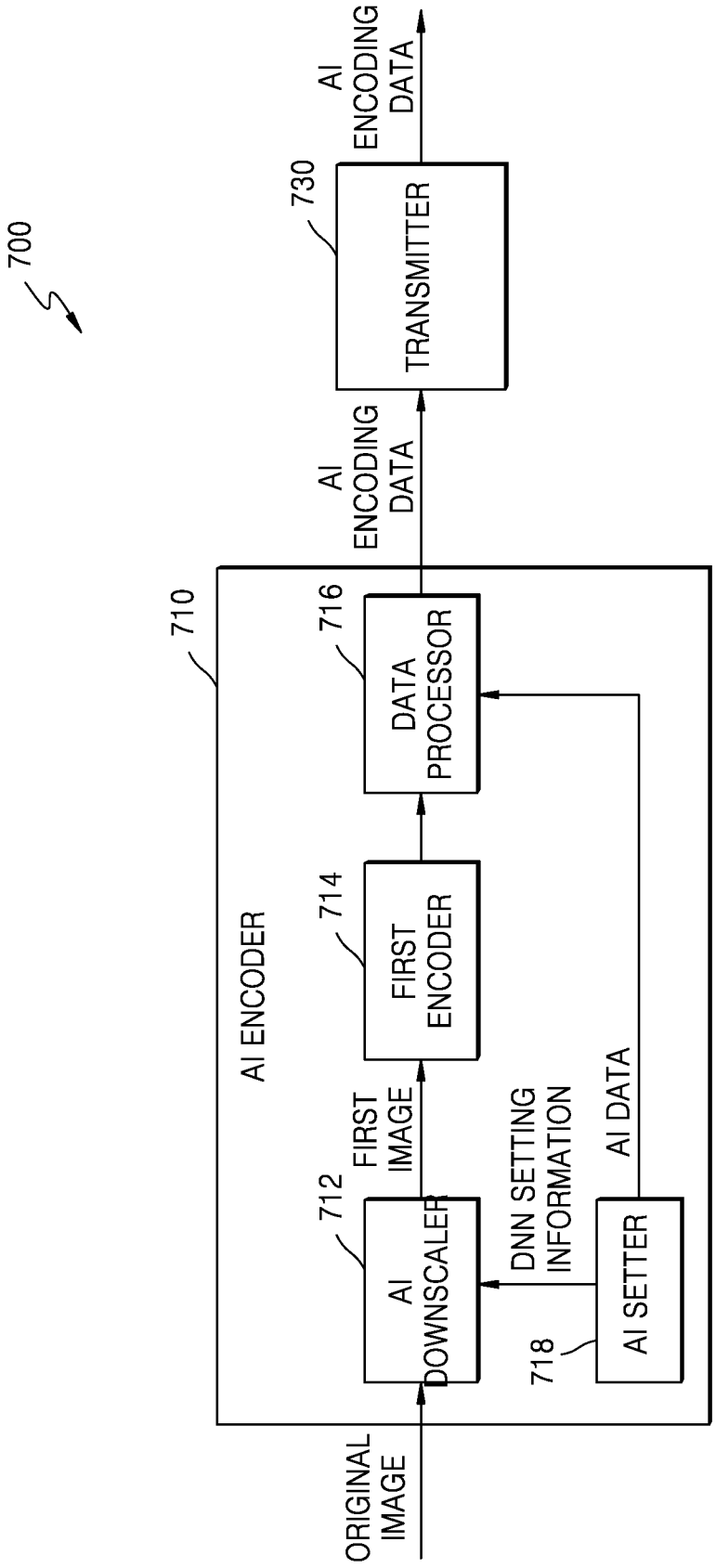
FIG. 7 is a block diagram of a configuration of an AI encoding apparatus according to an embodiment.

Each of the plurality of pieces of DNN setting information is jointly generated or obtained with corresponding DNN setting information of the first DNN used in an AI encoding apparatus 700 of FIG. 7, and the AI setter 238 obtains one piece of DNN information from among the plurality of pieces of DNN setting information according to an enlargement ratio corresponding to a reduction ratio of the DNN setting information of the first DNN. To achieve this, the AI setter 238 identifies information of the first DNN. In order for the AI setter 238 to identify the information of the first DNN, according to an embodiment, the AI decoding apparatus 200 receives AI data including the information of the first DNN from the AI encoding apparatus 700.

In other words, the AI setter 238 may identify information targeted by DNN setting information of the first DNN used to obtain the first image 115 by using pieces of information received from the AI encoding apparatus 700, and obtain DNN setting information of the second DNN jointly trained with the DNN setting information of the first DNN.

When DNN setting information for performing AI upscaling on the second image 135 is obtained from among the plurality of pieces of DNN setting information, the obtained DNN setting information may be transmitted to the AI upscaler 236, and then input data may be processed based on the second DNN operating according to the DNN setting information.

For example, when one piece of DNN setting information is obtained, the AI upscaler 236 may set, the number of filter kernels included in each of the first through third convolution layers 310, 330, and 350 of the second DNN 300 described with reference to FIG. 3, and parameters of each filter kernel as values included in the obtained DNN setting information.

In detail, parameters of a 3×3 filter kernel used in a convolution layer of the second DNN described with reference to FIG. 4 are set to {1, 1, 1, 1, 1, 1, 1, 1, 1}, and when DNN setting information is changed afterwards, the AI upscaler 236 may replace the parameters of the 3×3 filter kernel with {2, 2, 2, 2, 2, 2, 2, 2, 2} that are parameters included in the changed DNN setting information.

The AI setter 238 may obtain, based on information included in AI data, DNN setting information for performing AI upscaling on the second image 135 from among the plurality of pieces of DNN setting information. The AI data used to obtain the DNN setting information will now be described in detail.

In an embodiment, the AI setter 238 may obtain, based on differential information included in the AI data, DNN setting information for performing AI upscaling on the second image 135 from among the plurality of pieces of DNN setting information. For example, when it is determined, based on the differential information, that the resolution (e.g., 4K (4096×2160)) of the original image 105 is twice as high as the resolution (e.g., 2K (2048×1080)) of the first image 115, the AI setter 238 may obtain DNN setting information for doubling the resolution of the second image 135.

In another embodiment, the AI setter 238 may obtain, based on information related to the first image 115 included in the AI data, DNN setting information for performing AI upscaling on the second image 135 from among the plurality of pieces of DNN setting information. The AI setter 238 may determine in advance a mapping relationship between pieces of image-related information and pieces of DNN setting information, and obtain DNN setting information mapped to information related to the first image 115.

FIG. 5 is a table illustrating a mapping relationship between several pieces of image-related information and several pieces of DNN setting information according to an embodiment.

As shown in FIG. 5, it can be seen that AI encoding/AI decoding processes according to an embodiment do not take into account only a change in resolution. Rather, DNN setting information may be selected individually or comprehensively considering at least one of a resolution such as standard definition (SD), high definition (HD), or full HD, a bitrate such as 10 Mbps, 15 Mbps, or 20 Mbps, or codec information such as AV1, H.264, or HEVC. For such consideration of the resolution, the bitrate and the codec information, training considering the respective factors is jointly performed with encoding and decoding processes during an AI training process (see FIG. 11).

Accordingly, when a plurality of pieces of DNN setting information are provided based on image-related information including a codec type, a resolution of an image, etc., as shown in FIG. 5, according to details of training, DNN setting information for performing AI upscaling on the second image 135 may be obtained based on information related to the first image 115 received during an AI decoding process.

In other words, the AI setter 238 may use DNN setting information according to image-related information by matching the image-related information on the left side of the table of FIG. 5 to the DNN setting information on the right side thereof.

As illustrated in FIG. 5, when it is determined, from information related to the first image 115, that a resolution of the first image 115 is SD, a bitrate of image data obtained as a result of performing first encoding on the first image 115 is 10 Mbps, and the first encoding is performed on the first image 115 via an AV1 codec, the AI setter 238 may obtain DNN setting information A from among the plurality of pieces of DNN setting information.

Furthermore, when it is determined, from the information related to the first image 115, that the resolution of the first image 115 is HD, the bitrate of the image data obtained as a result of performing the first encoding is 15 Mbps, and the first encoding is performed with an H.264 codec, the AI setter 238 may obtain DNN setting information B from among the plurality of pieces of DNN setting information.

Furthermore, when it is determined, from the information related to the first image 115, that the resolution of the first image 115 is full HD, the bitrate of the image data obtained as a result of performing the first encoding is 20 Mbps, and the first encoding is performed with an HEVC codec, the AI setter 238 may obtain DNN setting information C from among the plurality of pieces of DNN setting information, and when it is determined therefrom that the resolution of the first image 115 is full HD, the bitrate of the image data obtained as a result of performing the first encoding is 15 Mbps, and the first encoding is performed with a HEVC codec, the AI setter 238 may obtain DNN setting information D from among the plurality of pieces of DNN setting information. One of the DNN setting information C and the DNN setting information D is selected based on whether the bitrate of the image data obtained as a result of performing the first encoding on the first image 115 is 20 Mbps or 15 Mbps. When the first encoding is performed on the first image 115 with the same resolution via the same codec, different bitrates of obtained image data indicates different qualities of reconstructed images. Thus, first and second DNNs may be jointly trained based on a certain image quality, and accordingly, the AI setter 238 may obtain DNN setting information according to a bitrate of image data indicating a quality of the second image 135.

In another embodiment, the AI setter 238 may obtain DNN setting information for performing AI upscaling on the second image 135 from among the plurality of pieces of DNN setting information by taking into account both information (prediction mode information, motion information, QP information, etc.) provided by the first decoder 234 and information related to the first image 115, which is included in AI data. For example, the AI setter 238 may receive, from the first decoder 234, QP information used during a first encoding process performed on the first image 115, identify, from AI data, a bitrate of image data obtained as a result of the first encoding of the first image 115, and obtain DNN setting information corresponding to the QP information and the bitrate. Even when bitrates of image data are the same, image qualities of reconstructed images may be different according to a complexity of images, and because a bitrate is a representative value of the entire first image 115 on which first encoding is performed, a quality of each frame may vary even within the first image 115. Thus, DNN setting information that is more suitable for the second image 135 may be obtained when taking into consideration, together with AI data, prediction mode information, motion information, and/or a QP that are to be obtained for each frame from the first decoder 234, compared to when using only the AI data.

Furthermore, according to an embodiment, the AI data may include a mutually agreed identifier of DNN setting information. An identifier of DNN setting information is an upscaling target corresponding to a downscaling target for the first DNN, and is information for distinguishing a pair of pieces of DNN setting information obtained via joint training between the first and second DNNs so that AI upscaling is performed on the second image 135. The AI setter 238 may obtain an identifier of DNN setting information, which is included in AI data, and then the DNN setting information corresponding to the identifier, and the AI upscaler 236 may perform AI upscaling on the second image 135 by using the DNN setting information corresponding to the identifier. For example, identifiers respectively indicating a plurality of pieces of DNN setting information settable in the first DNN and identifiers respectively indicating a plurality of pieces of DNN setting information settable in the second DNN may be previously designated. In this case, the same identifier may be designated for a pair of pieces of DNN setting information respectively settable in the first and second DNNs. The AI data may include an identifier of DNN setting information set in the first DNN for AI downscaling of the original image 105. The AI setter 238 that has received the AI data may obtain DNN setting information indicated by an identifier included in the AI data from among a plurality of pieces of DNN setting information, and the AI upscaler 236 may perform AI upscaling on the second image 135 by using the DNN setting information.

Furthermore, according to an embodiment, the AI data may include DNN setting information. The AI setter 238 may obtain the DNN setting information included in the AI data, and the AI upscaler 236 may perform AI upscaling on the second image 135 by using the DNN setting information.

According to an embodiment, when pieces of information (e.g., the number of convolution layers, the number of filter kernels for each convolution layer, parameters of each filter kernel, etc.) included in DNN setting information are stored in the form of a lookup table, the AI setter 238 may obtain DNN setting information by combining some values selected from among values in the lookup table based on information included in the AI data, and the AI upscaler 236 may perform AI upscaling on the second image 135 by using the DNN setting information.

According to an embodiment, when a DNN structure corresponding to an upscaling target is determined, the AI setter 238 may obtain DNN setting information, e.g., parameters of a filter kernel, corresponding to the determined DNN structure.

As described above, the AI setter 238 obtains DNN setting information of the second DNN based on the AI data including information related to the first DNN, and the AI upscaler 236 performs AI upscaling on the second image 135 via the second DNN configured with the obtained DNN setting information, and in this case, the amount of memory usage and the number of computations may be reduced compared to when features of the second image 135 are directly analyzed for upscaling.

In an embodiment, when the second image 135 is composed of a plurality of frames, the AI setter 238 may independently obtain DNN setting information for each certain number of frames (where the certain number is one or an integer greater than one), or obtain common DNN setting information for all of the frames.

Figure 6:
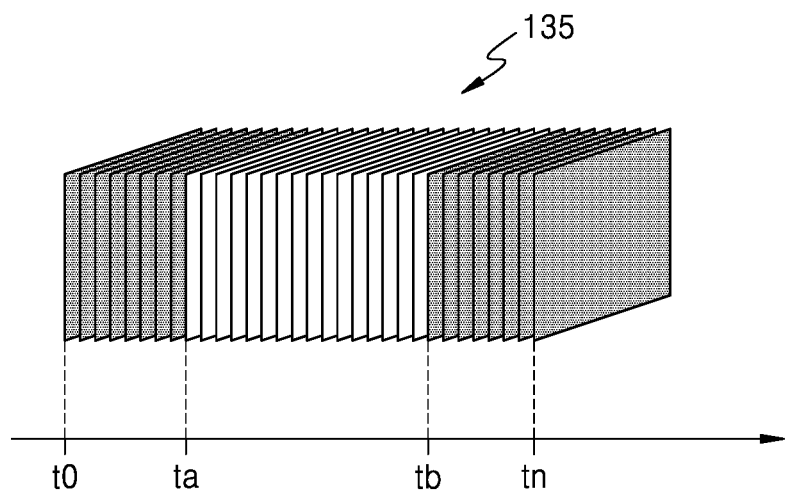
FIG. 6 is a diagram illustrating a second image composed of a plurality of frames according to an embodiment.

FIG. 6 is a diagram illustrating the second image 135 composed of a plurality of frames according to an embodiment.

Referring to FIG. 6, the second image 135 may include frames t0 through tn.

In an embodiment, the AI setter 238 may obtain DNN setting information of a second DNN based on AI data, and the AI upscaler 236 may perform AI upscaling on the frames t0 through tn based on the DNN setting information. In other words, the frames t0 through tn may undergo AI upscaling based on common DNN setting information.

In another embodiment, the AI setter 238 may obtain, from the AI data, DNN setting information 'A' for some of the frames t0 through tn, e.g., frames t0 through ta while obtaining DNN setting information 'B' for frames ta+1 through tb therefrom. Furthermore, the AI setter 238 may obtain, from the AI data, DNN setting information 'C' for frames tb+1 through tn. In other words, the AI setter 238 may independently obtain DNN setting information for each group including a certain number of frames (where the certain number is one or an integer greater than one) from among a plurality of frames, and the AI upscaler 236 may perform AI upscaling on frames included in each group by using independently-obtained DNN setting information.

In another embodiment, the AI setter 238 may independently obtain DNN setting information for each frame constituting the second image 135. In other words, when the second image 135 is composed of three frames, i.e., first through third frames, the AI setter 238 may obtain DNN setting information with respect to a first frame, DNN setting information with respect to a second frame, and DNN setting information with respect to a third frame. In other words, DNN setting information may be independently obtained for each of the first through third frames. DNN setting information may be independently obtained for each frame constituting the second image 135 according to a method of obtaining the DNN setting information based on the information provided by the first decoder 234 (prediction mode information, motion information, QP information, etc.) and the information related to the first image 115, which is included in the AI data. This is because the mode information, the QP information, etc. may be determined independently for each frame constituting the second image 135.

In another embodiment, the AI data may include information indicating up to which frame DNN setting information obtained based on the AI data is valid. For example, when the AI data includes information indicating that DNN setting information is valid up to the frame ta, the AI setter 238 obtains DNN setting information based on the AI data, and the AI upscaler 236 performs AI upscaling on the frames t0 through ta by using the DNN setting information. Furthermore, when another piece of AI data includes information indicating that DNN setting information is valid up to the frame tn, the AI setter 238 may obtain DNN setting information based on the other piece of AI data, and the AI upscaler 236 may perform AI upscaling on the frames ta+1 through tn by using the obtained DNN setting information.

The AI encoding apparatus 700 for performing AI encoding on the original image 105 will now be described with reference to FIG. 7.

FIG. 7 is a block diagram of a configuration of the AI encoding apparatus 700 according to an embodiment.

Referring to FIG. 7, the AI encoding apparatus 700 may include an AI encoder 710 and a transmitter 730. The AI encoder 710 may include an AI downscaler 712, a first encoder 714, a data processor 716, and an AI setter 718.

Although FIG. 7 shows that the AI encoder 710 and the transmitter 730 are separate devices, the AI encoder 710 and the transmitter 730 may be implemented as a single processor. In this case, the AI encoder 710 and the transmitter 730 may be implemented as a dedicated processor or through a combination of software and a general-purpose processor such as an AP, a CPU, or a GPU. Furthermore, when the AI encoder 710 and the transmitter 730 are implemented as a dedicated processor, the dedicated processor may include a memory for implementing an embodiment (e.g., for storing instructions executable by the processor to perform a method according to an embodiment) or a memory processor for using an external memory.

The AI encoder 710 and the transmitter 730 may also be configured as a plurality of processors. In this case, the AI encoder 710 and the transmitter 730 may be implemented via a combination of dedicated processors or a combination of software and multiple general-purpose processors such as an AP, a CPU, and a GPU.

In an embodiment, the first encoder 714 may be implemented as a first processor, the AI downscaler 712, the data processor 716, and the AI setter 718 may be implemented as a second processor different from the first processor, and the transmitter 730 may be implemented as a third processor different from the first and second processors. It is understood that this is just an example, and one or more other embodiments may implement the various components via any combination of one or more processors. The AI encoder 710 performs AI downscaling on the original image 105 and first encoding on the first image 115, and transmits AI encoding data to the transmitter 730. The transmitter 730 transmits the AI encoding data to the AI decoding apparatus 200.

Image data in the AI encoding data includes data obtained as a result of performing the first encoding on the first image 115. The image data may include data obtained based on pixel values in the first image 115, e.g., residual data corresponding to a difference between the first image 115 and prediction data with respect to the first image 115. Furthermore, the image data includes pieces of information used during the first encoding of the first image 115. For example, the image data may include prediction mode information, motion information, QP information, etc., which are used to perform the first encoding on the first image 115.

AI data in the AI encoding data includes pieces of information that enable the AI upscaler 236 to AI upscale the second image 135 to an upscaling target corresponding to a downscaling target for a first DNN. In an embodiment, the AI data may include differential information indicating a difference between the original image 105 and the first image 115. In an embodiment, the AI data may include information related to the first image 115. The information related to the first image 115 may include information about at least one of a resolution of the first image 115, a bitrate of the image data obtained as a result of performing the first encoding on the first image 115, or a type of a codec used during the first encoding of the first image 115.

In an embodiment, the AI data may include a mutually agreed identifier of DNN setting information so that the second image 135 is AI upscaled to an upscaling target corresponding to a downscaling target for the first DNN.

Furthermore, in an embodiment, the AI data may include DNN setting information settable in the second DNN.

The AI downscaler 712 may obtain the first image 115 by performing AI downscaling on the original image 105 via the first DNN. The AI downscaler 712 may perform the AI downscaling on the original image 105 by using DNN setting information provided by the AI setter 718. The AI setter 718 may determine a downscaling target for the original image 105, based on a predetermined criterion.

In order to obtain the first image 115 that matches the downscaling target, the AI setter 718 may store a plurality of pieces of DNN setting information settable in the first DNN. The AI setter 718 obtains DNN setting information corresponding to the downscaling target from among the plurality of pieces of DNN setting information and provides the obtained DNN setting information to the AI downscaler 712.

Each of the plurality of pieces of DNN setting information may be trained to obtain the first image 115 having a predetermined resolution and/or a predetermined quality. For example, one of the plurality of pieces of DNN setting information may include pieces of information for obtaining the first image 115 having half the resolution of the original image 105, e.g., the first image 115 having a 2K (2048×1080) resolution that is one-half a 4K (4096×2160) resolution of the original image 105, and another piece of DNN setting information may include pieces of information for obtaining the first image 115 having one-quarter of the resolution of the original image 105, e.g., the first image 115 having a 2K (2048×1080) resolution that is one-quarter of a 8K (8192×4320) resolution of the original image 105.

According to an embodiment, when pieces of information (e.g., the number of convolution layers, the number of filter kernels for each convolution layer, parameters of each filter kernel, etc.) included in DNN setting information are stored in the form of a lookup table, the AI setter 718 may provide, to the AI downscaler 712, DNN setting information obtained by combining some values selected from among values in the lookup table according to a downscaling target.

According to an embodiment, the AI setter 718 may determine a DNN structure corresponding to a downscaling target and obtain DNN setting information, e.g., parameters of a filter kernel, corresponding to the determined DNN structure.

The plurality of pieces of DNN setting information for performing the AI downscaling on the original image 105 may have optimized values through joint training of the first and second DNNs. In this case, each of the plurality of pieces of DNN setting information includes at least one of the number of convolution layers included in the first DNN, the number of filter kernels for each convolution layer, or parameters of each filter kernel.

The AI downscaler 712 may configure the first DNN with DNN setting information determined for performing the AI downscaling on the original image 105 and obtain the first image 115 with a certain resolution and/or a certain quality via the first DNN. When DNN setting information for performing the AI downscaling on the original image 105 is obtained from among the plurality of pieces of DNN setting information, each layer in the first DNN may process input data based on pieces of information included in the DNN setting information.

Hereinafter, a method, performed by the AI setter 718, of determining a downscaling target will be described. For example, the downscaling target may indicate to what extent the resolution of the original image 105 is to be decreased to obtain the first image 115.

The AI setter 718 obtains at least one piece of input information. In an embodiment, the input information may include at least one of a target resolution of the first image 115, a target bitrate of image data, a type of a bitrate of image data (e.g., a variable bitrate type, a constant bitrate type, an average bitrate type, or the like), a color format to which AI downscaling is applied (a luminance component, a chrominance component, a red component, a green component, a blue component, or the like), a codec type for performing first encoding on the first image 115, compression history information, a resolution of the original image 105, or a type of the original image 105.

The input information may include information prestored in the AI encoding apparatus 700 or received from a user.

The AI setter 718 controls an operation of the AI downscaler 712 based on the input information. In an embodiment, the AI setter 718 may determine a downscaling target based on the input information and provide DNN setting information corresponding to the determined downscaling target to the AI downscaler 712.

In an embodiment, the AI setter 718 may transmit at least some of the input information to the first encoder 714 so that the first encoder 714 may perform the first encoding on the first image 115 based on a certain bitrate, a certain type of bitrate, and a certain codec.

In an embodiment, the AI setter 718 may determine a downscaling target based on at least one of a compression ratio (e.g., a resolution difference between the original image 105 and the first image 115, a target bitrate, or the like), a compression quality (e.g., a type of a bitrate), compression history information, or a type of the original image 105.

For example, the AI setter 718 may determine a downscaling target based on a compression ratio, a compression quality, or the like, which is preset or input by the user.

As another example, the AI setter 718 may determine a downscaling target by using compression history information stored in the AI encoding apparatus 700. For example, a compression ratio, an encoding quality, or the like preferred by the user may be determined based on compression history information usable by the AI encoding apparatus 700, and a downscaling target may be determined according to the encoding quality determined based on the compression history information. For example, the resolution, quality, etc. of the first image 115 may be determined according to an encoding quality that has been most frequently used based on the compression history information.

As another example, the AI setter 718 may determine a downscaling target based on an encoding quality that has been more frequently used than a certain (e.g., pre-determined) threshold value (e.g., an average of encoding qualities that have been more frequently used than the certain threshold value), as determined according to the compression history information.

As another example, the AI setter 718 may determine a downscaling target based on the resolution, type (e.g., a file format), etc. of the original image 105.

In an embodiment, when the original image 105 is composed of a plurality of frames, the AI setter 718 may independently obtain DNN setting information for each certain number of frames (where the certain number is one or an integer greater than one) and provide independently-obtained DNN setting information to the AI downscaler 712.

In an embodiment, the AI setter 718 may divide frames constituting the original image 105 into a certain number of groups, and independently determine DNN setting information for each group. The same piece or different pieces of DNN setting information may be determined for each group. The same number of frames or different numbers of frames may be included in each group.

In another embodiment, the AI setter 718 may independently determine DNN setting information for each frame constituting the original image 105. The same piece of DNN setting information or different pieces of DNN setting information may be determined for each frame.

Hereinafter, an example of a structure of a first DNN 800 on which AI downscaling is based will be described.

Figure 8:
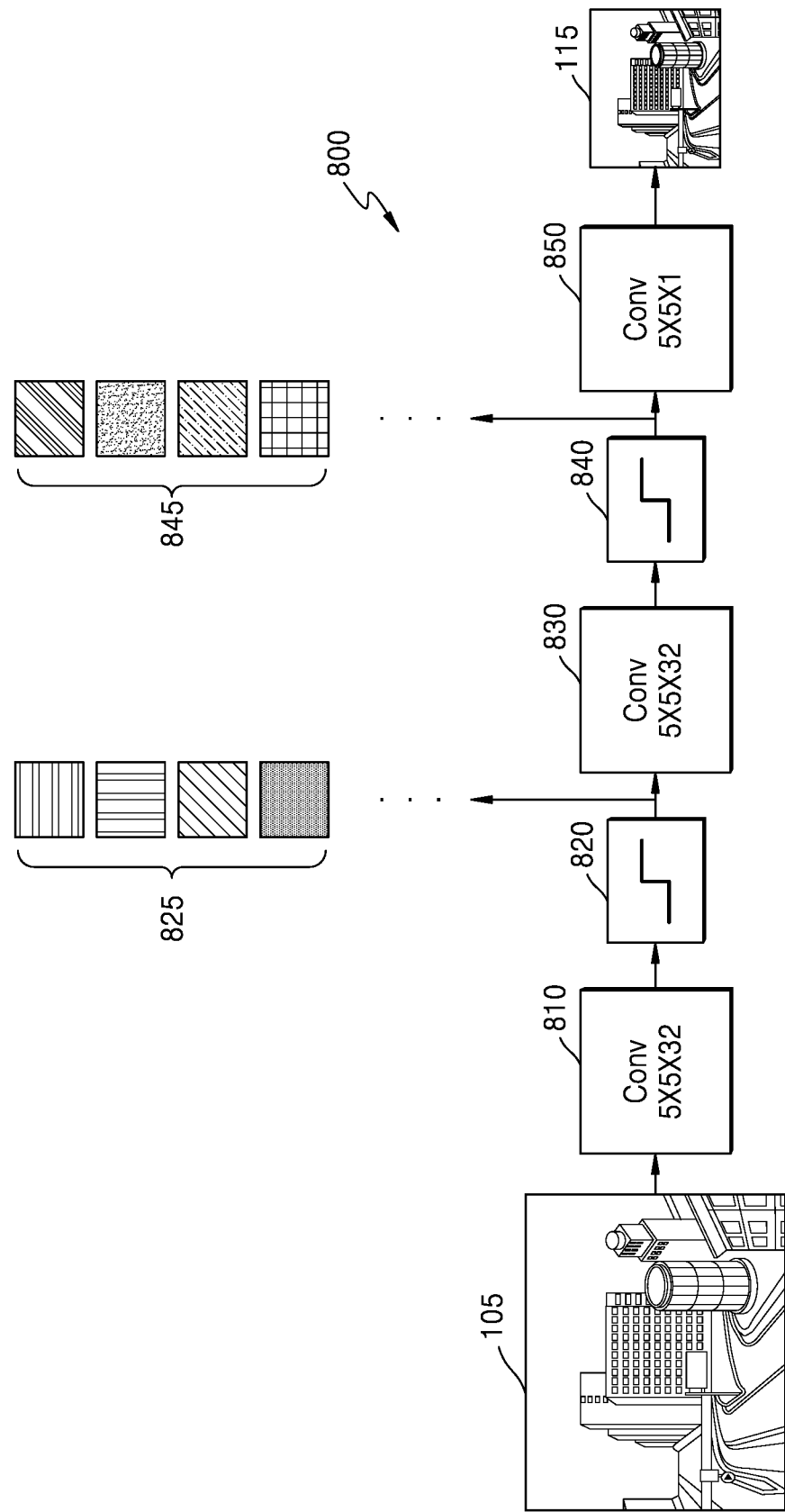
FIG. 8 is a diagram illustrating a first DNN for performing AI downscaling on an original image according to an embodiment.

FIG. 8 is a diagram illustrating the first DNN 800 for performing AI downscaling on the original image 105 according to an embodiment.

As shown in FIG. 8, the original image 105 is input to a first convolution layer 810. The first convolution layer 810 performs a convolution process on the original image 105 by using 32 filter kernels having a size of 5×5. 32 feature maps generated as a result of the convolution process are then input to a first activation layer 820. The first activation layer 820 may apply non-linear features to the 32 feature maps.

The first activation layer 820 determines whether to transmit sample values in feature maps output from the first convolution layer 810 to a second convolution layer 830. For example, some of the sample values of the feature maps are activated by the first activation layer 820 and transmitted to the second convolution layer 830, and some of the sample values are deactivated by the first activation layer 820 and not transmitted to the second convolution layer 830. Information represented by feature maps output from the first convolution layer 810 is emphasized by the first activation layer 820.

An output 825 of the first activation layer 820 is input to the second convolution layer 830. The second convolution layer 830 performs a convolution process on input data by using 32 filter kernels having a size of 5×5. 32 feature maps output as a result of the convolution process are then input to a second activation layer 840, and the second activation layer 840 may assign non-linear features to the 32 feature maps.

An output 845 of the second activation layer 840 is input to a third convolution layer 850. The third convolution layer 850 performs a convolution process on input data by using one filter kernel having a size of 5×5. As a result of the convolution process, an image may be output from the third convolution layer 850. The third convolution layer 850 is a layer for outputting a final image and generates one output by using the one filter kernel. According to an embodiment, the third convolution layer 850 may output the first image 115 as a result of a convolution operation.

There may be a plurality of pieces of DNN setting information, each piece of DNN setting information indicating the number of filter kernels in each of the first through third convolution layers 810, 830, and 850 of the first DNN 800, parameters of each filter kernel, etc., and the plurality of pieces of DNN setting information of the first DNN are jointly trained with a plurality of pieces of DNN setting information of a second DNN. A joint relationship between the plurality of pieces of DNN setting information of the first DNN 800 and the plurality of pieces of DNN setting information of the second DNN may be implemented via joint training of the first DNN 800 and the second DNN.

Although FIG. 8 shows that the first DNN 800 includes the three convolution layers (the first through third convolution layers 810, 830, and 850) and two activation layers (the first and second activation layers 820 and 840), this is merely an example, and the number of convolution layers and the number of activation layers may vary according to an embodiment. Furthermore, according to an embodiment, the first DNN 800 may be implemented as an RNN. In this case, a CNN structure of the first DNN 800 according to an embodiment is changed to an RNN structure.

In an embodiment, the AI downscaler 712 may include at least one ALU for performing a convolution operation and an arithmetic operation at each activation layer. The ALU may be implemented as a processor. For the convolution operation, the ALU may include a multiplier that performs multiplication between sample values of the original image 105 or a feature map output from a previous layer and sample values of a filter kernel, and an adder that adds together results of the multiplication. Furthermore, for the arithmetic operation at each activation layer, the ALU may include a multiplier that multiplies an input sample value by a weight used in a predetermined sigmoid, Tan h, or ReLU function, and a comparator that compares a result of the multiplication with a preset value to determine whether to transmit the input sample value to a next layer.

Referring back to FIG. 7, the AI setter 718 transmits AI data to the data processor 716. The AI data includes pieces of information that enable the AI upscaler 236 to AI upscale the second image 135 to an upscaling target corresponding to a downscaling target for a first DNN. The first encoder 714 that has received the first image 115 from the AI downscaler 712 may perform first encoding on the first image 115 according to an image compression method based on frequency transformation to thereby reduce the amount of information contained in the first image 115. Image data is obtained as a result of the first encoding via a certain codec (e.g., MPEG-2, H.264, MPEG-4, HEVC, VC-1, VP8, VP9, AV1, etc.). The image data is obtained according to rules of the certain codec, i.e., a syntax thereof. For example, the image data may include residual data corresponding to a difference between the first image 115 and prediction data with respect to the first image 115, as well as prediction mode information, motion information, QP related information, which are used to perform the first encoding on the first image 115. The image data obtained as a result of the first encoding by the first encoder 714 is provided to the data processor 716.

The data processor 716 generates AI encoding data including the image data received from the first encoder 714 and the AI data received from the AI setter 718.

In an embodiment, the data processor 716 may generate the AI encoding data including the image data and the AI data separated from each other. For example, the AI data may be included in a VSIF within an HDMI stream.

In another embodiment, the data processor 716 may include AI data in image data obtained as a result of the first encoding by the first encoder 714 and generate AI encoding data including the image data. For example, the data processor 716 may generate image data in the form of a single bitstream by combining a bitstream corresponding to image data with a bitstream corresponding to AI data. To achieve this, the data processor 716 may represent the AI data as bits having a value of 0 or 1, i.e., a bitstream. In an embodiment, the data processor 716 may include a bitstream corresponding to AI data in SEI which is an additional information area of a bitstream obtained as a result of the first encoding.

The AI encoding data is transmitted to the transmitter 730. The transmitter 730 transmits AI encoding data obtained as a result of AI encoding via a network. In an embodiment, the AI encoding data may be stored in data storage media including a magnetic medium such as a hard disk, a floppy disk, or a magnetic tape, an optical recording medium such as CD-ROM or DVD, a magneto-optical medium such as a floptical disk, etc.

Figure 9:
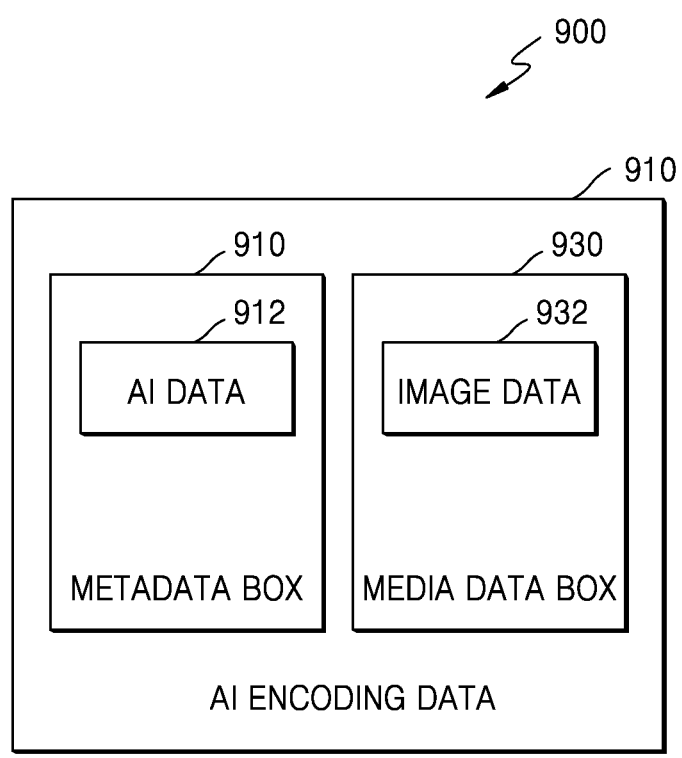
FIG. 9 illustrates a structure of AI encoding data according to an embodiment.

FIG. 9 illustrates a structure of AI encoding data 900 according to an embodiment.

As described above, AI data 912 and image data 932 may be separately included in the AI encoded data 900. In this case, the AI encoding data 900 may be in a container format such as MP4, AVI, MKV, or FLV. The AI encoding data 900 may include a metadata box 910 and a media data box 930.

The metadata box 910 includes information about the image data 932 included in the media data box 930. For example, the metadata box 910 may include information about at least one of a type of the first image 115, a type of a codec used for encoding the first image 115, or a playback time (reproduction duration) of the first image 115. Furthermore, the metadata box 910 may include the AI data 912. The AI data 912 may be encoded according to an encoding scheme provided in a container format and stored in the metadata box 910.

The media data box 930 may include image data 932 generated according to a syntax of an image compression scheme.

Figure 10:
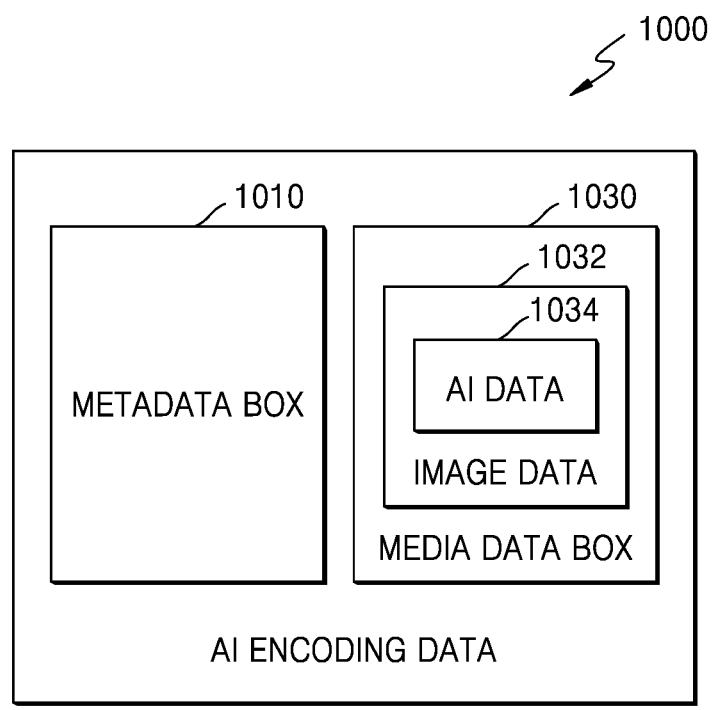
FIG. 10 illustrates a structure of AI encoding data according to another embodiment.

FIG. 10 illustrates a structure of AI encoding data 1000 according to another embodiment.

Referring to FIG. 10, AI data 1034 may be included in image data 1032. The AI encoding data 1000 may include a metadata box 1010 and a media data box 1030, and when the AI data 1034 is included in the image data 1032, the AI data 1034 may not be included in the metadata box 1010.

The image data 1032 containing the AI data 1034 is included in the media data box 1030. For example, the AI data 1034 may be included in an additional information area of the image data 1032.

A method of performing joint training of the first and second DNNs 800 and 300 will now be described with reference to FIG. 11.

Figure 11:
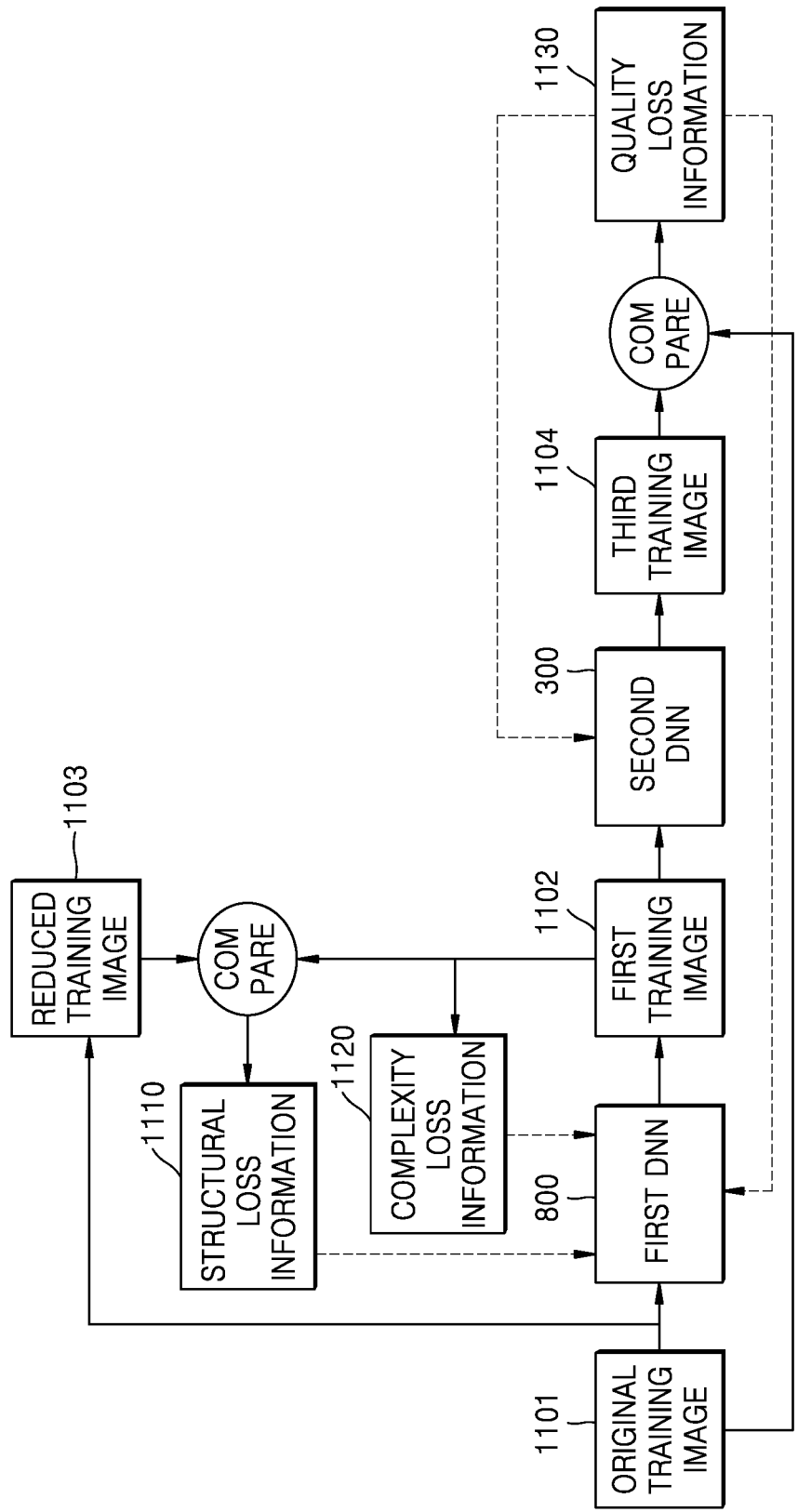
FIG. 11 is a diagram for describing a method of training a first DNN and a second DNN according to an embodiment.

FIG. 11 is a diagram for a method of performing joint training of the first and second DNNs 800 and 300.

In an embodiment, the original image 105 that has undergone AI encoding via an AI encoding process is reconstructed to the third image 145 through an AI decoding process, and in order to maintain similarity between the original image 105 and the third image 145 obtained as a result of the AI decoding, a joint relationship exists between the AI encoding process and the AI decoding process. In other words, information lost during the AI encoding process is be restored during the AI decoding process, and for this purpose, joint training of the first and second DNNs 800 and 300 is performed.

For accurate AI decoding, quality loss information 1130 corresponding to a result of comparison between a third training image 1104 and an original training image 1101 shown in FIG. 11 eventually needs to be reduced. Thus, the quality loss information 1130 is used for both training of the first DNN 800 and training of the second DNN 300.

First, a training process shown in FIG. 11 will be described.

In FIG. 11, the original training image 1101 is an image on which AI downscaling is to be performed, and a first training image 1102 is an image obtained by performing AI downscaling on the original training image 1101. Furthermore, the third training image 1104 is an image obtained by performing AI upscaling on the first training image 1102.

The original training image 1101 includes a still image or a moving image composed of a plurality of frames. In an embodiment, the original training image 1101 may include a luminance image extracted from the still image or the moving image composed of the plurality of frames. Furthermore, in an embodiment, the original training image 1101 may include a patch image extracted from the still image or the moving image composed of the plurality of frames. When the original training image 1101 is composed of a plurality of frames, each of the first training image 1102, a second training image, and the third training image 1104 also includes a plurality of frames. When the plurality of frames in the original training image 1101 are sequentially input to the first DNN 800, a plurality of frames in each of the first training image 1102, the second training image, and the third training image 1104 may be sequentially obtained via the first and second DNNs 800 and 300.

For joint training of the first and second DNNs 800 and 300, the original training image 1101 is input to the first DNN 800. The first training image 1102 is output by performing AI downscaling on the original training image 1101 input to the first DNN 800, and is then input to the second DNN 300. The third training image 1104 is output as a result of performing AI upscaling on the first training image 1102.

Although FIG. 11 shows that the first training image 1102 is input to the second DNN 300, according to an embodiment, the second training image obtained by performing first encoding and first decoding on the first training image 1102 may be input to the second DNN 300. In order to input the second training image to the second DNN 300, one codec among MPEG-2, H.264, MPEG-4, HEVC, VC-1, VP8, VP9, AV1, etc., may be used. In detail, one codec among MPEG-2, H. 264, MPEG-4, HEVC, VC-1, VP8, VP9, AV1, etc., may be used to perform first encoding on the first training image 1102 and first decoding on image data corresponding to the first training image 1102.

Referring to FIG. 11, separately from the first training image 1102 being output via the first DNN 800, a reduced training image 1103 is obtained by performing legacy downscaling on the original training image 1101. In this case, the legacy downscaling may include at least one of bilinear scaling, bicubic scaling, Lanczos scaling, or stairstep scaling.

The reduced training image 1103 in which structural features of the original training image 1101 are preserved is obtained in order to prevent structural features of the first image 115 from deviating greatly from structural features of the original image 105.

Before training is performed, the first and second DNNs 800 and 300 may be each configured with predetermined DNN setting information. As the training progresses, structural loss information 1110, complexity loss information 1120, and quality loss information 1130 may be determined.

The structural loss information 1110 may be determined based on a result of comparing the reduced training image 1103 with the first training image 1102. For example, the structural loss information 1110 may correspond to a difference between structural information of the reduced training image 1103 and structural information of the first training image 1102. Structural information may include various features that are to be extracted from an image, such as luminance, contrast, histogram, etc. of the image. The structural loss information 1110 indicates to what extent structural information of the original training image 1101 is preserved in the first training image 1102. The smaller the value of the structural loss information 1110, the more similar the structural information of the first training image 1102 is to the structural information of the original training image 1101.

The complexity loss information 1120 may be determined based on spatial complexity of the first training image 1102. For example, a total variance value of the first training image 1102 may be used as spatial complexity. The complexity loss information 1120 is related to a bitrate of image data obtained by performing first encoding on the first training image 1102. The smaller the value of the complexity loss information 1120, the lower the bitrate of the image data.

The quality loss information 1130 may be determined based on a result of comparing the original training image 1101 with the third training image 1104. The quality loss information 1130 may include at least one of an L1-norm value, an L2-norm value, a structural similarity index metric (SSIM) value, a peak signal-to-noise ratio-human vision system (PSNR-HVS) value, a multiscale SSIM (MS-SSIM) value, a variance inflation factor (VIF) value, or a video multimethod assessment fusion (VMAF) value, each of the values indicating a difference between the original training image 1101 and the third training image 1104. The quality loss information 1130 indicates how similar the third training image 1104 is to the original training image 1101. The smaller the value of the quality loss information 1130, the more similar the third training image 1104 is to the original training image 1101.

Referring to FIG. 11, the structural loss information 1110, the complexity loss information 1120 and the quality loss information 1130 are used to train the first DNN 800, and the quality loss information 1130 is used to train the second DNN 300. In other words, the quality loss information 1130 is used to train both the first DNN 800 and the second DNN 300.

The first DNN 800 may update parameters such that final loss information determined based on the structural loss information 1110, the complexity loss information 1120, and the quality loss information 1130 is reduced or minimized. Furthermore, the second DNN 300 may update parameters such that the quality loss information 1130 is reduced or minimized.

Pieces of final loss information respectively used for training the first and second DNNs 800 and 300 may be determined by using Equation 1 below:

$$LossDS = a*\text{Structural loss information} + b*\text{Complexity loss information} + c*\text{Quality loss information} \quad LossUS = d*\text{Quality loss information} \quad \text{[Equation 1]}$$

In Equation 1, LossDS represents final loss information that needs to be reduced or minimized to train the first DNN 800, and LossUS represents final loss information that needs to be reduced or minimized to train the second DNN 300. Also, a, b, c and d may be predetermined weights.

In other words, the first DNN 800 updates parameters in a direction such that LossDS determined by using Equation 1 is reduced, and the second DNN 300 updates parameters in a direction such that LossUS is reduced. When the parameters of the first DNN 800 are updated according to LossDS derived during the training, the first training image 1102 obtained based on the updated parameters becomes different from a previous first training image 1102 obtained during previous training, and accordingly, the third training image 1104 also becomes different from a previous third training image 1104 obtained during the previous training. When the third training image 1104 becomes different from the previous third training image 1104, the quality loss information 1130 is also newly determined, and the second DNN 300 updates the parameters according to the newly determined quality loss information. When the quality loss information 1130 is newly determined, LossDS is also newly determined, and the first DNN 800 updates the parameters according to the newly determined LossDS. In other words, updating of the parameters of the first DNN 800 results in updating of the parameters of the second DNN 300, and updating of the parameters of the second DNN 300 results in updating of the parameters of the first DNN 800. Thus, because the first and second DNNs 800 and 300 are jointly trained by sharing the quality loss information 1130, the parameters of the first DNN 800 and the parameters of the second DNN 300 may be jointly optimized.

As seen in Equation 1, LossUS is determined according to the quality loss information 1130, but this is merely an example and LossUS may be determined based on at least one of the structural loss information 1110 or the complexity loss information 1120, and the quality loss information 1130.

While it has been described above that the AI setter 238 of the AI decoding apparatus 200 and the AI setter 718 of the AI encoding apparatus 700 each store a plurality of pieces of DNN setting information, a method of training a plurality of pieces of DNN setting information stored in each of the AI setters 238 and 718 will now be described.

As described with reference to Equation 1, the first DNN 800 updates the parameters by taking into account the degree of similarity (the structural loss information 1110) between the structural information of the first training image 1102 and the structural information of the original training image 1101, a bitrate (the complexity loss information 1120) of the image data obtained as a result of performing the first encoding on the first training image 1102, and a difference (the quality loss information 1130) between the third training image 1104 and the original training image 1101.

In detail, the parameters of the first DNN 800 may be updated such that the first DNN 800 may obtain the first training image 1102 having similar structural information to that of the original training image 1101 and with a low bitrate of image data obtained by performing first encoding thereon and at the same time, the second DNN 300 may obtain the third training image 1104 similar to the original training image 1101 as a result of performing AI upscaling on the first training image 1102.

A direction in which the parameters of the first DNN 800 are optimized may vary by adjusting the weights a, b, and c shown in Equation 1. For example, when a value of the weight b is determined to be high, the parameters of the first DNN 800 may be updated by prioritizing a low bitrate over high quality of the third training image 1104. Furthermore, when a value of the weight c is determined to be high, the parameters of the first DNN 800 may be updated by prioritizing a high quality of the third training image 1104 over a high bitrate or maintaining of the structural information of the original training image 1101.

In addition, the direction in which the parameters of the first DNN 800 are optimized may vary according to a type of a codec used to perform the first encoding on the first training image 1102. This is because the second training image to be input to the second DNN 300 may vary according to the type of a codec.

In other words, the parameters of the first DNN 800 may be updated jointly with the parameters of the second DNN 300 based on the weights a, b, and c, and the type of a codec for performing the first encoding on the first training image 1102. Thus, when the first and second DNNs 800 and 300 are trained after respectively determining the weights a, b, and c as certain values and determining the type of a codec as a certain type, the parameters of the first DNN 800 and parameters of the second DNN 300 that are jointly optimized may be determined.

Furthermore, when the first and second DNNs 800 and 300 are trained after changing the weights a, b, and c, and the type of a codec, the parameters of the first DNN 800 and the parameters of the second DNN 300 that are jointly optimized may be determined. In other words, when the first and second DNNs 800 and 300 are trained by changing values of the weights a, b, and c, and the type of a codec, a plurality of pieces of DNN setting information that are jointly trained may be determined by the first and second DNNs 800 and 300.

As described above with reference to FIG. 5, a plurality of pieces of DNN setting information of the first and second DNNs 800 and 300 may be mapped to pieces of information related to the first image 115. To set such a mapping relationship therebetween, first encoding may be performed on the first training image 1102 output from the first DNN 800 via a certain codec according to a certain bitrate and the second training image obtained by performing first decoding on a bitstream obtained as a result of the first encoding may be input to the second DNN 300. In other words, by training the first and second DNNs 800 and 300 after setting an environment such that the first encoding is performed on the first training image 1102 with a certain resolution via the certain codec according to the certain bitrate, a pair of pieces of DNN setting information, which are mapped to the resolution of the first training image 1102, a type of the codec used to perform the first encoding on the first training image 1102, and the bitrate of the bitstream obtained as a result of performing the first encoding on the first training image 1102, may be determined. By variously changing a resolution of the first training image 1102, a type of a codec used to perform the first encoding on the first training image 1102, and a bitrate of a bitstream obtained as a result of the first encoding of the first training image 1102, a mapping relationship between a plurality of pieces of DNN setting information of the first and second DNNs 300 and 800 and pieces of information related to the first image 115 may be determined.

Figure 12:
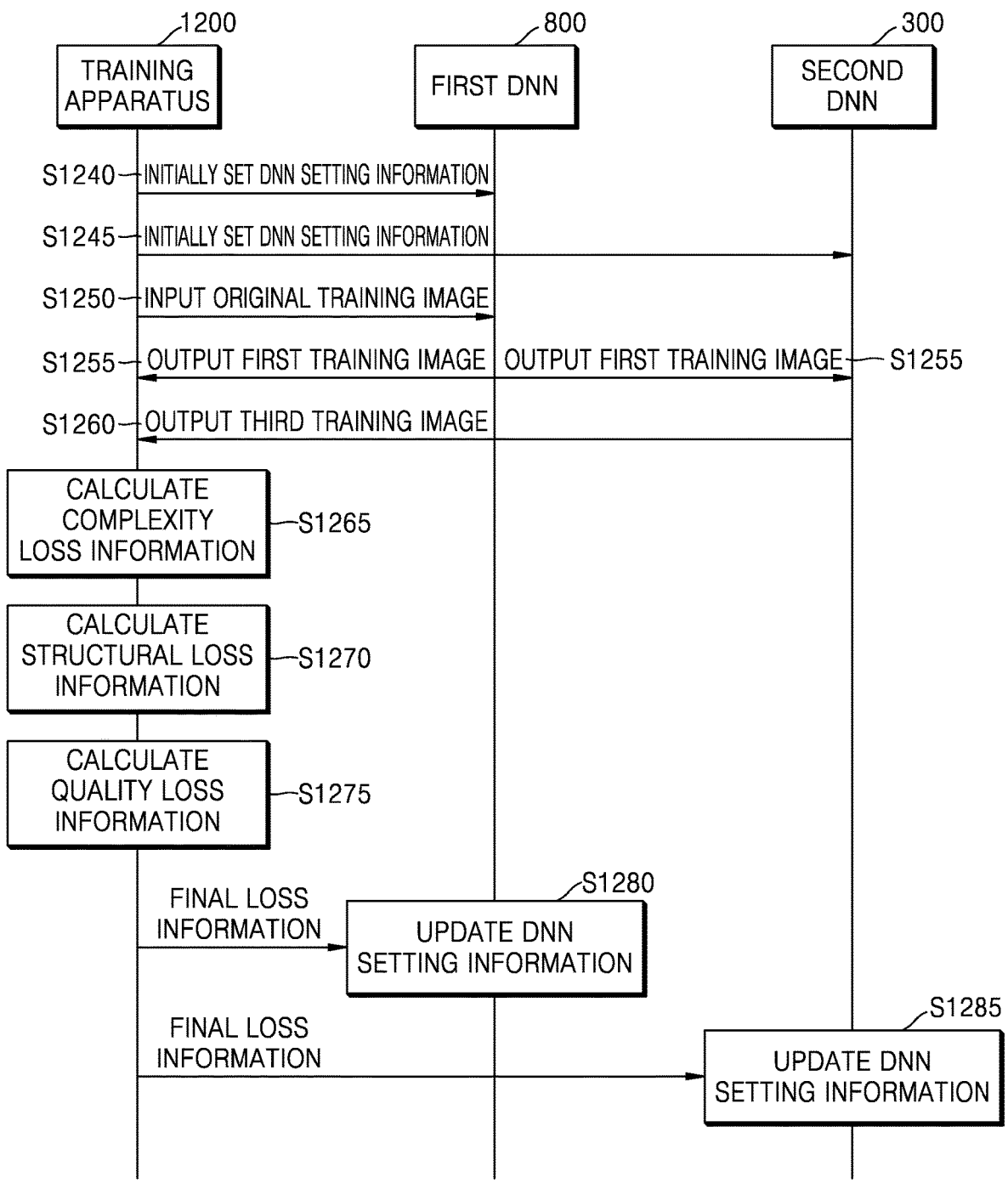
FIG. 12 is a diagram for describing a process, performed by a training apparatus, of training a first DNN and a second DNN according to an embodiment.

FIG. 12 is a diagram for describing a process, performed by a training apparatus 1200, of training the first DNN 800 and the second DNN 300 according to an embodiment.

The training of the first DNN 800 and the second DNN 300 described with reference to FIG. 11 may be performed by the training apparatus 1200. The training apparatus 1200 includes the first DNN 800 and the second DNN 300. The training apparatus 1200 may be, for example, the AI encoding apparatus 700 or a separate server. Pieces of DNN setting information of the second DNN 300 obtained as a result of training are stored in the AI decoding apparatus 200.

Referring to FIG. 12, the training apparatus 1200 initially sets DNN setting information of the first DNN 800 and DNN setting information of the second DNN 300 (operations S1240 and S1245). Accordingly, the first DNN 800 and the second DNN 300 may respectively operate according to the pieces of predetermined DNN setting information. DNN setting information may include information about at least one of the number of convolution layers included in each of the first DNN 800 and the second DNN 300, the number of filter kernels for each convolution layer, a size of filter kernels for each convolution layer, or parameters of each filter kernel.

The training apparatus 1200 inputs the original training image 1101 to the first DNN 800 (operation S1250). The original training image 1101 may include a still image or at least one frame constituting a moving image.

The first DNN 800 processes the original training image 1101 according to the initially-set DNN setting information and outputs the first training image 1102 obtained by performing AI downscaling on the original training image 1101 (operation S1255). Although FIG. 12 shows that the first training image 1102 is directly input to the second DNN 300, the first training image 1102 output from the first DNN 800 may be input to the second DNN 300 by the training apparatus 1200. Furthermore, the training apparatus 1200 may obtain a second training image by performing first encoding and first decoding on the first training image 1102 via a certain codec, and then input the second training image to the second DNN 300.

The second DNN 300 processes the first training image 1102 or the second training image according to the initially set DNN setting information and outputs the third training image 1104 obtained by performing AI upscaling on the first training image 1102 or the second training image (operation S1260).

The training apparatus 1200 calculates the complexity loss information 1120 based on the first training image 1102 (operation S1265).

The training apparatus 1200 calculates the structural loss information 1110 by comparing the reduced training image 1103 with the first training image 1102 (operation S1270).

The training apparatus 1200 calculates the quality loss information 1130 by comparing the original training image 1101 with the third training image 1104 (operation S1275).

The first DNN 800 updates the initially set DNN setting information through a back-propagation process based on final loss information (operation S1280). The training apparatus 1200 may calculate final loss information for training the first DNN 800, based on the complexity loss information 1120, the structural loss information 1110, and the quality loss information 1130.

The second DNN 300 updates the initially set DNN setting information via a back-propagation process based on the quality loss information 1130 or final loss information (operation S1285). The training apparatus 1200 may calculate the final loss information for training the second DNN 300, based on the quality loss information 1130.

Thereafter, the training apparatus 1200, the first DNN 800, and the second DNN 300 may iteratively repeat operations S1250 through S1285 until the pieces of final loss information are minimized to update corresponding pieces of DNN setting information. In this case, during each iteration, the first and second DNNs 800 and 300 operate respectively according to pieces of DNN setting information updated during the previous iteration.

Table 1 below illustrates effects obtained when AI encoding and AI decoding are performed on the original image 105 according to an embodiment and when encoding and decoding are performed on the original image 105 via an HEVC codec.

performing AI downscaling or AI one-to-one preprocessing on the original image. Furthermore, a "second image" refers to an image obtained via first decoding during an AI decoding process, and a "third image" refers to an image obtained by performing AI upscaling on the second image during the AI decoding process.

In addition, in the following description, "AI downscaling" refers to a process of decreasing, when an input image has a high resolution, the resolution of the input image based on AI, "AI one-to-one preprocessing" refers to processing for preserving or enhancing, when an input image has a low resolution, detailed features of the input image while maintaining the same resolution of the input image for AI upscaling of the input image, and "first encoding" refers to an encoding process using an image compression method based on frequency transformation. In addition, "first decoding" refers to a decoding process using an image reconstruction method based on frequency transformation, and "AI upscaling" refers to a process of increasing a resolution of an image based on AI.

Figure 13:
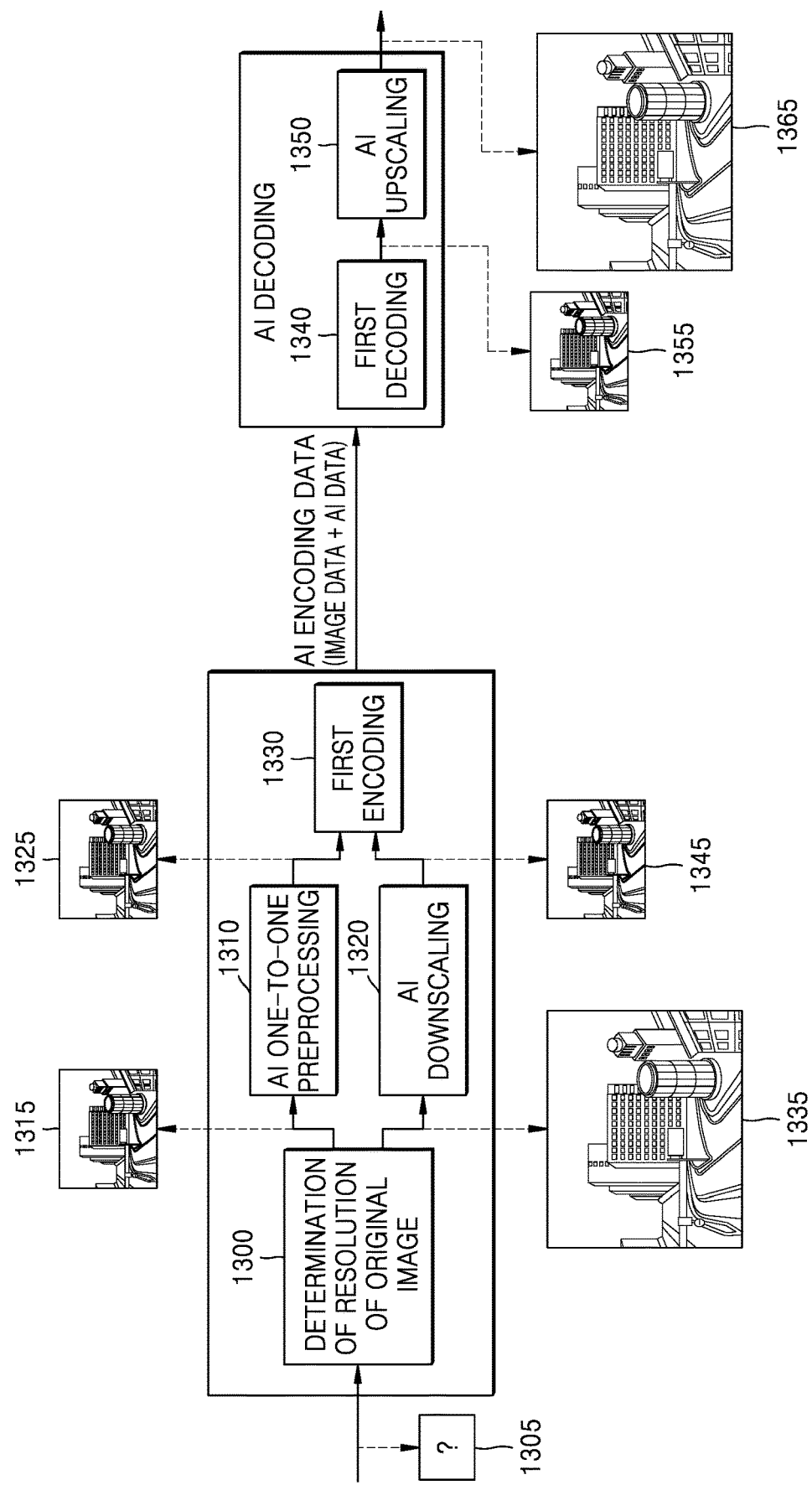
FIG. 13 is a diagram for describing an AI encoding process and an AI decoding process according to an embodiment.

FIG. 13 is a diagram for describing an AI encoding process and an AI decoding process according to an embodiment.

As shown in FIG. 13, according to an embodiment, a resolution of an original image 1305 is determined (1300).

When the resolution of the original image 1305 is higher than (or greater than or equal to) a predetermined value, a first image 1345 is obtained by performing AI downscaling 1320 on a high-resolution original image 1335. Furthermore, because first encoding 1330 and first decoding 1340 are sequentially performed on the first image 1345 having a relatively low resolution, a bit rate that is the number of bits to be processed may be significantly reduced compared to when the first encoding 1330 and the first decoding 1340 are performed on the high-resolution original image 1335.

When the resolution of the original image 1305 is lower than or equal to (or lower than) the predetermined value, a first image 1325 is obtained by performing AI one-to-one preprocessing 1310 on a low-resolution original image 1315. In addition, because the first encoding 1330 and the first decoding 1340 are performed on the first image 1325 in

| Content | Resolution | Number of frames | Information amount (Bitrate) (Mbps) | | Subjective image quality score (VMAF) | |
|---|---|---|---|---|---|---|
| | | | HEVC | AI encoding/ AI decoding | HEVC | AI encoding/ AI decoding |
| Content_01 | 8 K | 300 frames | 46.3 | 21.4 | 94.80 | 93.54 |
| Content_02 | (7680 × 4320) | | 46.3 | 21.6 | 98.05 | 98.98 |
| Content_03 | | | 46.3 | 22.7 | 96.08 | 96.00 |
| Content_04 | | | 46.1 | 22.1 | 86.26 | 92.00 |
| Content_05 | | | 45.4 | 22.7 | 93.42 | 92.98 |
| Content_06 | | | 46.3 | 23.0 | 95.99 | 95.61 |
| | | Average | 46.11 | 22.25 | 94.10 | 94.85 |

As seen in Table 1, although a subjective image quality calculated when AI encoding and AI decoding are performed on content composed of 300 frames having a 8K resolution according to an embodiment is higher than a subjective image quality when encoding and decoding are performed using a HEVC codec, a bitrate obtained according to the embodiment is reduced by more than 50% compared to when using the HEVC codec.

In the following description, an "original image" refers to an image on which AI encoding is to be performed, and a "first image" refers to an image obtained as a result of which the detailed features of the low-resolution original image 1315 are emphasized, it is possible to compensate information that is difficult to restore during upscaling of a low-resolution image. Because a low-resolution image has a large amount of information per unit area (e.g., per 32×32 patch) and thus a high degree of complexity compared to a high-resolution image, downscaling and then upscaling the low-resolution image may result in loss of information and degradation of image quality. Thus, for a low-resolution original image, it is necessary to increase memorization during upscaling by preserving detailed features of the original image through one-to-one preprocessing.

Referring to the AI encoding process in detail, with reference to FIG. 13, according to an embodiment, first, the resolution of the original image 1305 is determined (1300).

When the resolution of the original image 1305 is higher than the predetermined value, the first image 1345 is obtained by performing the AI downscaling 1320 on the high-resolution original image 1335, and the first encoding 1330 is performed on the first image 1345. In an AI decoding process, AI encoding data including AI data and image data obtained as a result of performing the AI encoding process is received, a second image 1355 is obtained through the first decoding 1340, and a third image 1365 is obtained by performing AI upscaling 1350 on the second image 1355.

On the other hand, when the resolution of the original image 1305 is lower than or equal to the predetermined value, the first image 1325 is obtained by performing the AI one-to-one preprocessing 1310 on the low-resolution original image 1315, and the first encoding 1330 is performed on the first image 1325. In the AI decoding process, AI encoding data including AI data and image data obtained as a result of the AI encoding is received, the second image 1355 is obtained through the first decoding 1340, and the third image 1365 is obtained by performing the AI upscaling 1350 on the second image 1355.

Referring to the AI encoding process in more detail, when the original image 1305 is input, first, the resolution of the original image 1305 is determined. When the resolution of the original image 1305 is higher than a predetermined value, the AI downscaling 1320 is performed on the high-resolution original image 1335 in order to obtain the first image 1345 having a certain resolution or quality. In this case, the AI downscaling 1320 is performed based on AI, and AI (e.g., DNN) for the AI downscaling 1320 is jointly trained with AI (e.g., DNN) for the AI upscaling 1350 of the second image 1355. This is because, when the AI for the AI downscaling 1320 is trained separately from the AI for the AI upscaling 1350, a difference between the high-resolution original image 1335 on which AI encoding is to be performed and the third image 1365 reconstructed through AI decoding becomes larger. When the resolution of the original image 1305 is lower than or equal to the predetermined value, the AI one-to-one preprocessing 1310 is performed on the low-resolution original image 1315 in order to obtain the first image 1325 in which the detailed features of the low-resolution original image 1315 are preserved. In this case, the AI one-to-one preprocessing 1310 is performed based on AI, and AI for the AI one-to-one preprocessing 1310 is jointly trained with the AI for the AI upscaling 1350. This is because, when the AI for the AI one-to-one preprocessing 1310 is trained separately from the AI for the AI upscaling 1350, the third image 1365 obtained by performing the AI upscaling 1350 through AI decoding may not contain the detailed features of the low-resolution original image 1315 on which AI encoding is to be performed. In this case, parameters of the AI for the AI upscaling 1350, which have been obtained after joint training with the AI for the AI downscaling 1320, are used without being updated. In other words, during the joint training of the AI for AI one-to-one preprocessing 1310 and the AI for the AI upscaling 1350, the parameters of the AI for the AI upscaling 1350, which have been obtained by performing the joint training with the AI for the AI downscaling 1320, are not updated but fixedly used. In detail, joint training of the AI for the AI upscaling 1350 and the AI for the AI downscaling 1320 is first performed, and joint training of the AI for the AI one-to-one preprocessing 1310 and the AI for the AI upscaling 1350 is then performed by using parameters of the AI for the AI upscaling 1350, which have been obtained as a result of the first joint training, to thereby obtain parameters of the AI for the AI one-to-one preprocessing 1310. By fixedly using, as parameters of the AI for the AI upscaling 1350, parameters obtained by performing joint training with the AI for the AI downscaling 1320, it is possible to obtain parameters of the AI for the AI one-to-one preprocessing 1310 capable of reflecting detailed features of a low-resolution image during upscaling while maintaining the performance of the AI for the AI upscaling 1350. When an original image has a low resolution, AI for AI upscaling is jointly trained with AI for AI one-to-one preprocessing by fixedly using parameters of the AI for the AI upscaling, which are obtained after joint training with AI for AI downscaling, such that parameters of the AI for the AI one-to-one preprocessing have the effect of simulating parameters of the AI for the AI downscaling. Thus, by providing, for a low-resolution original image, parameters of AI for AI one-to-one preprocessing, which simulate parameters of AI for AI downscaling, a content provider may effectively upscale the low-resolution original image to a high-resolution image without degradation of image quality.

In an embodiment, AI data may be used in order to maintain such a joint relationship between an AI encoding process and an AI decoding process. To this end, AI data obtained through the AI encoding process includes information indicating an upscaling target, and in the AI decoding process, the AI upscaling 1350 is performed on the second image 1355 according to the upscaling target identified based on the AI data.

AI for the AI one-to-one preprocessing 1310, AI for the AI downscaling 1320, and AI for the AI upscaling 1350 may each be implemented as a DNN. As described below with reference to FIG. 16, because a first DNN is jointly trained with a second DNN by sharing loss information under a certain target, when a resolution of an original image is higher than a predetermined value, an AI encoding apparatus may provide target information used during the joint training of the first and second DNNs to an AI decoding apparatus, and the AI decoding apparatus may perform the AI upscaling 1350 of the second image 1355 to a target quality and/or resolution based on the received target information.

After training the first and second DNNs, DNN setting information of the second DNN is fixed, and then a third DNN is jointly trained with the second DNN. Because the third DNN is jointly trained with the second DNN under a certain target by using the DNN setting information of the second DNN, which has been fixed after the joint training of the first and second DNNs, when the resolution of the original image is lower than or equal to the predetermined value, the AI encoding apparatus may provide target information used during the joint training of the third and second DNNs to the AI decoding apparatus, and the AI decoding apparatus may perform the AI upscaling 1350 of the second image 1355 to a target quality and/or resolution based on the received target information.

Referring to the first encoding 1330 and the first decoding 1340 shown in FIG. 13 in detail, the resolution of the original image 1305 is determined. When the resolution of the original image 1305 is higher than the predetermined value, the amount of information in the first image 1345 obtained by performing the AI downscaling 1320 on the high-resolution original image 1345 may be reduced through the first encoding 1330. On the other hand, when the resolution of the original image 1305 is lower than or equal to the predetermined value, the amount of information in the first image 1325 obtained by performing the AI one-to-one preprocessing on the low-resolution original image 1315 may be reduced through the first encoding 1330. The first encoding 1330 may include a process of generating prediction data by predicting the first image 1325 or 1345, a process of generating residual data corresponding to a difference between the first image 1325 or 1345 and the prediction data, a process of transforming the residual data from a spatial domain into a frequency domain component, a process of quantizing the residual data that has undergone the transformation into the frequency domain component, a process of entropy-encoding the quantized residual data, etc. The first encoding 1330 may be performed using one of image compression methods based on frequency transformation, such as MPEG-2, H.264 AVC, MPEG-4, HEVC, VC-1, VP8, VP9, AV1, etc.

The second image 1355 corresponding to the first image 1325 or 1345 may be reconstructed by performing the first decoding 1340 on image data. The first decoding 1340 may include a process of generating quantized residual data by entropy-decoding the image data, a process of inverse-quantizing the quantized residual data, a process of transforming the residual data from the frequency domain into a spatial domain component, a process of generating prediction data, a process of reconstructing the second image 1355 by using the prediction data and the residual data, etc. The first decoding 1340 may be performed using an image reconstruction method corresponding to one of the image compression methods based on frequency transformation, such as MPEG-2, H.264, MPEG-4, HEVC, VC-1, VP8, VP9, AV1, etc., which is used in the first encoding 1330.

AI encoding data obtained via the AI encoding process may include image data obtained as a result of performing the first encoding 1330 on the first image 1325 or 1345, and AI data related to the AI downscaling 1320 of the high-resolution original image 1335 or AI data related to the AI one-to-one preprocessing 1310 of the low-resolution original image 1315. The image data may be used during the first decoding 1340, and the AI data may be used during the AI upscaling 1350.

The image data may be transmitted in a form of a bitstream. The image data may include data obtained based on pixel values in the first image 1325 or 1345, e.g., residual data corresponding to a difference between the first image 1325 or 1345 and prediction data with respect to the first image 1325 or 1345. Furthermore, the image data includes pieces of information used during the first encoding 1330 of the first image 1325 or 1345. For example, the image data may include prediction mode information, motion information, QP related information, etc., which are used to perform the first encoding 1330 on the first image 1325 or 1345. The image data may be generated according to rules of an image compression method, e.g., a syntax thereof, which is used during the first encoding 1330 from among the image compression methods based on frequency transformation, such as MPEG-2, H.264 AVC, MPEG-4, HEVC, VC-1, VP8, VP9, AV1, etc.

The AI data is used in the AI upscaling 1350 based on the second DNN. As described above, because the first DNN is jointly trained with the second DNN and then the third DNN is jointly trained with the second DNN by using obtained DNN setting information of the second DNN, the AI data includes information that enables the AI upscaling 1350 to be accurately performed on the second image 1355 via the second DNN. During the AI decoding process, the second image 1355 may undergo the AI upscaling 1350 to a target resolution and/or a target quality based on the AI data.

The AI data may be transmitted in a form of a bitstream, together with the image data. Alternatively, according to an embodiment, the AI data may also be transmitted in a form of a frame or packet, separately from the image data.

Alternatively, according to an embodiment, the AI data may be included in the image data when it is transmitted.

The AI data and the image data may be transmitted over the same network or different networks.

An AI decoding apparatus for performing the AI decoding process described with reference to FIG. 13 may be configured in the same manner as the AI decoding apparatus 200 described above with reference to FIG. 2.

Referring back to FIG. 2, according to an embodiment, the AI decoding apparatus 200 may include the receiver 210 and the AI decoder 230. The AI decoder 230 may include the parser 232, the first decoder 234, the AI upscaler 236, and the AI setter 238.

Although FIG. 2 shows that the receiver 210 and the AI decoder 230 are separate devices, they may be implemented as a single processor. In this case, the receiver 210 and the AI decoder 230 may be implemented as a dedicated processor or through a combination of software and a general-purpose processor such as an AP, a CPU, or a GPU. Furthermore, when the receiver 210 and the AI decoder 230 are implemented as the dedicated processor, the dedicated processor may include a memory for implementing an embodiment (e.g., for storing instructions executable by the processor to perform a method according to an embodiment) or a memory processor for using an external memory.

The receiver 210 and the AI decoder 230 may also be configured as a plurality of processors. In this case, the receiver 210 and the AI decoder 230 may be implemented via a combination of dedicated processors or a combination of software and multiple general-purpose processors such as an AP, a CPU and a GPU. In an embodiment, the receiver 210 may be implemented as a first processor, the first decoder 234 may be implemented as a second processor different from the first processor, and the parser 232, the AI upscaler 236, and the AI setter 238 may be implemented was a third processor different from the first and second processors. It is understood that this is just an example, and one or more other embodiments may implement the various components via any combination of one or more processors.

The receiver 210 receives AI encoding data obtained as a result of AI encoding. For example, the AI encoding data may be a video file having a file format such as mp4 or mov.

The receiver 210 may receive the AI encoding data transmitted through a network. The receiver 210 outputs the AI encoding data to the AI decoder 230.

In an embodiment, the AI encoding data may be obtained from data storage media including a magnetic medium such as a hard disk, a floppy disk, or a magnetic tape, an optical recording medium such as CD-ROM or DVD, a magneto-optical medium such as a floptical disk, etc.

The parser 232 parses the AI encoding data and respectively transmits image data and AI data generated as a result of first encoding 1330 of the first image 1325 or 1345 to the first decoder 234 and the AI setter 238.

In an embodiment, the parser 232 may parse the image data and the AI data that are separately included in the AI encoding data. The parser 232 may distinguish the image data from the AI data by reading a header in the AI encoding data. For example, the AI data may be included in a VSIF within an HDMI stream.

Because the structure of AI encoding data including AI data and image data separated from each other has been described above with respect to FIG. 9, a detailed description thereof is not repeated below.

In another embodiment, the parser 232 may parse the image data from the AI encoding data, extract the AI data from the image data, and transmit the AI data to the AI setter 238 and the rest of the image data to the first decoder 234. In other words, the AI data may be included in the image data, and for example, the AI data may be included in SEI which is an additional information area of a bitstream corresponding to the image data. Because the structure of AI encoding data consisting of image data including AI data has been described above with reference to FIG. 10, a detailed description thereof is not repeated below.

In another embodiment, the parser 232 may split a bitstream corresponding to the image data into a bitstream to be processed by the first decoder 234 and a bitstream corresponding to AI data and respectively output the two bitstreams to the first decoder 234 and the AI setter 238.

The parser 232 may identify that the image data included in the AI encoding data is image data obtained via a certain codec (e.g., MPEG-2, H.264, MPEG-4, HEVC, VC-1, VP8, VP9, AV1, etc.). In this case, corresponding information may be transmitted to the first decoder 234 so that the image data may be processed via the identified codec.

The first decoder 234 reconstructs the second image 1355 corresponding to the first image 1325 or 1345 based on the image data received from the parser 232. The second image 1355 obtained by the first decoder 234 is then provided to the AI upscaler 236.

According to an embodiment, information related to first decoding, such as prediction mode information, motion information, QP information, etc., may be provided from the first decoder 234 to the AI setter 238. The information related to the first decoding may be used to obtain DNN setting information.

The AI data provided to the AI setter 238 of the AI decoding apparatus 200 for performing the AI decoding process illustrated in FIG. 13 includes pieces of information that enable AI upscaling to be performed on the second image 1355. In this case, an upscaling target corresponds to downscaling via the first DNN or one-to-one preprocessing via the third DNN. Accordingly, the AI data includes information for identifying a downscaling target for the first DNN or a one-to-one preprocessing target for the third DNN.

Detailed examples of pieces of information included in the AI data include differential information indicating a difference between a resolution of the high-resolution original image 1335 and a resolution of the first image 1345 obtained by performing downscaling, information related to the first image 1345, information about a resolution of the first image 1325 obtained by performing one-to-one preprocessing on the low-resolution original image 1315, and information related to the first image 1325.

The differential information may be represented as information about a degree of resolution conversion of the first image 1345 obtained by performing the downscaling compared to the resolution of the high-resolution original image 1335 (e.g., information about a resolution conversion ratio). Furthermore, because the resolution of the first image 1345 may be determined from a resolution of the reconstructed second image 1355 and the degree of resolution conversion may be determined through the resolution of the first image 1345, the differential information may be represented only as resolution information of the high-resolution original image 1335. In this case, the resolution information may be expressed as a screen size (in terms of width/height) or as a ratio (16:9, 4:3, etc.) and a size of one axis. Furthermore, when there is preset resolution information, the resolution information may be expressed in a form of an index or flag.

The information related to the first image 1345 may include information about at least one of a bitrate of image data obtained as a result of performing first encoding on the first image 1345 or a type of a codec used during the first encoding of the first image 1345.

In addition, because the resolution information of the first image 1325 obtained by performing the one-to-one preprocessing is the same as that of the low-resolution original image 1315 determined to have a resolution lower than the predetermined value in the determining of the resolution of the original image 1305 (1300), an upscaling target may be determined based on a predetermined criterion according to the resolution of the first image 1325 having a low resolution. For example, when the resolution of the first image 1325 obtained by performing the one-to-one preprocessing is 2K, the upscaling target may be determined to be 4K. Furthermore, the resolution information of the first image 1325 may be resolution difference information. In detail, because the resolution of the first image 1325 obtained by performing the one-to-one preprocessing is the same as that of the low-resolution original image 1315, the resolution difference information may indicate zero (0). Furthermore, because the resolution of the first image 1325 may be determined from the resolution of the reconstructed second image 1355 and the degree of resolution conversion may be determined based on the resolution of the first image 1325, the resolution information of the first image 1325 may be represented only as resolution information of the low-resolution original image 1315.

Furthermore, the information related to the first image 1325 may include information about at least one of a bitrate of image data obtained as a result of performing the first encoding on the first image 1325 or a type of a codec used during the first encoding of the first image 1325.

The AI setter 238 may determine an upscaling target for the second image 1355, based on at least one of the differential information or the information related to the first image 1345 obtained by performing the downscaling, which is included in the AI data, or at least one of the resolution information of the first image 1325 (differential information indicating that a resolution difference is 0) or the information related to the first image 1325. For example, the upscaling target may indicate to which resolution the second image 1355 is to be upscaled. When the upscaling target is determined, the AI upscaler 236 performs AI upscaling on the second image 1355 via the second DNN in order to obtain the third image 1365 corresponding to the upscaling target.

Because the AI upscaling process performed via the second DNN has been described above with respect to FIGS. 3 and 4, a detailed description thereof is not repeated below.

A method by which the AI setter 238 determines an upscaling target and the AI upscaler 236 performs the AI upscaling on the second image 1355 according to the upscaling target will now be described.

In an embodiment, the AI setter 238 may store a plurality of pieces of DNN setting information settable in the second DNN.

In this case, DNN setting information may include information about at least one of the number of convolution layers included in the second DNN, the number of filter kernels for each convolution layer, or parameters of each filter kernel. The plurality of pieces of DNN setting information may respectively correspond to various upscaling targets, and the second DNN may operate based on DNN setting information corresponding to a certain upscaling target. The second DNN may have different structures depending on DNN setting information. For example, the second DNN may include three convolution layers according to one piece of DNN setting information or four convolution layers according to another piece of DNN setting information.

In an embodiment, DNN setting information may include only parameters of each filter kernel used in the second DNN. In this case, the structure of the second DNN may remain unchanged while only parameters of each filter kernel in the second DNN may change according to the DNN setting information.

The AI setter 238 may obtain DNN setting information for performing the AI upscaling on the second image 1355 from among the plurality of pieces of DNN setting information. Each of the plurality of pieces of DNN setting information used in the second DNN is information for obtaining the third image 1365 having a predetermined resolution and/or a predetermined quality, and is determined via joint training with the first DNN followed by joint training with the third DNN.

For example, one of the plurality of pieces of DNN setting information may include pieces of information for obtaining the third image 1365 having a resolution twice as high as the resolution of the second image 1355, e.g., the third image 1365 with a 4K (4096×2160) resolution that is twice as high as a 2K (2048×1080) resolution of the second image 1365, and another piece of DNN setting information may include pieces of information for obtaining the third image 1365 having a resolution four times higher than the resolution of the second image 1355, e.g., the third image 1365 with a 8K (8192×4320) resolution that is four times higher than the 2K (2048×1080) resolution of the second image 1355.

Each of the plurality of pieces of DNN setting information is jointly created with corresponding DNN setting information of the first DNN used in an AI encoding apparatus (1500 of FIG. 15) and then jointly trained with DNN setting information of the third DNN. The AI setter 238 obtains one piece of DNN information from among the plurality of pieces of DNN setting information according to an enlargement ratio corresponding to a reduction ratio of the DNN setting information of the first DNN. To achieve this, the AI setter 238 identifies information of the first DNN. In order for the AI setter 238 to identify the information of the first DNN, according to an embodiment, the AI decoding apparatus 200 receives AI data including the information of the first DNN from the AI encoding apparatus 1500.

Furthermore, the AI setter 238 obtains one piece of DNN setting information from among the plurality of pieces of DNN setting information according to the resolution information of the first image 1325 in DNN setting information of the third DNN. To do so, the AI setter 238 identifies information of the third DNN. In order for the AI setter 238 to identify the information of the third DNN, according to an embodiment, the AI decoding apparatus 200 receives AI data including the information of the third DNN from the AI encoding apparatus 1500.

In other words, the AI setter 238 may identify information targeted by DNN setting information of the first or third DNN used to obtain the first image 1325 or 1345 by using pieces of information received from the AI encoding apparatus 1500, and obtain DNN setting information of the second DNN jointly trained with the first or third DNN.

When DNN setting information for performing AI upscaling on the second image 1355 is obtained from among the plurality of pieces of DNN setting information, the obtained DNN setting information may be transmitted to the AI upscaler 236, and then input data may be processed based on the second DNN operating according to the DNN setting information.

For example, when one piece of DNN setting information is obtained, the AI upscaler 236 may set the number of filter kernels included in each of the first through third convolution layers 310, 330, and 350 of the second DNN 300 described with reference to FIG. 3, and parameters of each filter kernel as values included in the obtained piece of DNN setting information.

In detail, parameters of a 3×3 filter kernel used in a convolution layer of the second DNN described with reference to FIG. 4 are set to {1, 1, 1, 1, 1, 1, 1, 1, 1}, and when DNN setting information is changed afterwards, the AI upscaler 236 may replace the parameters of the 3×3 filter kernel with {2, 2, 2, 2, 2, 2, 2, 2, 2} that are parameters included in the changed DNN setting information.

The AI setter 238 may obtain, based on information included in AI data, DNN setting information for performing AI upscaling on the second image 1355 from among the plurality of pieces of DNN setting information. The AI data used to obtain the DNN setting information will now be described in detail.

In an embodiment, the AI setter 238 may obtain, based on differential information included in the AI data, DNN setting information for performing AI upscaling on the second image 1355 from among the plurality of pieces of DNN setting information. For example, when it is determined, based on the differential information, that the resolution (e.g., 4K (4096×2160)) of the high-resolution original image 1335 is twice as high as the resolution (e.g., 2K (2048×1080)) of the first image 1345, the AI setter 238 may obtain DNN setting information for doubling the resolution of the second image 1355.

In another embodiment, the AI setter 238 may obtain, based on resolution information of the first image 1325 obtained by performing the one-to-one preprocessing, which is included in AI data, DNN setting information for upscaling the second image 1355 from among the plurality of pieces of DNN setting information. For example, because the resolution of the first image 1325 obtained by performing the one-to-one preprocessing is the same as that of the low-resolution original image 1315 determined to have a resolution lower than the predetermined value, an upscaling target may be determined based on a predetermined criterion according to the resolution information of the first image 1325. For example, when the resolution of the first image 1325 obtained by performing the one-to-one preprocessing is 2K, the upscaling target may be determined to be 4K.

In another embodiment, the AI setter 238 may obtain, based on information related to the first image 1325 or 1345, which is included in AI data, DNN setting information for performing AI upscaling on the second image 1355 from among the plurality of pieces of DNN setting information. The AI setter 238 may determine in advance a mapping relationship between pieces of image-related information and pieces of DNN setting information, and obtain DNN setting information mapped to information related to the first image 1325 or 1345.

The AI encoding apparatus 1500 for performing AI encoding on the original image 1305 will now be described with reference to FIG. 15.

Figure 15:
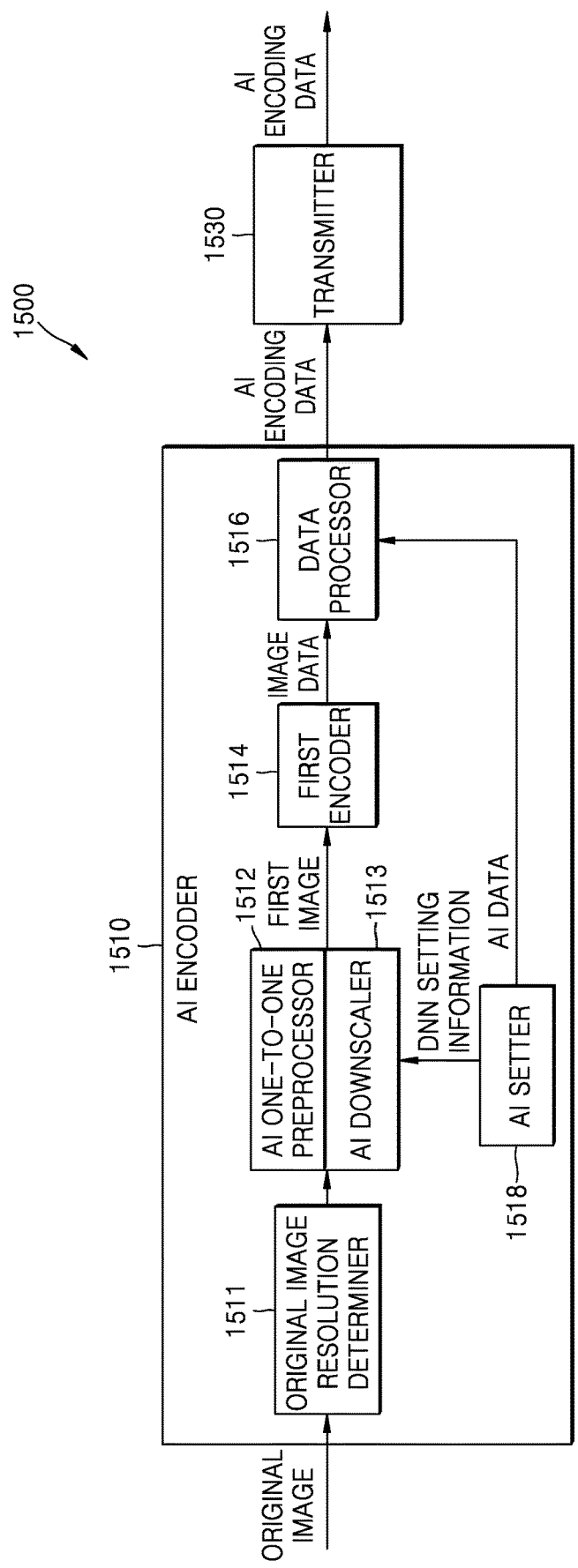
FIG. 15 is a block diagram of a configuration of an AI encoding apparatus according to an embodiment.

FIG. 15 is a block diagram of a configuration of the AI encoding apparatus 1500 according to an embodiment.

Referring to FIG. 15, the AI encoding apparatus 1500 may include an AI encoder 1510 and a transmitter 1530. The AI encoder 1510 may include an original image resolution determiner 1511, an AI one-to-one preprocessor 1512, an AI downscaler 1513, a first encoder 1514, a data processor 1516, and an AI setter 1518. Although FIG. 15 shows that the AI encoder 1510 and the transmitter 1530 are separate devices, the AI encoder 1510 and the transmitter 1530 may be implemented as a single processor. In this case, the AI encoder 1510 and the transmitter 1530 may be implemented as a dedicated processor or through a combination of software and a general-purpose processor such as an AP, a CPU, or a GPU. Furthermore, when the AI encoder 1510 and the transmitter 1530 are implemented as a dedicated processor, the dedicated processor may include a memory for implementing an embodiment (e.g., for storing instructions executable by the processor to perform a method according to an embodiment) or a memory processor for using an external memory.

The AI encoder 1510 and the transmitter 1530 may also be configured as a plurality of processors. In this case, the AI encoder 1510 and the transmitter 1530 may be implemented via a combination of dedicated processors or a combination of software and multiple general-purpose processors such as an AP, a CPU, and a GPU.

In an embodiment, the first encoder 1514 may be implemented as a first processor, the original image resolution determiner 1511, the AI one-to-one preprocessor 1512, the AI downscaler 1513, the data processor 1516, and the AI setter 1518 may be implemented as a second processor different from the first processor, and the transmitter 1530 may be implemented as a third processor different from the first and second processors. It is understood that this is just an example, and one or more other embodiments may implement the various components via any combination of one or more processors.

The AI encoder 1510 determines a resolution of the original image 1305, and when the resolution of the original image 1305 is higher than a predetermined value, sequentially performs the AI downscaling 1320 on the high-resolution original image 1335 and the first encoding 1330 on the first image 1345, and transmits AI encoding data to the transmitter 1530. The transmitter 1530 transmits the AI encoding data to the AI decoding apparatus 200. Furthermore, when the resolution of the original image 1305 is lower than or equal to the predetermined value, the first encoder 1510 sequentially performs the AI one-to-one preprocessing 1310 on the low-resolution original image 1315 and the first encoding 1330 on the first image 1325, and transmits AI encoding data to the transmitter 1530. The transmitter 1530 transmits the AI encoding data to the AI decoding apparatus 200.

Image data in the AI encoding data includes data obtained as a result of performing the first encoding 1330 on the first image 1325 or 1345. The image data may include data obtained based on pixel values in the first image 1325 or 1345, e.g., residual data corresponding to a difference between the first image 1325 or 1345 and prediction data with respect to the first image 1325 or 1345. Furthermore, the image data includes pieces of information used during the first encoding 1330 of the first image 1325 or 1345. For example, the image data may include at least one of prediction mode information, motion information, QP information, etc., which are used to perform the first encoding 1330 on the first image 1325 or 1345.

AI data in the AI encoding data includes pieces of information that enable the AI upscaler 236 to AI upscale the second image 1355 to an upscaling target corresponding to a downscaling target for a first DNN or pieces of information that enable the AI upscaler 236 to AI upscale the second image 1355 to an upscaling target corresponding to a one-to-one preprocessing target for a third DNN. In an embodiment, the AI data may include differential information indicating a difference between the high-resolution original image 1335 and the first image 1345 obtained by performing the AI downscaling 1320. In an embodiment, the AI data may include resolution information of the first image 1325 obtained by performing the AI one-to-one preprocessing 1310. Furthermore, the AI data may include information related to the first image 1325 or 1345. The information related to the first image 1325 or 1345 may include information about at least one of a resolution of the first image 1325 or 1345, a bitrate of the image data obtained as a result of performing the first encoding 1330 on the first image 1325 or 1345, or a type of a codec used during the first encoding 1330 of the first image 1325 or 1345.

In an embodiment, the AI data may include a mutually agreed identifier of DNN setting information so that the second image 1355 is AI upscaled to an upscaling target corresponding to a downscaling target for the first DNN.

In an embodiment, the AI data may include a mutually agreed identifier of DNN setting information so that the second image 1355 is AI upscaled to an upscaling target corresponding to a one-to-one preprocessing target for the third DNN.

Furthermore, in an embodiment, the AI data may include DNN setting information settable in the second DNN.

The AI downscaler 1513 may obtain the first image 1345 by performing the AI downscaling 1320 on the high-resolution original image 1335 via the first DNN. The AI downscaler 1513 may perform the AI downscaling on the original image 1335 by using DNN setting information provided by the AI setter 1518. The AI setter 1518 may determine a downscaling target for the original image 1335, based on a predetermined criterion.

In order to obtain the first image 1345 that matches the downscaling target, the AI setter 1518 may store a plurality of pieces of DNN setting information settable in the first DNN. The AI setter 1518 obtains DNN setting information corresponding to the downscaling target from among the plurality of pieces of DNN setting information and provides the obtained DNN setting information to the AI downscaler 1513.

Each of the plurality of pieces of DNN setting information may be trained to obtain the first image 1345 having a predetermined resolution and/or a predetermined quality. For example, one of the plurality of pieces of DNN setting information may include pieces of information for obtaining the first image 1345 having half the resolution of the high-resolution original image 1335, e.g., the first image 1345 having a 2K (2048×1080) resolution that is one-half a 4K (4096×2160) resolution of the high-resolution original image 1335, and another piece of DNN setting information may include pieces of information for obtaining the first image 1345 having one-quarter of the resolution of the high-resolution original image 1335, e.g., the first image 1345 having a 2K (2048×1080) resolution that is one-quarter of a 8K (8192×4320) resolution of the high-resolution original image 1335.

According to an embodiment, when pieces of information (e.g., the number of convolution layers, the number of filter kernels for each convolution layer, parameters of each filter kernel, etc.) included in DNN setting information are stored in the form of a lookup table, the AI setter 1518 may obtain DNN setting information by combining some values selected from among values in the lookup table according to a downscaling target and provide the obtained DNN setting information to the AI downscaler 1513.

According to an embodiment, the AI setter 1518 may determine a DNN structure corresponding to a downscaling target and obtain DNN setting information corresponding to the determined DNN structure, such as parameters of a filter kernel.

The plurality of pieces of DNN setting information for performing the AI downscaling 1320 on the high-resolution original image 1335 may have optimized values through joint training of the first and second DNNs. In this case, each of the plurality of pieces of DNN setting information includes at least one of the number of convolution layers included in the first DNN, the number of filter kernels for each convolution layer, or parameters of each filter kernel.

The AI downscaler 1513 may set the first DNN by using DNN setting information determined for performing the AI downscaling 1320 on the high-resolution original image 1335 and obtain the first image 1345 with a certain resolution and/or a certain quality via the first DNN. When DNN setting information for performing the AI downscaling 1320 on the high-resolution original image 1335 is obtained from among the plurality of pieces of DNN setting information, each layer in the first DNN may process input data based on pieces of information included in the DNN setting information.

Hereinafter, a method, performed by the AI setter 1518, of determining a downscaling target will be described. For example, the downscaling target may indicate to what extent the resolution of the high-resolution original image 1335 is to be decreased to obtain the first image 1345.

The AI setter 1518 obtains at least one piece of input information. In an embodiment, the input information may include at least one of a target resolution of the first image 1345, a target bitrate of image data, a type of a bitrate of image data (e.g., a variable bitrate type, a constant bitrate type, an average bitrate type, or the like), a color format to which AI downscaling is applied (e.g., a luminance component, a chrominance component, a red component, a green component, a blue component, or the like), a codec type for performing first encoding on the first image 1345, compression history information, a resolution of the original image 1305, or a type of the original image 1305.

The input information may include information prestored in the AI encoding apparatus 1500 or received from a user.

The AI setter 1518 controls an operation of the AI downscaler 1513 based on the input information. In an embodiment, the AI setter 1518 may determine a downscaling target based on the input information and provide DNN setting information corresponding to the determined downscaling target to the AI downscaler 1513.

In an embodiment, the AI setter 1518 may transmit at least some of the input information to the first encoder 1514 so that the first encoder 1514 may perform the first encoding 1330 on the first image 1345 based on a certain bitrate, a certain type of bitrate, and a certain codec.

In an embodiment, the AI setter 1518 may determine a downscaling target based on at least one of a compression ratio (e.g., a resolution difference between the original image 1335 and the first image 1345, a target bitrate, or the like), a compression quality (e.g., a type of a bitrate), compression history information, or a type of the original image 1305.

For example, the AI setter 1518 may determine a downscaling target based on a compression ratio, a compression quality, or the like, which is preset or input by the user.

As another example, the AI setter 1518 may determine a downscaling target by using compression history information stored in the AI encoding apparatus 1500. For example, a compression ratio, an encoding quality, or the like preferred or often selected by the user may be determined based on compression history information usable by the AI encoding apparatus 1500, and a downscaling target may be determined according to the encoding quality determined based on the compression history information. For example, the resolution, quality, etc., of the first image 1345 may be determined according to an encoding quality that has been most frequently used based on the compression history information.

As another example, the AI setter 1518 may determine a downscaling target based on an encoding quality that has been more frequently used than a certain threshold value (e.g., an average of encoding qualities that have been more frequently used than the certain threshold value), as determined according to the compression history information.

As another example, the AI setter 1518 may determine a downscaling target based on the resolution, type (e.g., a file format), etc. of the high-resolution original image 1335.

In an embodiment, when the high-resolution original image 1335 is composed of a plurality of frames, the AI setter 1518 may independently obtain DNN setting information for each certain number of frames and provide independently obtained DNN setting information to the AI downscaler 1513.

In an embodiment, the AI setter 1518 may divide frames constituting the original image 105 into a certain number of groups, and independently obtain DNN setting information for each group. The same piece or different pieces of DNN setting information may be obtained for each group. The same number of frames or different numbers of frames may be included in each group.

In another embodiment, the AI setter 1518 may independently determine DNN setting information for each frame constituting the high-resolution original image 1335. The same piece of DNN setting information or different pieces of DNN setting information may be determined for each frame.

The AI one-to-one preprocessor 1512 may obtain the first image 1325 by performing the AI one-to-one preprocessing 1310 on the low-resolution original image 1315 via the third DNN. The AI one-to-one preprocessor 1512 may perform the AI one-to-one preprocessing 1310 on the low-resolution original image 1315 by using DNN setting information provided by the AI setter 1518. The AI setter 1518 may determine a one-to-one preprocessing target for the low-resolution original image 1315 based on a predetermined criterion.

In order to obtain the first image 1325 that matches the one-to-one preprocessing target, the AI setter 1518 may store a plurality of pieces of DNN setting information settable in the third DNN. The AI setter 1518 obtains DNN setting information corresponding to the one-to-one preprocessing target from among the plurality of pieces of DNN setting information and provides the obtained DNN setting information to the AI one-to-one preprocessor 1512.

Each of the plurality of pieces of DNN setting information may be trained to obtain the first image 1325 in which detailed features of the original image 1305 are well preserved and/or the first image 1325 having a predetermined resolution and/or a predetermined quality. For example, one of the plurality of pieces of DNN setting information may include pieces of information for obtaining the first image 1325 in which detailed features of the low-resolution original image 1315 are well preserved while maintaining the same resolution of the low-resolution original image 1315, e.g., the first image 1325 having the same resolution as the low-resolution original image 1315 with a 2K (2048×1080) resolution but in which detailed features of the low-resolution original image 1315 are well preserved. Here, detailed features of an original image may be a portion with high spatial and temporal complexity. Another piece of DNN setting information may include pieces of information for obtaining the first image 1325 with improved quality while maintaining the same resolution of the low-resolution original image 1315, e.g., the first image 1325 having the same resolution as the low-resolution original image 1315 with a 2K (2048×1080) resolution but with improved quality.

According to an embodiment, when pieces of information (e.g., the number of convolution layers, the number of filter kernels for each convolution layer, parameters of each filter kernel, etc.) included in DNN setting information are stored in the form of a lookup table, the AI setter 1518 may provide, to the AI one-to-one preprocessor 1512, DNN setting information obtained by combining some values selected from among values in the lookup table according to a one-to-one preprocessing target.

According to an embodiment, the AI setter 1518 may determine a DNN structure corresponding to a one-to-one preprocessing target and obtain DNN setting information corresponding to the determined DNN structure, such as parameters of a filter kernel.

The plurality of pieces of DNN setting information for performing the AI one-to-one preprocessing on the low-resolution original image 1315 may have optimized values by jointly training the third DNN with the second DNN by fixedly using DNN setting information of the second DNN obtained after joint training of the first and second DNNs. In this case, each of the plurality of pieces of DNN setting information includes at least one of the number of convolution layers included in the first DNN, the number of filter kernels for each convolution layer, or parameters of each filter kernel.

The AI one-to-one preprocessor 1512 may configure the third DNN with DNN setting information determined for AI one-to-one preprocessing of the low-resolution original image 1315 and obtain, via the third DNN, the first image 1325 in which detailed features of the low-resolution original image 1315 are preserved and/or the first image 1325 with a certain resolution and/or a certain quality. When DNN setting information for performing the AI one-to-one preprocessing on the low-resolution original image 1315 is obtained from among the plurality of pieces of DNN setting information, each layer in the third DNN may process input data based on pieces of information included in the DNN setting information.

Hereinafter, a method, performed by the AI setter 1518, of determining a one-to-one preprocessing target will be described. For example, the one-to-one preprocessing target may indicate to what extent the obtained first image 1325 is to preserve detailed features of the low-resolution original image 1315 while maintaining the resolution of the low-resolution original image 1315 or to what extent a quality of the obtained first image 1325 is to be improved while maintaining the resolution of the low-resolution original image 1315.

The AI setter 1518 obtains at least one piece of input information. In an embodiment, the input information may include at least one of a target resolution of the first image 115, a target bitrate of image data, a type of a bitrate of image data (e.g., a variable bitrate type, a constant bitrate type, an average bitrate type, or the like), a color format to which AI one-to-one preprocessing is applied (e.g., a luminance component, a chrominance component, a red component, a green component, a blue component, or the like), a codec type for performing first encoding on the first image 1325, compression history information, a resolution of the original image 1305, or a type of the original image 1305.

The input information may include information prestored in the AI encoding apparatus 1500 or received from a user.

The AI setter 1518 controls an operation of the AI one-to-one preprocessor 1512 based on the input information. In an embodiment, the AI setter 1518 may determine a one-to-one preprocessing target based on the input information and provide DNN setting information corresponding to the determined one-to-one preprocessing target to the AI one-to-one preprocessor 1512.

In an embodiment, the AI setter 1518 may transmit at least some of the input information to the first encoder 1514 so that the first encoder 1514 may perform the first encoding on the first image 1325 based on a certain bitrate, a certain type of bitrate, and a certain codec.

In an embodiment, the AI setter 1518 may determine a one-to-one preprocessing target based on at least one of a compression ratio (e.g., a target bitrate), a compression quality (e.g., a type of a bitrate), compression history information, or a type of the low-resolution original image 1315.

For example, the AI setter 1518 may determine a one-to-one preprocessing target based on a compression ratio, a compression quality, or the like, which is preset or input by the user.

As another example, the AI setter 1518 may determine a one-to-one preprocessing target by using compression history information stored in the AI encoding apparatus 1500. For example, a compression ratio, an encoding quality, or the like preferred or often selected by the user may be determined based on compression history information usable by the AI encoding apparatus 1500, and a one-to-one preprocessing target may be determined according to the encoding quality determined based on the compression history information. For example, the resolution, quality, etc., of the first image 1325 may be determined according to an encoding quality that has been most frequently used based on the compression history information.

As another example, the AI setter 1518 may determine a one-to-one preprocessing target based on an encoding quality that has been more frequently used than a certain threshold value (e.g., an average of encoding qualities that have been more frequently used than the certain threshold value), as determined according to the compression history information.

As another example, the AI setter 1518 may determine a one-to-one preprocessing target based on the resolution, type (e.g., a file format), etc. of the low-resolution original image 1315.

In an embodiment, when the low-resolution original image 1315 is composed of a plurality of frames, the AI setter 1518 may independently obtain DNN setting information for each certain number of frames and provide independently obtained DNN setting information to the AI one-to-one preprocessor 1512.

In an embodiment, the AI setter 1518 may divide frames constituting the low-resolution original image 1315 into a certain number of groups, and independently obtain DNN setting information for each group. The same piece or different pieces of DNN setting information may be obtained for each group. The same number of frames or different numbers of frames may be included in each group.

In another embodiment, the AI setter 1518 may independently determine DNN setting information for each frame constituting the low-resolution original image 1315. The same piece of DNN setting information or different pieces of DNN setting information may be determined for each frame.

Hereinafter, an example of a structure of a third DNN 1400 on which AI one-to-one preprocessing is based will be described.

Figure 14:
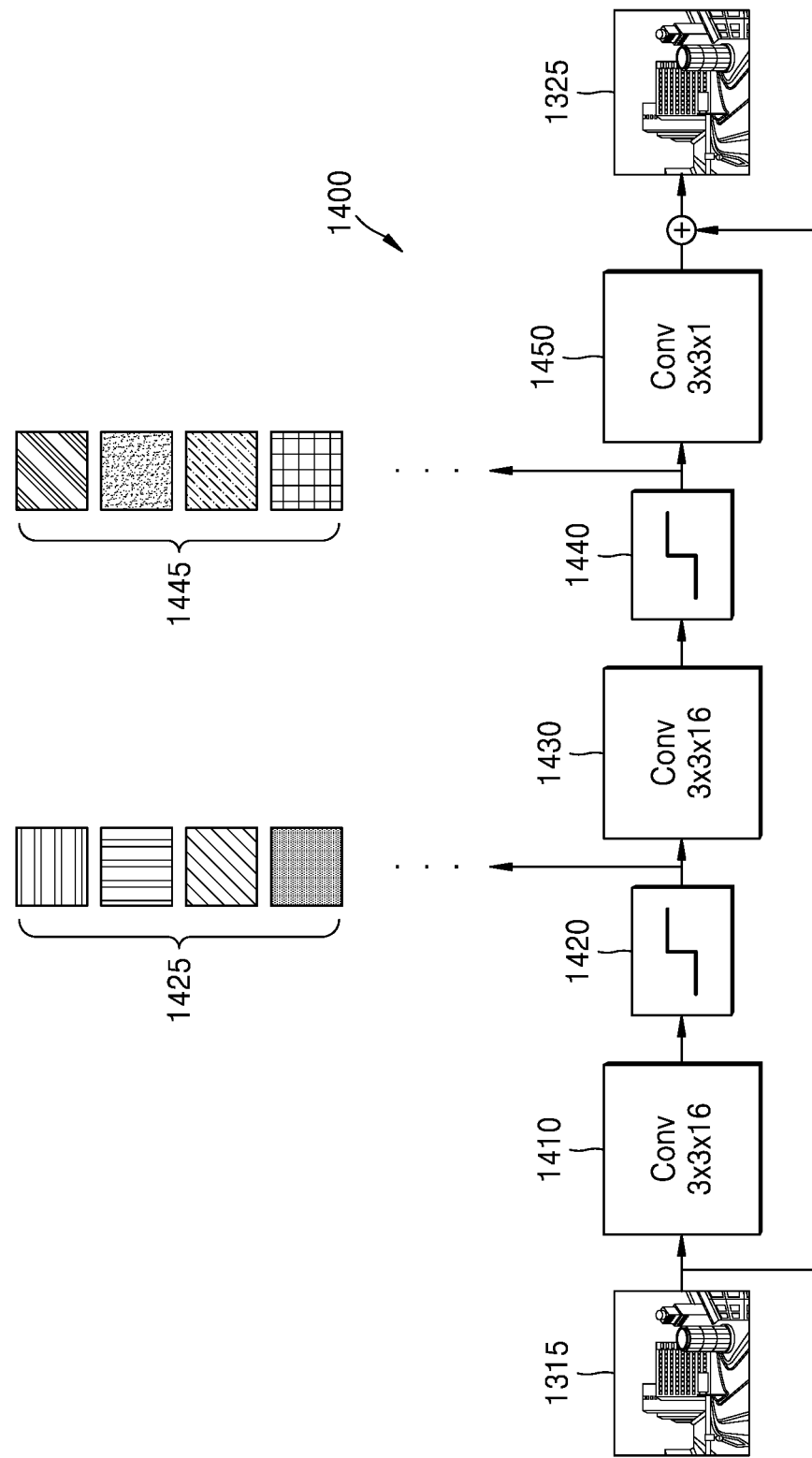
FIG. 14 is a diagram illustrating a third DNN for performing AI one-to-one preprocessing on an original image according to an embodiment.

FIG. 14 is a diagram illustrating the third DNN 1400 for performing AI one-to-one preprocessing on the low-resolution original image 1315.

As shown in FIG. 14, the low-resolution original image 1315 is input to a first convolution layer 1410. The first convolution layer 1410 performs a convolution process on the low-resolution original image 1315 by using sixteen (16) filter kernels having a size of 3×3 (though it is understood that the size and number of filter kernels is an example, and one or more other embodiments are not limited thereto). 16 feature maps generated as a result of the convolution process are then input to a first activation layer 1420. The first activation layer 1420 may apply non-linear features to the 16 feature maps.

The first activation layer 1420 determines whether to transmit sample values in feature maps output from the first convolution layer 1410 to a second convolution layer 1430. For example, some of the sample values of the feature maps are activated by the first activation layer 1420 and transmitted to the second convolution layer 1430, and some of the sample values are deactivated by the first activation layer 1420 and not transmitted to the second convolution layer 1430. Information represented by feature maps output from the first convolution layer 1410 is emphasized by the first activation layer 1420.

An output 1425 of the first activation layer 1420 is input to the second convolution layer 1430. The second convolution layer 1430 performs a convolution process on input data by using 16 filter kernels having a size of 3×3 (though it is understood that the size and number of filter kernels is an example, and one or more other embodiments are not limited thereto). 16 feature maps output as a result of the convolution process are then input to a second activation layer 1440, and the second activation layer 1440 may assign non-linear features to the 16 feature maps.

An output 1445 of the second activation layer 1440 is input to a third convolution layer 1450. The third convolution layer 1450 performs a convolution process on input data by using one filter kernel having a size of 3×3 (though it is understood that the size of the filter kernel is an example, and one or more other embodiments are not limited thereto). As a result of the convolution process, an image may be output from the third convolution layer 1450. The third convolution layer 1450 is a layer for outputting a final image and generates one output by using the one filter kernel. Finally, the image output from the third convolution layer 1450 and the low-resolution original image 1315 as an input image are added together to obtain a final output image 1325 for the third DNN. According to an embodiment, the low-resolution original image 1315 is added to the result of a convolution operation from the third convolution layer 1450 to output the first image 1325 having the same resolution as that of the low-resolution original image 1315 and in which detailed features of the low-resolution original image 1315 are preserved.

There may be a plurality of pieces of DNN setting information, each piece of DNN setting information indicating the number of filter kernels in each of the first through third convolution layers 1410, 1430, and 1450 of the third DNN 1400, parameters of each filter kernel, etc., and the plurality of pieces of DNN setting information of the third DNN is jointly trained with a plurality of pieces of DNN setting information of a second DNN. A joint relationship between the plurality of pieces of DNN setting information of the first DNN 800 and the plurality of pieces of DNN setting information of the second DNN may be implemented via joint training of the third and second DNNs by using DNN setting information of the second DNN obtained after joint training of the first and second DNNs.

Although FIG. 14 shows that the third DNN 1400 includes the three convolution layers (the first through third convolution layers 1410, 1430, and 1450) and two activation layers (the first and second activation layers 1420 and 1440), this is merely an example, and the number of convolution layers and the number of activation layers may vary according to an embodiment. Furthermore, according to an embodiment, the third DNN 1400 may be implemented as an RNN. In this case, a CNN structure of the third DNN 1400 according to an embodiment is changed to an RNN structure.

In an embodiment, the AI one-to-one preprocessor 1512 may include at least one ALU for performing a convolution operation and an arithmetic operation at each activation layer. The ALU may be implemented as a processor. For the convolution operation, the ALU may include a multiplier that performs multiplication between sample values of the low-resolution original image 1315 or a feature map output from a previous layer and sample values of a filter kernel, and an adder that adds together results of the multiplication. Furthermore, for the arithmetic operation at each activation layer, the ALU may include a multiplier that multiplies an input sample value by a weight used in a predetermined sigmoid, Tan h, or ReLU function, and a comparator that compares a result of the multiplication with a preset value to determine whether to transmit the input sample value to a next layer.

Referring back to FIG. 15, the AI setter 1518 transmits AI data to the data processor 1516. The AI data includes pieces of information that enable the AI upscaler 236 to AI upscale the second image 1355 to an upscaling target corresponding to a downscaling target for a first DNN or a one-to-one preprocessing target for a third DNN. The first encoder 1514 that has received the first image 1325 obtained by performing AI one-to-one preprocessing from the AI one-to-one preprocessor 1512 or the first image 1345 obtained by performing downscaling from the AI downscaler 1513 may perform first encoding on the first image 1325 or 1345 according to an image compression method based on frequency transformation to thereby reduce the amount of information contained in the first image 1325 or 1345. Image data is obtained as a result of first encoding via a certain codec (e.g., MPEG-2, H.264, MPEG-4, HEVC, VC-1, VP8, VP9, AV1, etc.). The image data is obtained according to rules of the certain codec, i.e., a syntax thereof. For example, the image data may include residual data corresponding to a difference between the first image 1325 or 1345 and prediction data with respect to the first image 1325 or 1345, as well as prediction mode information, motion information, QP related information, which are all used to perform the first encoding on the first image 1325 or 1345. The image data obtained as a result of the first encoding by the first encoder 1514 is provided to the data processor 1516.

The data processor 1516 generates AI encoding data including the image data received from the first encoder 1514 and the AI data received from the AI setter 1518. In an embodiment, the data processor 1516 may generate the AI encoding data including the image data and the AI data separated from each other. For example, the AI data may be included in a VSIF within an HDMI stream.

In another embodiment, the data processor 1516 may include AI data in image data obtained as a result of the first encoding by the first encoder 1514 and generate AI encoding data including the image data. For example, the data processor 1516 may generate image data in the form of a single bitstream by combining a bitstream corresponding to image data with a bitstream corresponding to AI data. To achieve this, the data processor 1516 may represent the AI data as bits having a value of 0 or 1, i.e., a bitstream. In an embodiment, the data processor 1516 may include a bitstream corresponding to AI data in SEI which is an additional information area of a bitstream obtained as a result of the first encoding.

The AI encoding data is transmitted to the transmitter 1530. The transmitter 1530 transmits AI encoding data obtained as a result of AI encoding via a network.

In an embodiment, the AI encoding data may be stored in data storage media including a magnetic medium such as a hard disk, a floppy disk, or a magnetic tape, an optical recording medium such as CD-ROM or DVD, a magneto-optical medium such as a floptical disk, etc.

A method of performing joint training of the third and second DNNs 1400 and 300 after joint training of the first and second DNNs 800 and 300 will now be described with reference to FIG. 16.

Figure 16:
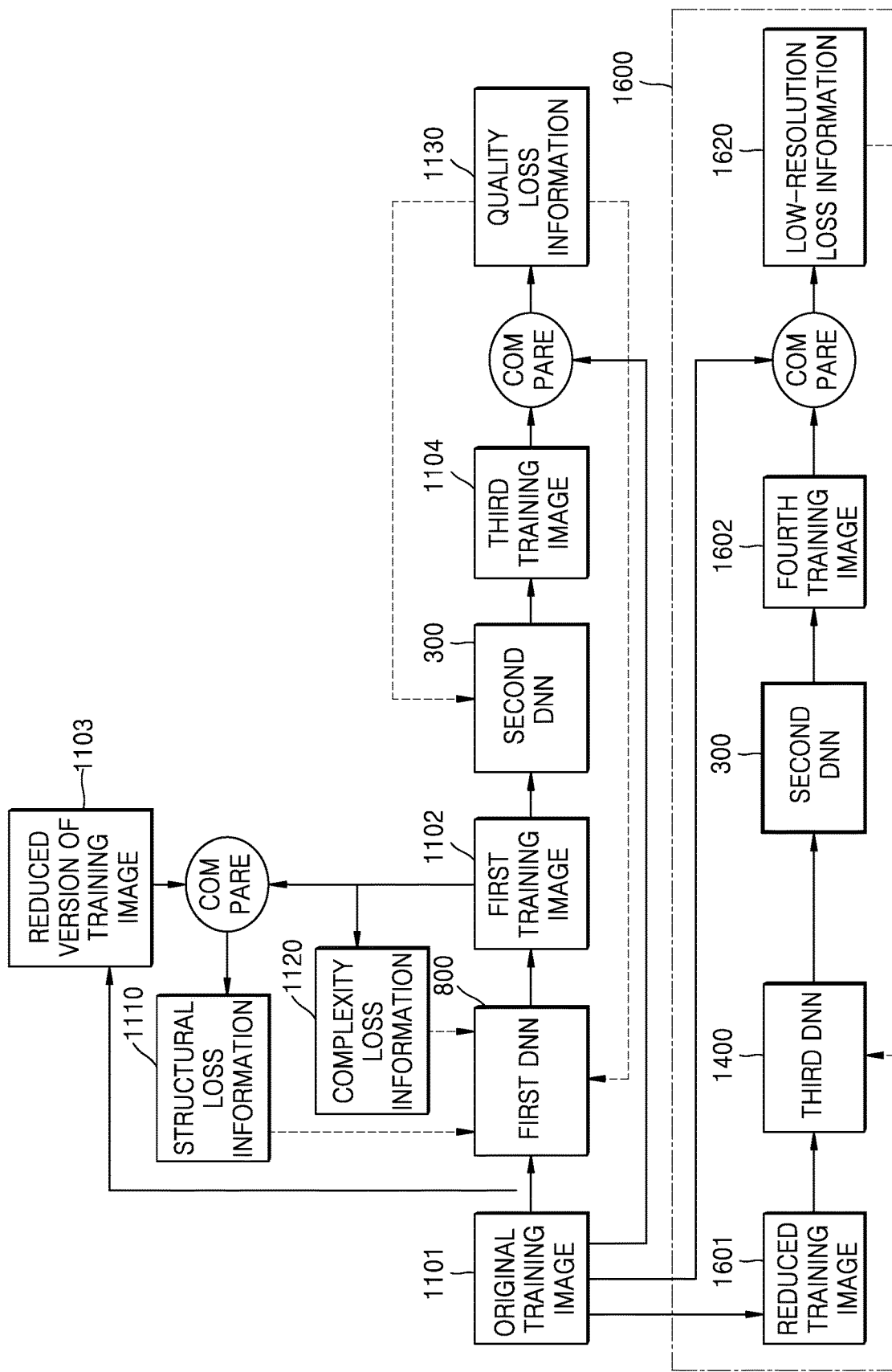
FIG. 16 is a diagram for describing a method of training a third DNN jointly with a second DNN according to an embodiment.

FIG. 16 is a diagram for describing a method of performing joint training 1600 of the third DNN 1400 and the second DNN 300.

In an embodiment, the low-resolution original image 1315 that has undergone AI encoding via an AI encoding process is used to reconstruct the third image 1365 through an AI decoding process. In order to maintain similarity between the low-resolution original image 1315 and the third image 1365 obtained as a result of the AI decoding, a joint relationship exists between the AI encoding process and the AI decoding process. In other words, information lost during the AI encoding process is to be restored during the AI decoding process, and for this purpose, joint training of the first and second DNNs 800 and 300 and joint training of the third and second DNNs 1400 and 300 are implemented.

FIG. 16 is a diagram for describing a method of performing joint training 1600 between the third and second DNNs 1400 and 300 after the joint training of the first and second DNNs 800 and 300 described with reference to FIG. 11. Because the joint training of the first and second DNNs 800 and 300 except for the joint training 1600 has been described above with respect to FIG. 11, a detailed description thereof is not repeated below.

For accurate AI decoding, low-resolution loss information 1620 corresponding to a result of comparison between a fourth training image 1602 and an original training image 1101 shown in FIG. 16 eventually is to be reduced. Because the joint training 1600 of the third and second DNNs 1400 and 300 is performed using the parameters of the second DNN 300, which has been obtained during the previously performed joint training of the first and second DNNs 800 and 300, the low-resolution loss information 1620 is used to train the third DNN 1400.

First, a training process illustrated in FIG. 16 will be described.

In FIG. 16, the original training image 1101 is an image to be compared with an image obtained by performing AI upscaling on an image obtained as a result of performing AI one-to-one preprocessing for preserving detailed features of a low-resolution image, a reduced training image 1601 is an image corresponding to the low-resolution image on which the AI one-to-one pre-processing is to be performed, and the fourth training image 1602 is an image obtained by performing the AI upscaling after performing the AI one-to-one preprocessing on the reduced training image 1601.

The original training image 1101 includes a still image or a moving image composed of a plurality of frames. In an embodiment, the original training image 1101 may include a luminance image extracted from the still image or the moving image composed of the plurality of frames. Furthermore, in an embodiment, the original training image 1101 may include a patch image extracted from the still image or the moving image composed of the plurality of frames. When the original training image 1101 is composed of a plurality of frames, each of the reduced training image 1601 and the fourth training image 1602 also includes a plurality of frames. When the plurality of frames in the reduced training image 1601 are sequentially input to the third DNN 1400, a plurality of frames in the fourth training image 1602 may be sequentially obtained via the third and second DNNs 1400 and 300.

For joint training between the third and second DNNs 1400 and 300, the reduced training image 1601 is input to the third DNN 1400. An image obtained by performing AI one-to-one preprocessing on the reduced training image 1601 input to the third DNN 1400 is then input to the second DNN 300, and the fourth training image 1602 is output by performing AI upscaling on the image.

Although FIG. 16 shows that a result of the AI one-to-one preprocessing is input to the second DNN 300, according to an embodiment, a result obtained by performing first encoding and first decoding on the result of the AI one-to-one preprocessing may be input to the second DNN 300. In order to input, to the second DNN 300, the result obtained by performing the first encoding and the first decoding on the result of the AI one-to-one preprocessing, one codec among, for example, MPEG-2, H.264, MPEG-4, HEVC, VC-1, VP8, VP9, AV1, etc., may be used. For example, one codec among MPEG-2, H. 264, MPEG-4, HEVC, VC-1, VP8, VP9, AV1, etc., may be used to perform the first encoding and the first decoding.

Referring to FIG. 16, the reduced training image 1103 is obtained by performing legacy downscaling on the original training image 1101. In this case, the legacy downscaling may include at least one of bilinear scaling, bicubic scaling, Lanczos scaling, or stairstep scaling.

In order to enable upscaling while preserving structural features of a low-resolution original image, training is performed by using the reduced training image 1400 that has a low resolution and includes preserved structural features of the original training image 1101.

Before the training is performed, the third DNN 1400 may be configured with predetermined DNN setting information, and the first and second DNNs 800 and 300 may be set based on DNN setting information obtained as a result of the joint training of the first and second DNNs 800 and 300. As the training progresses, the low-resolution loss information 1620 may be determined.

The low-resolution loss information may be determined based on a result of comparing the original training image 1101 with the fourth training image 1602. For example, the low-resolution loss information 1620 may correspond to a difference between the original training image 1101 with the same structural features as the reduced training image 1601 and the fourth training image 1602 obtained by performing the AI upscaling on the result of the AI one-to-one preprocessing in which detailed features of the reduced training image 1601 having a low resolution are preserved.

The low-resolution loss information 1130 may include at least one of an L1-norm value, an L2-norm value, a SSIM value, a PSNR-HVS value, an MS-SSIM value, a VIF value, or a VMAF value, each of the values indicating a difference between the original training image 1101 and the fourth training image 1602. The low-resolution loss information 1620 indicates how similar the fourth training image 1602 is to the original training image 1101. The smaller the value of the low-resolution loss information 1620, the more similar the fourth training image 1602 is to the original training image 1101.

Referring to FIG. 16, the low-resolution loss information 1620 is used to train the third DNN 1400.

The third DNN 1400 may update parameters such that final loss information determined based on the low-resolution loss information 1620 is reduced or minimized. For the second DNN 300, parameters determined during joint training of the first and second DNNs 800 and 300 are used.

Final loss information used for training the third DNN 1400 may be determined by using Equation 2 below:

$$\text{Loss}LU = e * \text{low-resolution loss information} \qquad [\text{Equation 2}]$$

In Equation 2 above, LossLU represents final loss information that is to be reduced or minimized to train the third DNN 1400. Furthermore, e may be a predetermined weight.

The third DNN 1400 updates parameters in a direction such that LossLU determined based on Equation 2 is reduced by using parameters of the second DNN 300 obtained after the joint training of the first and second DNNs.

Because joint training of the third and second DNNs 1400 and 300 is performed after the joint training of the first and second DNNs 800 and 300, referring to FIGS. 11 and 16, when parameters of the third DNN 1400 are updated according to LossLU derived during the training, the fourth training image 1602 obtained based on the parameters of the third DNN 1400 and the parameters of the second DNN 300 updated according to a result of the joint training of the first and second DNNs 800 and 300 becomes different from a previous fourth training image 1602 obtained during previous training. When the fourth training image 1602 becomes different from the previous fourth training image 1602, the low-resolution loss information 1620 is also newly determined, and the third DNN 1400 updates the parameters according to the newly determined low-resolution loss information. The third DNN 1400 may optimize its parameters such that the low-resolution loss information 1620 is minimized by using parameters updated according to a result of the joint training of the first and second DNNs 800 and 300, which is performed before joint training with the second DNN 300.

It has been described above that the AI setter 238 of the AI decoding apparatus 200 and the AI setter 1518 of the AI encoding apparatus 1500 each store a plurality of pieces of DNN setting information. Because the method of training a plurality of pieces of DNN setting information of the first and second DNNs 800 and 300, which are stored in each of the AI setters 238 and 1518, has been described above with reference to FIG. 11, a method of training a plurality of pieces of DNN setting information stored in the AI setter 1518 will now be described.

As described with reference to Equation 2, the third DNN 1400 updates the parameters by taking into account the degree of similarity (the low-resolution loss information 1620) between structural information of the original training image 1101 and structural information of the fourth training image 1602.

In more detail, the parameters of the third DNN 1400 may be updated so that the original training image 1101 having similar structural features to the reduced training image 1601 becomes similar to the fourth training image 1602. Accordingly, an upscaled image including well-preserved structural features of the reduced training image 1602 having a low resolution may be generated.

Figure 17:
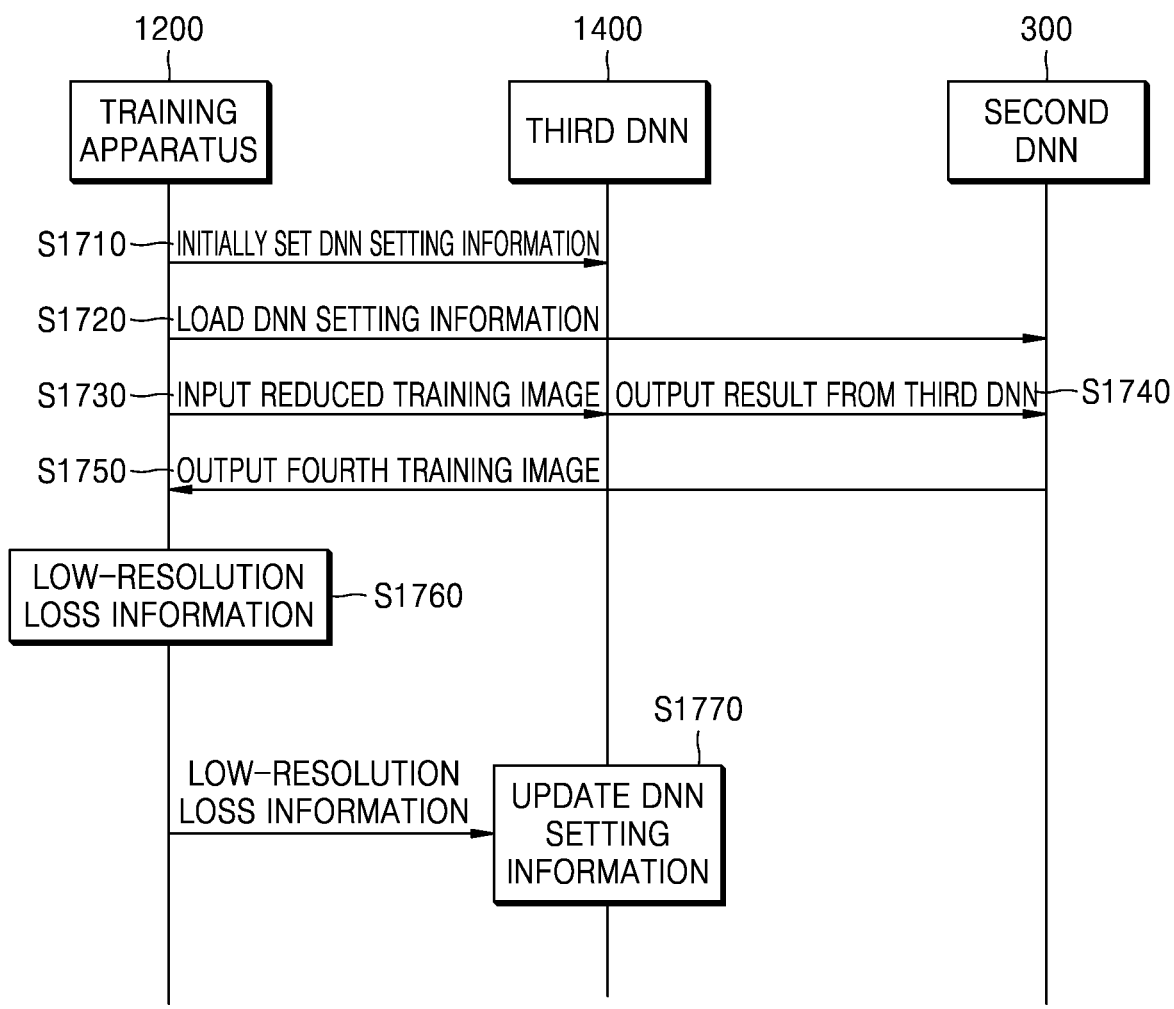
FIG. 17 is a diagram for describing a process, performed by a training apparatus, of training a third DNN and a second DNN according to an embodiment.

FIG. 17 is a diagram for describing a process, performed by a training apparatus 1200, of training the third and second DNNs 1400 and 300.

The training of the third and second DNNs 1400 and 300 described with reference to FIG. 16 may be performed by the training apparatus 1200. The training apparatus 1200 includes the first through third DNNs 800, 300, and 1400. The training apparatus 1200 may be, for example, the AI encoding apparatus 1500 or a separate server.

The training process of FIG. 17 is performed subsequently to the training process of FIG. 12.

Referring to FIG. 17, the training apparatus 1200 initially sets DNN setting information of the third DNN 1400 (operation S1710) and loads DNN setting information of the second DNN 300 obtained during the training process of FIG. 12 (operation S1720). Accordingly, the third and second DNNs 1400 and 300 may respectively operate according to the pieces of predetermined DNN setting information. DNN setting information may include information about at least one of the number of convolution layers included in each of the third and second DNNs 1400 and 300, the number of filter kernels for each convolution layer, a size of filter kernels for each convolution layer, or parameters of each filter kernel.

The training apparatus 1200 inputs the reduced training image 1601 to the third DNN 1400 (operation S1730). The reduced training image 1601 may include a still image or at least one frame constituting a moving image.

The third DNN 1400 processes the reduced training image 1601 according to the initially set DNN setting information and outputs a result obtained by performing AI one-to-one preprocessing on the reduced training image 1601 (operation S1740). Although FIG. 17 shows that the result output from the third DNN 1400 is directly input to the second DNN 300, the result output from the third DNN 1400 may be input to the second DNN 300 by the training apparatus 1200. Furthermore, the training apparatus 1200 may obtain a second image by performing first encoding and first decoding on the result output from the third DNN 1400 via a certain codec, and then input the second image to the second DNN 300.

The second DNN 300 processes the result output from the third DNN 1400 according to the loaded DNN setting information and outputs the fourth training image 1602 obtained by performing AI upscaling on the result output from the third DNN 1400 (operation S1750).

The training apparatus 1200 calculates low-resolution loss information 1620 by comparing the original training image 1101 with the fourth training image 1602 (operation S1760).

The third DNN 800 updates the initially set DNN setting information through a back-propagation process based on the low-resolution loss information 1620 (operation S1770).

Thereafter, the training apparatus 1200, the third DNN 1400, and the second DNN 300 may iteratively repeat operations S1240 through S1285 described with reference to FIG. 12 and operations S1710 through S1770 described with reference to FIG. 17 until the low-resolution loss information 1620 is minimized to update corresponding pieces of DNN setting information. In this case, during each iteration, the third and second DNNs 1400 and 300 operate respectively according to pieces of DNN setting information updated during the previous iteration.

Figure 18:
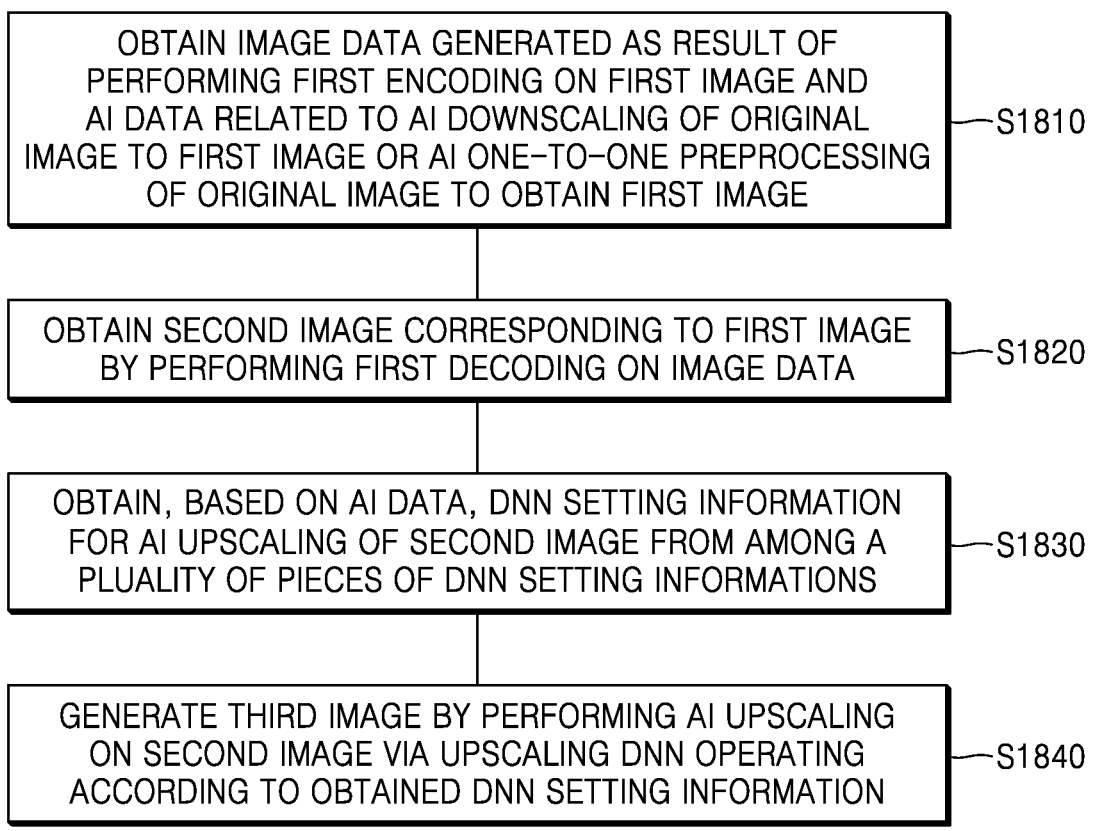
FIG. 18 is a flowchart of an AI decoding method according to an embodiment.

FIG. 18 is a flowchart of an AI decoding method according to an embodiment.

The AI decoding apparatus 200 receives AI encoding data including image data and AI data (operation S1810). The AI decoding apparatus 200 may receive AI encoding data from the AI encoding apparatus 1500 through a wired and/or wireless network. Alternative, the AI decoding apparatus 200 may obtain AI encoding data stored in a data storage medium.

The AI decoding apparatus 200 obtains the second image 1355 based on the image data (operation S1820). In detail, the AI decoding apparatus 200 reconstructs the second image 1355 corresponding to the first image 1325 or 1345 by decoding the image data based on an image reconstruction method using frequency transformation (e.g., based on a codec such as HEVC, H.264, AV1, etc.).

The AI decoding apparatus 200 obtains DNN setting information for performing AI upscaling on the second image 1355 from among a plurality of pieces of prestored DNN setting information (operation S1830). Because each of a plurality pieces of DNN setting information used for the AI upscaling of the second image 1355 is optimized or trained jointly with each of a plurality of pieces of DNN setting information used for AI downscaling of the high-resolution original image 1335 and each of a plurality of pieces of DNN setting information used for AI one-to-one preprocessing of the low-resolution original image 1315, DNN setting information for the AI upscaling the second image 1355 is selected according to an upscaling target corresponding to a downscaling target for the high-resolution original image 1335 or an upscaling target corresponding to a one-to-one preprocessing target for the low-resolution original image 1315.

The AI decoding apparatus 200 generates the third image 1365 by performing the AI upscaling on the second image 1355 via a second DNN operating according to the DNN setting information obtained in operation S1830 (operation S1840). The third image 1365 may be output from the AI decoding device 200 and displayed via a display device, or may be post-processed and then displayed.

When DNN setting information is preset in the second DNN, but the DNN setting information selected in operation S1830 is different from the preset DNN setting information, the AI decoding apparatus 200 configures the second DNN with the selected DNN setting information that is a selected set of parameters.

Figure 19:
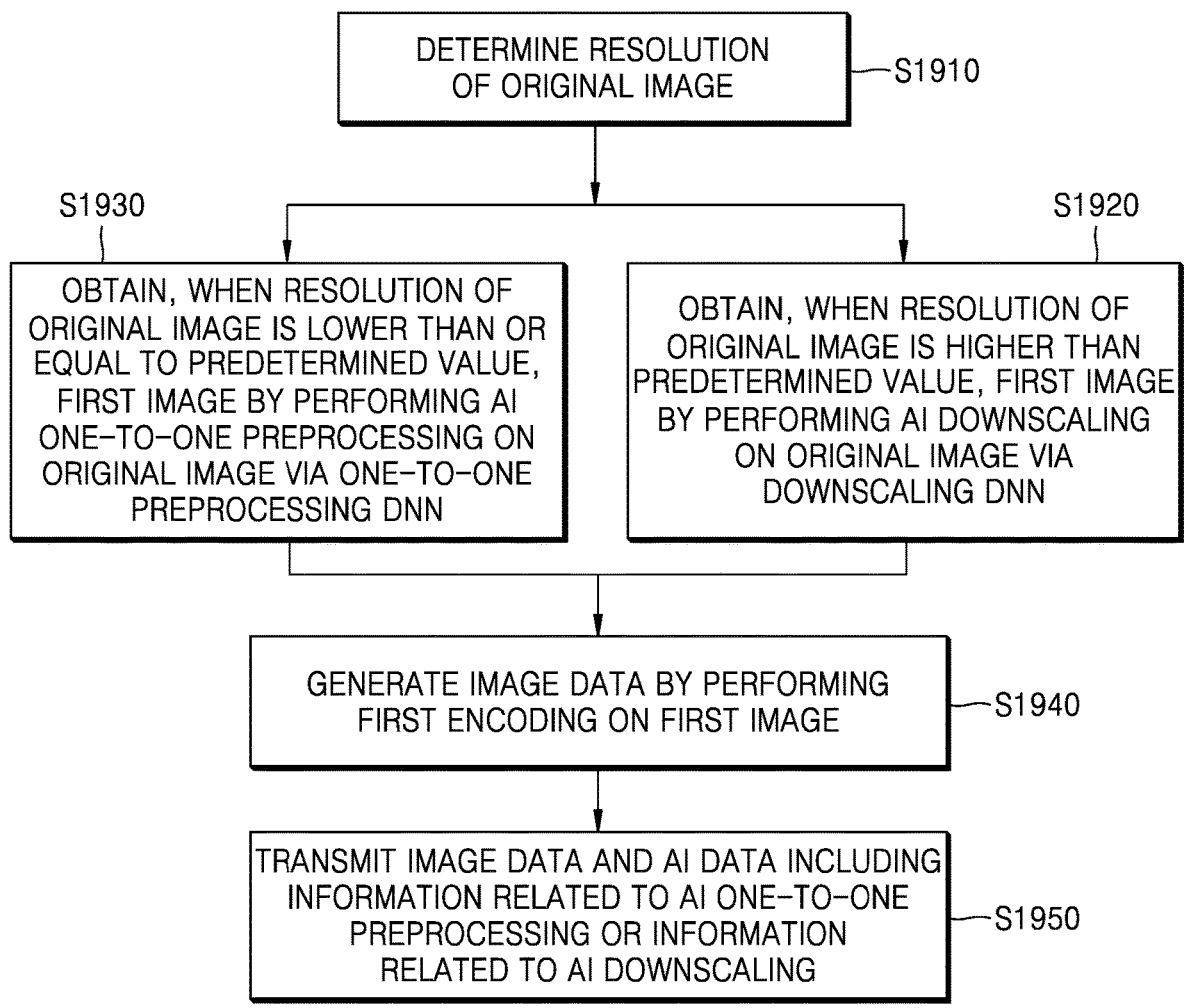
FIG. 19 is a flowchart of an AI encoding method according to an embodiment.

FIG. 19 is a flowchart of an AI encoding method according to an embodiment.

The AI encoding apparatus 1500 determines a resolution of the original image 1305 (operation S1910).

When the resolution of the original image 1305 is higher than a predetermined value, the AI encoding apparatus 1500 obtains the first image 1345 by performing AI downscaling on the high-resolution original image 1335 via a first DNN (operation S1920).

The AI encoding apparatus 1500 may determine a downscaling target based on a certain criterion (e.g., one or more predetermined criteria or thresholds) and obtain DNN setting information corresponding to the downscaling target from among a plurality of pieces of prestored DNN setting information. Then, the AI encoding apparatus 1500 may perform the AI downscaling on the high-resolution original image 1335 via the first DNN operating according to the obtained DNN setting information.

When the resolution of the original image 1305 is lower than or equal to the predetermined value, the AI encoding apparatus 1500 obtains the first image 1325 by performing AI one-to-one preprocessing on the low-resolution original image 1315 via a third DNN (operation S1930).

The AI encoding apparatus 1500 may determine a one-to-one preprocessing target based on a certain criterion (e.g., one or more predetermined criteria or thresholds) and obtain DNN setting information corresponding to the one-to-one preprocessing target from among the plurality of pieces of prestored DNN setting information. Then, the AI encoding apparatus 1500 may perform the AI one-to-one preprocessing on the low-resolution original image 1315 via the third DNN operating according to the obtained DNN setting information.

The AI encoding apparatus 1500 generates image data by performing first encoding on the first image 1345 obtained by performing the downscaling or the first image 1325 obtained by performing the one-to-one preprocessing (operation S1940). In detail, the AI encoding apparatus 1500 generates image data corresponding to the first image 1325 or 1345 by encoding the first image 1325 or 1345 based on an image compression method using frequency transformation (e.g., based on a codec such as HEVC, H.264, AV1, etc.).

The AI encoding apparatus 1500 transmits AI encoding data including the image data and AI data including information related to the AI one-to-one preprocessing or information related to the AI downscaling (operation S1950). The AI data includes information for selecting DNN setting information of a second DNN for AI up-scaling of the second image 1355. In an embodiment, the AI encoding data may be stored in a data storage medium.

As described above, because joint training of the third and second DNNs is performed by using DNN setting information of the second DNN obtained after joint training of the first and second DNNs, when the AI encoding apparatus 1500 performs AI downscaling of the high-resolution original image 1335 to a certain downscaling target, the AI decoding apparatus 200 also performs AI upscaling of the second image 1355 to an upscaling target corresponding to the downscaling target. Similarly, when the AI encoding apparatus 1500 performs AI one-to-one preprocessing of the low-resolution original image 1315 to a certain one-to-one preprocessing target, the AI decoding apparatus 200 also performs AI upscaling of the second image 1355 to an upscaling target corresponding to the one-to-one preprocessing target.

Thus, the AI data includes information that enables the AI decoding apparatus 200 to perform AI upscaling of the second image 1355 to an upscaling target corresponding to a downscaling target for the high-resolution original image 1335 or information that enables the AI decoding apparatus 200 to perform the AI upscaling of the second image 1355 to an upscaling target corresponding to a one-to-one preprocessing target for the low-resolution original image 1315. In detail, the AI data includes information used to obtain DNN setting information corresponding to an upscaling target.

The AI decoding apparatus 200 that has received the AI data may infer or determine which DNN setting information is used to perform AI downscaling on the high-resolution original image 1335, accordingly obtain DNN setting information corresponding to the DNN setting information used for the AI downscaling, and perform the AI upscaling by using the obtained DNN setting information.

In addition, the AI decoding apparatus 200 that has received the AI data may infer or determine which DNN setting information is used to perform AI one-to-one preprocessing on the low-resolution original image 1315, accordingly obtain DNN setting information corresponding to the DNN setting information used for the AI one-to-one preprocessing, and perform the AI upscaling by using the obtained DNN setting information.

Figure 20:
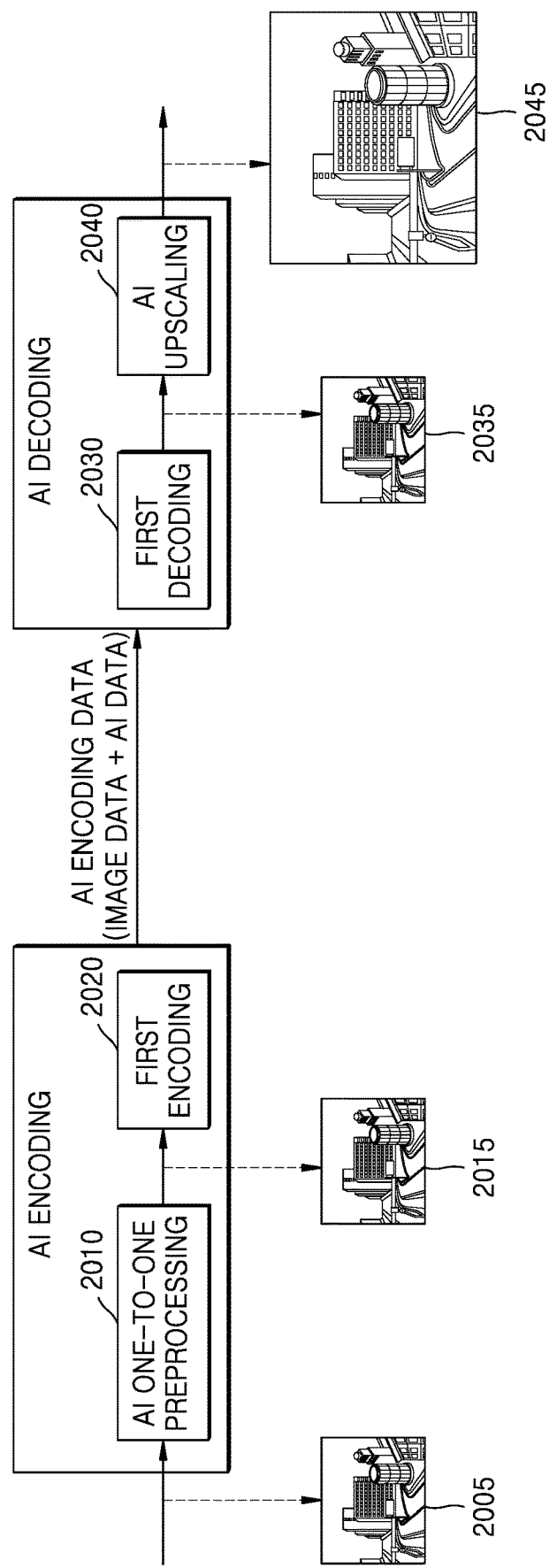
FIG. 20 is a diagram for describing an AI encoding process and an AI decoding process according to an embodiment.

FIG. 20 is a diagram for describing an AI encoding process and an AI decoding process according to an embodiment.

Referring to FIG. 20, according to an embodiment, a first image 2015 is obtained by performing AI one-to-one preprocessing 2010 on an original image 2005. In addition, because first encoding 2020 and first decoding 2030 are performed on the first image 2015 in which detailed features of the original image 2005 are emphasized, it is possible to compensate information that is difficult to restore during upscaling of the original image 2005. When an image has a high degree of complexity during upscaling of the image, information may be lost, and accordingly, image quality may be degraded. Thus, memorization is increased during upscaling by preserving detailed features of an original image through one-to-one preprocessing.

Referring to the AI encoding process in detail, with reference to FIG. 20, in an embodiment, the first image 2015 is obtained by performing the AI one-to-one preprocessing 2010 on the original image 2005, and the first encoding 2020 is performed on the first image 2015. In the AI decoding process, AI encoding data including AI data and image data obtained as a result of the AI encoding is received, a second image 2035 is obtained through the first decoding 2030, and a third image 2045 is obtained by performing AI upscaling 2040 on the second image 2035.

Referring to the AI encoding process in more detail, the AI one-to-one preprocessing 2010 is performed on the original image 2005 in order to obtain the first image 2015 in which the detailed features of the original image 2005 are preserved. In this case, the AI one-to-one preprocessing 2010 is performed based on AI, and AI for the AI one-to-one preprocessing 2010 is jointly trained with AI for the AI upscaling 2040. This is because, when the AI for the AI one-to-one preprocessing 2010 is trained separately from the AI for the AI upscaling 2040, the third image 2045 obtained by performing the AI upscaling 2040 through the AI decoding may not contain the detailed features of the original image 2005 on which the AI encoding is to be performed. In this case, parameters of the AI for the AI upscaling 2040, which have been obtained as a result of joint training with AI for the AI downscaling 110 described with reference to FIG. 1 or with AI for the AI downscaling 1320 described with reference to FIG. 13, are fixedly used without being updated. In other words, when parameters of the AI for the AI one-to-one preprocessing 2010 are updated during the joint training of the AI for the AI one-to-one preprocessing 2010 and the AI for the AI upscaling 2040, the parameters of the AI for the AI upscaling 2040 are not updated but fixedly used. In detail, after joint training of the AI for the AI upscaling 2040 and the AI for the AI downscaling 110 or 1320 is first performed, joint training of the AI for the AI one-to-one preprocessing 2010 and the AI for the AI upscaling 2040 is then performed by fixedly using the parameters of the AI for the AI upscaling 2040, which have been obtained as a result of the first joint training, to thereby obtain parameters of the AI for the AI one-to-one preprocessing 2010. By fixedly using, as parameters of the AI for the AI upscaling 2040, parameters obtained by performing joint training with the AI for the AI downscaling 110 or 1320, parameters of the AI for the AI one-to-one preprocessing 2010 capable of reflecting detailed features of an during upscaling may be obtained, while maintaining the performance of the AI for the AI upscaling 2040. Accordingly, the original image 2005 may be upscaled without degradation in image quality.

In an embodiment, AI data may be used in order to maintain such a joint relationship between the AI encoding process and the AI decoding process. To this end, AI data obtained through the AI encoding process includes information indicating an upscaling target, and in the AI decoding process, the AI upscaling 2040 is performed on the second image 2035 according to an upscaling target identified based on the AI data.

The AI for the AI one-to-one preprocessing 2010, the AI for the AI downscaling 110 or 1320, and the AI for the AI upscaling 2040 may be each implemented as a DNN. As described above with reference to FIG. 16, a first DNN is first jointly trained with a second DNN by sharing loss information under a certain target, and a third DNN is then jointly trained with the second DNN by fixedly using DNN setting information of the second DNN, which is obtained after the joint training of the first and second DNNs. Because the third DNN is jointly trained with the second DNN under a certain target by using DNN setting information of the second DNN, which has been obtained after the joint training of the first and second DNNs, an AI encoding apparatus may provide target information used during the joint training of the third and second DNNs to an AI decoding apparatus, and the AI decoding apparatus may perform the AI upscaling 2040 of the second image 2035 to a target resolution based on the received target information.

Referring to the first encoding 2020 and the first decoding 2030 of FIG. 20 in detail, the amount of information contained in the first image 2015 obtained by performing the AI one-to-one preprocessing 2010 on the original image 2005 may be reduced through the first encoding 2020. The first encoding 2020 may include a process of generating prediction data by predicting the first image 2015, a process of generating residual data corresponding to a difference between the first image 2015 and the prediction data, a process of transforming the residual data from a spatial domain into a frequency domain component, a process of quantizing the residual data that has undergone the transformation into the frequency domain component, a process of entropy-encoding the quantized residual data, etc. The first encoding 2020 may be performed using one of image compression methods based on frequency transformation, such as MPEG-2, H.264 AVC, MPEG-4, HEVC, VC-1, VP8, VP9, AV1, etc.

The second image 2035 corresponding to the first image 2015 may be reconstructed by performing the first decoding 2030 on image data. The first decoding 2030 may include a process of generating quantized residual data by entropy-decoding the image data, a process of inverse-quantizing the quantized residual data, a process of transforming the residual data from the frequency domain into a spatial domain component, a process of generating prediction data, a process of reconstructing the second image 2035 by using the prediction data and the residual data, etc. The first decoding 2030 may be performed using an image reconstruction method corresponding to one of the image compression methods based on frequency transformation, such as MPEG-2, H.264, MPEG-4, HEVC, VC-1, VP8, VP9, AV1, etc., which is used in the first encoding 2020.

AI encoding data obtained via the AI encoding process may include image data obtained as a result of performing the first encoding 2020 on the first image 2015, and AI data related to the AI one-to-one preprocessing 2010 of the original image 2005. The image data may be used during the first decoding 2030, and the AI data may be used during the AI upscaling 2040.

The image data may be transmitted in a form of a bitstream. The image data may include data obtained based on pixel values in the first image 2015, e.g., residual data corresponding to a difference between the first image 2015 and prediction data with respect to the first image 2015. Furthermore, the image data includes pieces of information used during the first encoding 2020 of the first image 2015. For example, the image data may include prediction mode information, motion information, QP related information, etc., which are all used to perform the first encoding 2020 on the first image 2015. The image data may be generated according to rules of an image compression method, e.g., a syntax thereof, which is used during the first encoding 2020 from among the image compression methods based on frequency transformation, such as MPEG-2, H.264 AVC, MPEG-4, HEVC, VC-1, VP8, VP9, AV1, etc.

The AI data is used in the AI upscaling 2040 based on the second DNN. As described above, because the first DNN is jointly trained with the second DNN and then additionally the third DNN is jointly trained with the second DNN by using obtained DNN setting information of the second DNN, the AI data includes information that enables the AI upscaling 2040 to be accurately performed on the second image 2035 via the second DNN. During the AI decoding process, the second image 2035 may undergo the AI upscaling 2040 to a target resolution and/or a target quality based on the AI data.

The AI data may be transmitted in a form of a bitstream, together with the image data.

Alternatively, according to an embodiment, the AI data may also be transmitted in a form of a frame or packet, separately from the image data.

Alternatively, according to an embodiment, the AI data may be included in the image data when it is transmitted.

The AI data and the image data may be transmitted over the same network or different networks. Further, the AI data and the image data may be stored and obtained from a storage medium.

An AI decoding apparatus for performing the AI decoding process described with reference to FIG. 20 may be configured in the same manner as the AI decoding apparatus 200 described with reference to FIG. 2.

Referring back to FIG. 2, according to an embodiment, the AI decoding apparatus 200 may include the receiver 210 and the AI decoder 230.

The AI decoder 230 may include the parser 232, the first decoder 234, the AI upscaler 236, and the AI setter 238.

Although FIG. 2 shows that the receiver 210 and the AI decoder 230 are separate devices, they may be implemented as a single processor. In this case, the receiver 210 and the AI decoder 230 may be implemented as a dedicated processor or through a combination of software and a general-purpose processor such as an AP, a CPU, or a GPU. Furthermore, when the receiver 210 and the AI decoder 230 are implemented as the dedicated processor, the dedicated processor may include a memory for implementing an embodiment (e.g., for storing instructions executable by the processor to perform a method according to an embodiment) or a memory processor for using an external memory.

The receiver 210 and the AI decoder 230 may also be configured as a plurality of processors. In this case, the receiver 210 and the AI decoder 230 may be implemented via a combination of dedicated processors or a combination of software and multiple general-purpose processors such as an AP, a CPU and a GPU. In an embodiment, the receiver 210 may be implemented as a first processor, the first decoder 234 may be implemented as a second processor different from the first processor, and the parser 232, the AI upscaler 236, and the AI setter 238 may be implemented was a third processor different from the first and second processors. It is understood that this is just an example, and one or more other embodiments may implement the various components via any combination of one or more processors.

The receiver 210 receives AI encoding data obtained as a result of AI encoding. For example, the AI encoding data may be a video file having a file format such as mp4 or mov.

The receiver 210 may receive the AI encoding data transmitted through a network. The receiver 210 outputs the AI encoding data to the AI decoder 230.

In an embodiment, the AI encoding data may be obtained from data storage media including a magnetic medium such as a hard disk, a floppy disk, or a magnetic tape, an optical recording medium such as CD-ROM or DVD, a magneto-optical medium such as a floptical disk, etc.

The parser 232 parses the AI encoding data and respectively transmits image data and AI data generated as a result of first encoding of the first image 2015 to the first decoder 234 and the AI setter 238.

In an embodiment, the parser 232 may parse the image data and the AI data that are separately included in the AI encoding data. The parser 232 may distinguish the image data from the AI data by reading a header in the AI encoding data. For example, the AI data may be included in a VSIF within an HDMI stream.

Because the structure of AI encoding data including AI data and image data separated from each other has been described above with respect to FIG. 9, a detailed description thereof is not repeated below.

In another embodiment, the parser 232 may parse the image data from the AI encoding data, extract the AI data from the image data, and transmit the AI data to the AI setter 238 and the rest of the image data to the first decoder 234. In other words, the AI data may be included in the image data, and for example, the AI data may be included in SEI which is an additional information area of a bitstream corresponding to the image data. Because the structure of AI encoding data consisting of image data including AI data has been described above with reference to FIG. 10, a detailed description thereof is not repeated below.

In another embodiment, the parser 232 may split a bitstream corresponding to the image data into a bitstream to be processed by the first decoder 234 and a bitstream corresponding to AI data and respectively output the two bitstreams to the first decoder 234 and the AI setter 238.

The parser 232 may identify that the image data included in the AI encoding data is image data obtained via a certain codec (e.g., MPEG-2, H.264, MPEG-4, HEVC, VC-1, VP8, VP9, AV1, etc.). In this case, corresponding information may be transmitted to the first decoder 234 so that the image data may be processed via the identified codec.

The first decoder 234 reconstructs the second image 2035 corresponding to the first image 2015 based on the image data received from the parser 232. The second image 2035 obtained by the first decoder 234 is then provided to the AI upscaler 236.

According to an embodiment, information related to first decoding, such as prediction mode information, motion information, QP information, etc., may be provided from the first decoder 234 to the AI setter 238. The information related to the first decoding may be used to obtain DNN setting information.

The AI data provided to the AI setter 238 of the AI decoding apparatus 200 for performing the AI decoding process illustrated in FIG. 20 includes pieces of information that enable AI upscaling to be performed on the second image 2035. In this case, an upscaling target for the second image 2035 has to correspond to one-to-one preprocessing via the third DNN. Accordingly, the AI data has to include information for identifying a one-to-one preprocessing target for the third DNN.

Detailed examples of pieces of information contained in the AI data include resolution information of the first image 2015 obtained by performing the one-to-one preprocessing on the original image 2005 and information related to the first image 2015.

In addition, because the resolution information of the first image 2015 obtained by performing the one-to-one preprocessing is the same as that of the original image 2005, an upscaling target may be determined based on a predetermined criterion according to the resolution of the first image 2015. For example, when the resolution of the first image 2015 obtained by performing the one-to-one preprocessing is 2K, the upscaling target may be determined to be 4K. Furthermore, the resolution information of the first image 2015 may be resolution difference information. In detail, because the resolution of the first image 2015 obtained by performing the one-to-one preprocessing is the same as that of the original image 2005, the resolution difference information may indicate 0. Furthermore, because the resolution of the first image 2015 may be determined from the resolution of the reconstructed second image 2035 and the degree of resolution conversion may be determined based on the resolution of the first image 2015, the resolution information of the first image 2015 may be represented only as resolution information of the original image 2005.

Furthermore, the information related to the first image 2015 may include information about at least one of the resolution of the first image 2015, a bitrate of image data obtained as a result of performing the first encoding on the first image 2015, or a type of a codec used during the first encoding of the first image 2015.

The AI setter 238 may determine an upscaling target for the second image 2035, based on at least one of the resolution information of the first image 2015 (differential information indicating that a resolution difference is 0) or the information related to the first image 2015. For example, the upscaling target may indicate to which resolution the second image 2035 is to be upscaled. When the upscaling target is determined, the AI upscaler 236 performs AI upscaling on the second image 2035 via the second DNN in order to obtain the third image 2045 corresponding to the upscaling target.

Because the AI upscaling process performed via the second DNN has been described above with respect to FIGS. 3 and 4, a detailed description thereof is not repeated below.

A method by which the AI setter 238 determines an upscaling target and the AI upscaler 236 performs the AI upscaling on the second image 2035 according to the upscaling target will now be described.

In an embodiment, the AI setter 238 may store a plurality of pieces of DNN setting information settable in the second DNN.

In this case, DNN setting information may include information about at least one of the number of convolution layers included in the second DNN, the number of filter kernels for each convolution layer, or parameters of each filter kernel. The plurality of pieces of DNN setting information may respectively correspond to various upscaling targets, and the second DNN may operate based on DNN setting information corresponding to a certain upscaling target. The second DNN may have different structures depending on DNN setting information. For example, the second DNN may include three convolution layers according to one piece of DNN setting information or four convolution layers according to another piece of DNN setting information.

In an embodiment, DNN setting information may include only parameters of each filter kernel used in the second DNN. In this case, the structure of the second DNN may remain unchanged while only parameters of each filter kernel in the second DNN may change according to the DNN setting information.

The AI setter 238 may obtain DNN setting information for performing the AI upscaling on the second image 2035 from among the plurality of pieces of DNN setting information. Each of the plurality of pieces of DNN setting information used in the second DNN is information for obtaining the third image 2045 having a predetermined resolution and/or a predetermined quality, and is determined via joint training with the first DNN followed by joint training with the third DNN.

For example, one of the plurality of pieces of DNN setting information may include pieces of information for obtaining the third image 2045 having a resolution twice as high as the resolution of the second image 2035, e.g., the third image 2045 with a 4K (4096×2160) resolution that is twice as high as a 2K (2048×1080) resolution of the second image 2035, and another piece of DNN setting information may include pieces of information for obtaining the third image 2045 having a resolution four times higher than the resolution of the second image 2035, e.g., the third image 2045 with a 8K (8192×4320) resolution that is four times higher than the 2K (2048×1080) resolution of the second image 2035.

Each of the plurality of pieces of DNN setting information of the second DNN is jointly created with corresponding DNN setting information of the first DNN used in an AI encoding apparatus (2100 of FIG. 21) and then jointly trained with DNN setting information of the third DNN. The AI setter 238 obtains one piece of DNN setting information from among the plurality of pieces of DNN setting information according to the resolution information of the first image 2015 in DNN setting information of the third DNN. To achieve this, the AI setter 238 identifies information of the third DNN. In order for the AI setter 238 to identify the information of the first DNN, according to an embodiment, the AI decoding apparatus 200 receives AI data including the information of the third DNN from the AI encoding apparatus 2100 (or an intervening device or apparatus).

In other words, the AI setter 238 may identify information targeted by DNN setting information of the third DNN used to obtain the first image 2015 by using pieces of information received from the AI encoding apparatus 2100, and obtain DNN setting information of the second DNN jointly trained with the third DNN.

When DNN setting information for performing AI upscaling on the second image 2035 is obtained from among the plurality of pieces of DNN setting information, the obtained DNN setting information may be transmitted to the AI upscaler 236, and then input data may be processed based on the second DNN operating according to the DNN setting information.

For example, when one piece of DNN setting information is obtained, the AI upscaler 236 may set, to values included in the obtained piece of DNN setting information, the number of filter kernels included in each of the first through third convolution layers 310, 330, and 350 of the second DNN 300 described with reference to FIG. 3, and parameters of each filter kernel.

In detail, parameters of a 3×3 filter kernel used in a convolution layer of the second DNN described with reference to FIG. 4 are set to {1, 1, 1, 1, 1, 1, 1, 1, 1}, and when DNN setting information is changed afterwards, the AI upscaler 236 may replace the parameters of the 3×3 filter kernel with {2, 2, 2, 2, 2, 2, 2, 2, 2} that are parameters included in the changed DNN setting information.

The AI setter 238 may obtain, based on information included in AI data, DNN setting information for performing AI upscaling on the second image 2035 from among the plurality of pieces of DNN setting information, and the AI data used to obtain the DNN setting information will now be described in detail.

In an embodiment, the AI setter 238 may obtain, based on differential information included in the AI data, DNN setting information for performing AI upscaling on the second image 2035 from among the plurality of pieces of DNN setting information. For example, because the resolution of the first image 2015 obtained by performing the one-to-one preprocessing is the same as that of the original image 2005, an upscaling target may be determined based on a predetermined criterion according to the resolution information of the first image 2015. For example, when the resolution of the first image 2015 obtained by performing the one-to-one preprocessing is 2K, the upscaling target may be determined to be 4K.

In another embodiment, the AI setter 238 may obtain, based on information related to the first image 2015, which is included in AI data, DNN setting information for performing AI upscaling on the second image 2035 from among the plurality of pieces of DNN setting information. The AI setter 238 may determine in advance a mapping relationship between pieces of image-related information and pieces of DNN setting information, and obtain DNN setting information mapped to information related to the first image 2015.

The AI encoding apparatus 2100 for performing AI encoding on the original image 2005 will now be described with reference to FIG. 21.

Figure 21:
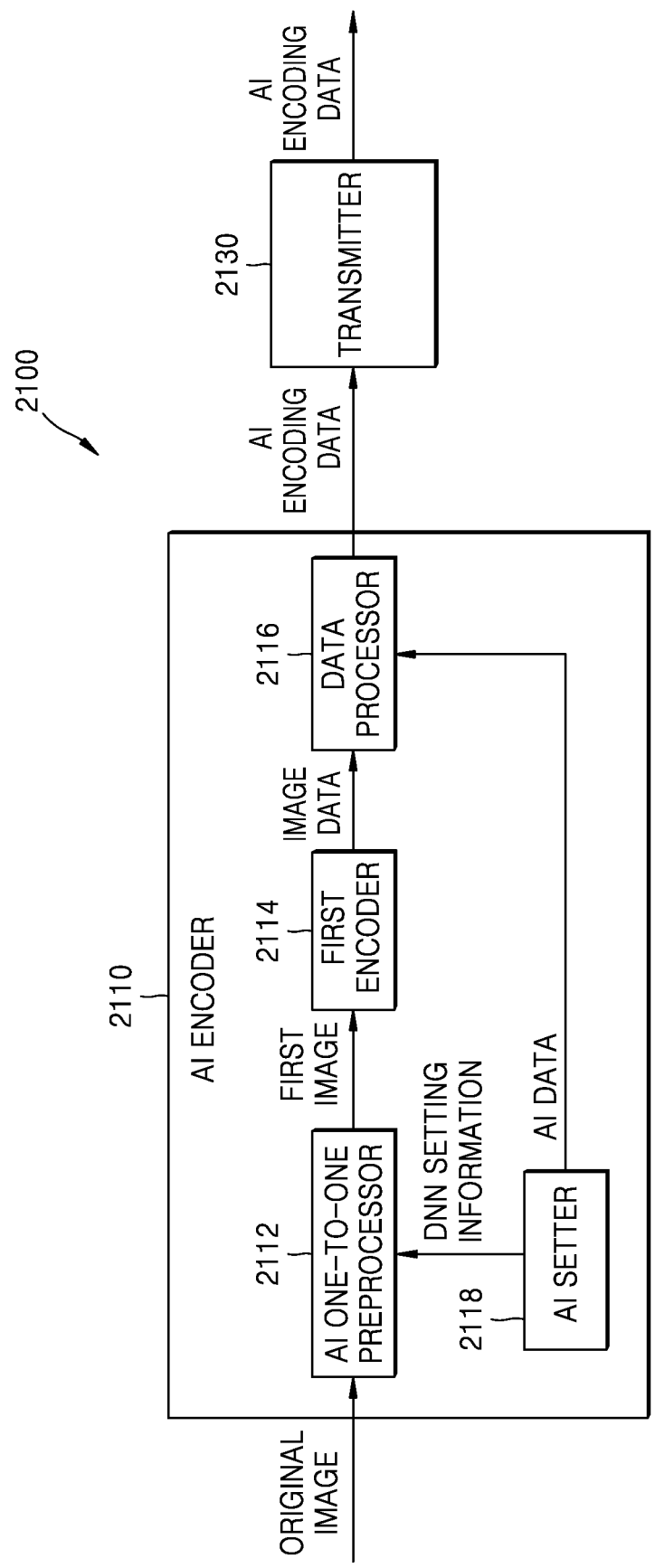
FIG. 21 is a block diagram of a configuration of an AI encoding apparatus according to an embodiment.

FIG. 21 is a block diagram of a configuration of the AI encoding apparatus 2100 according to an embodiment.

Referring to FIG. 21, the AI encoding apparatus 2100 may include an AI encoder 2110 and a transmitter 2130. The AI encoder 2110 may include an AI one-to-one preprocessor 2112, a first encoder 2114, a data processor 2116, and an AI setter 2118. Although FIG. 21 shows that the AI encoder 2110 and the transmitter 2130 are separate devices, the AI encoder 2110 and the transmitter 2130 may be implemented as a single processor. In this case, the AI encoder 2110 and the transmitter 2130 may be implemented as a dedicated processor or through a combination of software and a general-purpose processor such as an AP, a CPU, or a GPU. Furthermore, when the AI encoder 2110 and the transmitter 2130 are implemented as a dedicated processor, the dedicated processor may include a memory for implementing an embodiment (e.g., for storing instructions executable by the processor to perform a method according to an embodiment) or a memory processor for using an external memory.

The AI encoder 2110 and the transmitter 2130 may also be configured as a plurality of processors. In this case, the AI encoder 2110 and the transmitter 2130 may be implemented via a combination of dedicated processors or a combination of software and multiple general-purpose processors such as an AP, a CPU, and a GPU. In an embodiment, the first encoder 2114 may be implemented as a first processor, the AI one-to-one preprocessor 2112, the data processor 2116, and the AI setter 2118 may be implemented as a second processor different from the first processor, and the transmitter 2130 may be implemented as a third processor different from the first and second processors. It is understood that this is just an example, and one or more other embodiments may implement the various components via any combination of one or more processors.

The AI encoder 2110 sequentially performs AI one-to-one preprocessing 2010 on the original image 2005 and first encoding 2020 on the first image 2015 and transmits AI encoding data to the transmitter 2130. The transmitter 2130 transmits the AI encoding data to the AI decoding apparatus 200.

Image data in the AI encoding data includes data obtained as a result of performing the first encoding 1330 on the first image 2015. The image data may include data obtained based on pixel values in the first image 2015, e.g., residual data corresponding to a difference between the first image 2015 and prediction data with respect to the first image 2015. Furthermore, the image data includes pieces of information used during the first encoding 2020 of the first image 2015. For example, the image data may include prediction mode information, motion information, QP information, etc., which are all used to perform the first encoding on the first image 2015.

AI data in the AI encoding data includes pieces of information that enable the AI upscaler 236 to AI upscale the second image 2035 to an upscaling target corresponding to a one-to-one preprocessing target for a third DNN. In an embodiment, the AI data may include resolution information of the first image 2015 obtained by performing the AI one-to-one preprocessing 2010. Furthermore, the AI data may include information related to the first image 2015. The information related to the first image 2015 may include information about at least one of a resolution of the first image 2015, a bitrate of the image data obtained as a result of performing the first encoding 2020 on the first image 2015, or a type of a codec used during the first encoding 2020 of the first image 2015.

In an embodiment, the AI data may include a mutually agreed identifier of DNN setting information so that the second image 2035 is AI upscaled to an upscaling target corresponding to a one-to-one preprocessing target for the third DNN.

Furthermore, in an embodiment, the AI data may include DNN setting information settable in the second DNN.

The AI one-to-one preprocessor 2112 may obtain the first image 2015 by performing the AI one-to-one preprocessing 2010 on the original image 2005 via the third DNN. The AI one-to-one preprocessor 2112 may perform the AI one-to-one preprocessing 2010 on the original image 2015 by using DNN setting information provided by the AI setter 2118. The AI setter 2118 may determine a one-to-one preprocessing target for the original image 2005 based on a predetermined criterion.

In order to obtain the first image 2015 that matches the one-to-one preprocessing target, the AI setter 2118 may store a plurality of pieces of DNN setting information settable in the third DNN. The AI setter 2118 obtains DNN setting information corresponding to the one-to-one preprocessing target from among the plurality of pieces of DNN setting information and provides the obtained DNN setting information to the AI one-to-one preprocessor 2112.

Each of the plurality of pieces of DNN setting information may be trained to obtain the first image 2015 in which detailed features of the original image 2005 are well preserved and/or the first image 2015 having a predetermined resolution and/or a predetermined quality. For example, one of the plurality of pieces of DNN setting information may include pieces of information for obtaining the first image 2015 in which detailed features of the original image 2005 are well preserved while maintaining the same resolution of the original image 2005, e.g., the first image 2015 having the same resolution as the original image 2005 with a 2K (2048×1080) resolution but in which detailed features of the original image 2005 are well preserved. Here, detailed features of an original image may be a portion with high spatial and temporal complexity. Another piece of DNN setting information may include pieces of information for obtaining the first image 2015 with improved quality while maintaining the same resolution of the original image 2005, e.g., the first image 2015 having the same resolution as the original image 2005 with a 2K (2048×1080) resolution but with improved quality.

According to an embodiment, when pieces of information (e.g., the number of convolution layers, the number of filter kernels for each convolution layer, parameters of each filter kernel, etc.) included in DNN setting information are stored in the form of a lookup table, the AI setter 2118 may provide, to the AI one-to-one preprocessor 2112, DNN setting information obtained by combining some values selected from among values in the lookup table according to a one-to-one preprocessing target.

According to an embodiment, the AI setter 2118 may determine a DNN structure corresponding to a one-to-one preprocessing target and obtain DNN setting information corresponding to the determined DNN structure, such as parameters of a filter kernel.

The plurality of pieces of DNN setting information for performing the AI one-to-one preprocessing on the original image 2005 may have optimized values by jointly training the third DNN with the second DNN by fixedly using DNN setting information of the second DNN obtained after joint training of the first and second DNNs. In this case, each of the plurality of pieces of DNN setting information includes at least one of the number of convolution layers included in the third DNN, the number of filter kernels for each convolution layer, or parameters of each filter kernel.

The AI one-to-one preprocessor 2112 may configure the third DNN with DNN setting information determined for AI one-to-one preprocessing of the original image 2005 and obtain, via the third DNN, the first image 2015 in which detailed features of the original image 2005 are preserved and/or the first image 2015 with a certain resolution and/or a certain quality. When DNN setting information for performing the AI one-to-one preprocessing on the original image 2005 is obtained from among the plurality of pieces of DNN setting information, each layer in the third DNN may process input data based on pieces of information included in the DNN setting information.

Hereinafter, a method, performed by the AI setter 2118, of determining a one-to-one preprocessing target will be described. For example, the one-to-one preprocessing target may indicate to what extent the obtained first image 2015 is to preserve detailed features of the original image 2005 while maintaining the resolution of the original image 2005 or to what extent a quality of the obtained first image 2015 is to be improved while maintaining the resolution of the original image 2005.

The AI setter 2118 obtains at least one piece of input information. In an embodiment, the input information may include at least one of a target resolution of the first image 2015, a target bitrate of image data, a type of a bitrate of image data (e.g., a variable bitrate type, a constant bitrate type, an average bitrate type, or the like), a color format to which the AI one-to-one preprocessing 2010 is applied (e.g., a luminance component, a chrominance component, a red component, a green component, a blue component, or the like), a codec type for performing the first encoding 2020 on the first image 2015, compression history information, a resolution of the original image 2005, or a type of the original image 2005.

The input information may include information prestored in the AI encoding apparatus 2100 or received from a user.

The AI setter 2118 controls an operation of the AI one-to-one preprocessor 2112 based on the input information. In an embodiment, the AI setter 2118 may determine a one-to-one preprocessing target based on the input information and provide DNN setting information corresponding to the determined one-to-one preprocessing target to the AI one-to-one preprocessor 2112.

In an embodiment, the AI setter 2118 may transmit at least some of the input information to the first encoder 2114 so that the first encoder 2114 may perform the first encoding 2020 on the first image 2015 based on at least one of a certain bitrate, a certain type of bitrate, or a certain codec.

In an embodiment, the AI setter 1518 may determine a one-to-one preprocessing target based on at least one of a compression ratio (e.g., a target bitrate), a compression quality (e.g., a type of a bitrate), compression history information, or a type of the original image 2005.

For example, the AI setter 2118 may determine a one-to-one preprocessing target based on a compression ratio, a compression quality, or the like, which is preset or input by the user.

As another example, the AI setter 2118 may determine a one-to-one preprocessing target by using compression history information stored in the AI encoding apparatus 2100. For example, a compression ratio, an encoding quality, or the like preferred by the user may be determined based on compression history information usable by the AI encoding apparatus 2100, and a one-to-one preprocessing target may be determined according to the encoding quality determined based on the compression history information. For example, the resolution, quality, etc. of the first image 2015 may be determined according to an encoding quality that has been most frequently used based on the compression history information.

As another example, the AI setter 2118 may determine a one-to-one preprocessing target based on an encoding quality that has been more frequently used than a certain threshold value (e.g., an average of encoding qualities that have been more frequently used than the certain threshold value), as determined according to the compression history information.

As another example, the AI setter 2118 may determine a one-to-one preprocessing target based on the resolution, type (e.g., a file format), etc. of the original image 2005.

In an embodiment, when the original image 2005 is composed of a plurality of frames, the AI setter 2118 may independently obtain DNN setting information for each certain number of frames and provide independently obtained DNN setting information to the AI one-to-one preprocessor 2112.

In an embodiment, the AI setter 2118 may divide frames constituting the original image 2005 into a certain number of groups, and independently obtain DNN setting information for each group. The same piece or different pieces of DNN setting information may be obtained for each group. The same number of frames or different numbers of frames may be included in each group.

In another embodiment, the AI setter 2118 may independently determine DNN setting information for each frame constituting the original image 2005. The same piece of DNN setting information or different pieces of DNN setting information may be determined for each frame.

Because the example of the structure of the third DNN 1400 on which AI one-to-one preprocessing is based has been described above with reference to FIG. 14, a detailed description thereof is not repeated below.

Referring back to FIG. 21, the AI setter 2118 transmits AI data to the data processor 2116. The AI data includes pieces of information that enable the AI upscaler 236 to AI upscale the second image 2035 to an upscaling target corresponding to a one-to-one preprocessing target for the third DNN. The first encoder 2114 that has received the first image 2015 obtained by performing the AI one-to-one preprocessing 2010 from the AI one-to-one preprocessor 2112 may perform the first encoding 2020 on the first image 2015 according to an image compression method based on frequency transformation to thereby reduce the amount of information contained in the first image 2015. Image data is obtained as a result of the first encoding 2020 via a certain codec (e.g., MPEG-2, H.264, MPEG-4, HEVC, VC-1, VP8, VP9, AV1, etc.). The image data is obtained according to rules of the certain codec, i.e., a syntax thereof. For example, the image data may include residual data corresponding to a difference between the first image 2015 and prediction data with respect to the first image 2015, as well as prediction mode information, motion information, QP related information, which are all used to perform the first encoding 2020 on the first image 2015. The image data obtained as a result of the first encoding 2020 by the first encoder 2114 is provided to the data processor 2116.

The data processor 2116 generates AI encoding data including the image data received from the first encoder 2114 and the AI data received from the AI setter 2118.

In an embodiment, the data processor 2116 may generate the AI encoding data including the image data and the AI data separated from each other. For example, the AI data may be included in a VSIF within an HDMI stream.

In another embodiment, the data processor 2116 may include AI data in image data obtained as a result of the first encoding 2020 by the first encoder 2114 and generate AI encoding data including the image data. For example, the data processor 2116 may generate image data in the form of a single bitstream by combining a bitstream corresponding to image data with a bitstream corresponding to AI data. To achieve this, the data processor 2116 may represent the AI data as bits having a value of 0 or 1, i.e., a bitstream. In an embodiment, the data processor 2116 may include a bitstream corresponding to AI data in SEI which is an additional information area of a bitstream obtained as a result of the first encoding 2020.

The AI encoding data is transmitted to the transmitter 2130. The transmitter 2130 transmits AI encoding data obtained as a result of AI encoding via a network.

In an embodiment, the AI encoding data may be stored in data storage media including a magnetic medium such as a hard disk, a floppy disk, or a magnetic tape, an optical recording medium such as CD-ROM or DVD, a magneto-optical medium such as a floptical disk, etc.

Because the method of performing joint training of the third and second DNNs 1400 and 300 after joint training of the first and second DNNs 800 and 300 has been described above with reference to FIGS. 16 and 17, a detailed description thereof is not repeated below.

Embodiments of the disclosure may be written as computer-executable programs or instructions that may be stored in a medium.

The medium may be a medium for continuously storing the computer-executable programs or instructions or temporarily storing the computer-executable programs or instructions for execution or downloading. Furthermore, the medium may be any one of various recording media or storage media in which a single piece or plurality of pieces of hardware are combined, and the medium is not limited to a medium directly connected to a computer system, but may be distributed on a network. Examples of the medium may include magnetic media such as a hard disk, a floppy disk, and a magnetic tape, optical recording media such as CD-ROM and DVD, magneto-optical media such as a floptical disk, and a hardware device configured to store program instructions, including ROM, RAM, a flash memory, etc. Other examples of the medium may include recording media and storage media managed by application stores distributing applications or by websites, servers, etc., supplying or distributing other various types of software.

Moreover, a model related to the DNN may be implemented as a software module. When a DNN model is implemented as a software module (e.g., a program module including instructions), the DNN model may be stored in a computer-readable recording medium.

Furthermore, the DNN model may be integrated in a form of a hardware chip to form a part of the AI decoding apparatus 200 or AI encoding apparatus 700. For example, the DNN model may be manufactured in a form of a dedicated hardware chip for AI, or may be manufactured as a part of an existing general-purpose processor (e.g., a CPU or AP) or a dedicated graphics processor (e.g., a GPU).

Furthermore, the DNN model may be provided in a form of downloadable software. A computer program product may include a product (e.g., a downloadable application) in a form of a software program electronically distributed through a manufacturer or an electronic market. For electronic distribution, at least a part of the software program may be stored in a storage medium or may be temporarily generated. In this case, the storage medium may be a storage medium of a server of the manufacturer or electronic market, or a relay server.

According to an embodiment, a resolution of an input image is determined, and when the input image is a high-resolution image, an image obtained by downscaling the high-resolution image is transmitted (or stored) and upscaled for reconstruction, or when the input image is a low-resolution image, an image obtained by performing one-to-one preprocessing on the low-resolution image such that detailed information of the input image is preserved in the image is transmitted (or stored) and upscaled for reconstruction. In detail, for the high-resolution image, by transmitting (or storing) a downscaled version of the high-resolution image and then upscaling the image based on AI, the image may be efficiently transmitted and used to reconstruct a high-resolution image. Furthermore, for the low-resolution image, a high-resolution image that provides improved quality without degradation in image quality may be generated by transmitting (or storing) an image with detailed information of the low-resolution image preserved therein and upscaling the image without a content provider needing to create a new high-resolution image.

While one or more embodiments have been described with reference to the figures, the embodiments of the disclosure are not intended to limit the scope of technical idea of the disclosure, and it will be understood by those of ordinary skill in the art that various changes in form and details may be made therein without departing from the spirit and scope as defined by the following claims.

What is claimed is:

1. An apparatus for performing artificial intelligence (AI) decoding on an image, the apparatus comprising:
   a memory storing one or more instructions; and
   at least one processor configured to execute the one or more instructions stored in the memory to:
   obtain AI data and image data, the image data generated as a result of first encoding of a first image, and the AI data related to AI downscaling of an original image to the first image or AI one-to-one preprocessing of the original image to the first image;
   obtain a second image corresponding to the first image by performing first decoding on the image data;
   obtain, based on the AI data, deep neural network (DNN) setting information for AI upscaling of the second image, from among a plurality of pieces of DNN setting information; and
   generate a third image by performing the AI upscaling on the second image via an upscaling DNN operating based on the obtained DNN setting information,
   wherein the plurality of pieces of DNN setting information are obtained via:
   first joint training of the upscaling DNN and a downscaling DNN used for the AI downscaling of the original image, and
   second joint training of a one-to-one preprocessing DNN used for the AI one-to-one preprocessing of the original image and the upscaling DNN, the second joint training being performed using DNN setting information for the AI upscaling obtained as a result of the first joint training.

2. The apparatus of claim 1, wherein the one-to-one preprocessing DNN is configured to enhance features of the original image while maintaining a same resolution as that of the original image.

3. A method for performing artificial intelligence (AI) decoding on an image, the method comprising:
   obtaining AI data and image data, the image data generated as a result of first encoding of a first image, and the AI data related to AI downscaling of an original image to the first image or AI one-to-one preprocessing of the original image to the first image;
   obtaining a second image corresponding to the first image by performing first decoding on the image data;
   obtaining, based on the AI data, deep neural network (DNN) setting information for AI upscaling of the second image, from among a plurality of pieces of DNN setting information; and
   generating a third image by performing the AI upscaling on the second image via an upscaling DNN operating based on the obtained DNN setting information,
   wherein the plurality of pieces of DNN setting information are obtained via:
   first joint training of the upscaling DNN and a downscaling DNN used for the AI downscaling of the original image, and
   second joint training of a one-to-one preprocessing DNN used for the AI one-to-one preprocessing of the original image and the upscaling DNN, the second joint training being performed using DNN setting information for the AI upscaling obtained as a result of the first joint training.

4. The method of claim 3, wherein the one-to-one preprocessing DNN is configured to enhance features of the original image while maintaining a same resolution as that of the original image.

5. A non-transitory computer-readable recording medium having recorded thereon a program for performing the method of claim 3.

* * * * *